US010807481B1

(12) United States Patent
Slepchenkov et al.

(10) Patent No.: US 10,807,481 B1
(45) Date of Patent: *Oct. 20, 2020

(54) MODULE-BASED ENERGY SYSTEMS HAVING CONVERTER-SOURCE MODULES AND METHODS RELATED THERETO

(71) Applicant: TAE TECHNOLOGIES, INC., Foothill Ranch, CA (US)

(72) Inventors: Mikhail Slepchenkov, Lake Forest, CA (US); Roozbeh Naderi, Foothill Ranch, CA (US)

(73) Assignee: TAE TECHNOLOGIES, INC., Foothill Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/832,474

(22) Filed: Mar. 27, 2020

Related U.S. Application Data

(60) Provisional application No. 62/906,007, filed on Sep. 25, 2019, provisional application No. 62/826,238, filed on Mar. 29, 2019, provisional application No. 62/826,158, filed on Mar. 29, 2019.

(51) Int. Cl.
| | |
|---|---|
| *B60L 50/60* | (2019.01) |
| *B60L 50/51* | (2019.01) |
| *H02J 7/14* | (2006.01) |
| *H02J 7/00* | (2006.01) |
| *B60L 1/00* | (2006.01) |

(52) U.S. Cl.
CPC ............ *B60L 50/66* (2019.02); *B60L 1/00* (2013.01); *B60L 50/51* (2019.02); *H02J 7/0013* (2013.01); *H02J 7/1423* (2013.01); *H02J 7/1492* (2013.01)

(58) Field of Classification Search
None
See application file for complete search history.

(56) References Cited

U.S. PATENT DOCUMENTS

| | | | |
|---|---|---|---|
| 5,204,548 | A | 4/1993 | Daehler et al. |
| 5,428,522 | A | 6/1995 | Millner et al. |
| 5,905,371 | A | 5/1999 | Limpaecher |
| 5,949,664 | A | 9/1999 | Bernet et al. |
| 6,051,961 | A | 4/2000 | Jang et al. |
| 6,064,180 | A | 5/2000 | Sullivan et al. |
| 6,373,734 | B1 | 4/2002 | Martinelli |

(Continued)

FOREIGN PATENT DOCUMENTS

| | | |
|---|---|---|
| CA | 2 810 369 A1 | 3/2012 |
| CN | 201789411 U | 4/2011 |

(Continued)

OTHER PUBLICATIONS

WO PCT/US18/37081 ISR and Written Opinion, dated Oct. 17, 2018.

(Continued)

*Primary Examiner* — David V Henze-Gongola
(74) *Attorney, Agent, or Firm* — One LLP

(57) ABSTRACT

Module-based energy systems are provided having multiple converter-source modules. The converter-source modules can each include an energy source and a converter. The systems can further include control circuitry for the modules. The modules can be arranged in various ways to provide single phase AC, multi-phase AC, and/or DC outputs. Each module can be independently monitored and controlled.

27 Claims, 35 Drawing Sheets

(56) References Cited

U.S. PATENT DOCUMENTS

| | | |
|---|---|---|
| 7,091,701 B2 | 8/2006 | Turner et al. |
| 7,485,987 B2 | 2/2009 | Mori et al. |
| 8,395,280 B2 | 3/2013 | Graovac et al. |
| 8,476,888 B1 | 7/2013 | Chen et al. |
| 8,503,202 B2 | 8/2013 | Chimento et al. |
| 8,614,525 B2 | 12/2013 | Teichmann et al. |
| 8,829,723 B2 | 9/2014 | Graovac et al. |
| 9,172,254 B2 | 10/2015 | Ganor |
| 9,444,275 B2 | 9/2016 | Huang et al. |
| 9,461,474 B2 | 10/2016 | Deboy et al. |
| 9,673,732 B2 | 6/2017 | Deboy et al. |
| 10,074,995 B2 | 9/2018 | Smedley et al. |
| 10,193,359 B2 | 1/2019 | Ganor |
| 2004/0008016 A1 | 1/2004 | Sutardja et al. |
| 2004/0037101 A1 | 2/2004 | Meynard et al. |
| 2006/0097782 A1 | 5/2006 | Ebner |
| 2006/0202636 A1 | 9/2006 | Schneider |
| 2008/0245593 A1 | 10/2008 | Kim |
| 2009/0251212 A1 | 10/2009 | Pillonnet et al. |
| 2009/0311891 A1 | 12/2009 | Lawrence et al. |
| 2010/0085789 A1 | 4/2010 | Ulrich et al. |
| 2010/0121511 A1* | 5/2010 | Onnerud ............... B60L 58/12 701/22 |
| 2010/0298957 A1 | 11/2010 | Sanchez Rocha et al. |
| 2010/0301827 A1 | 12/2010 | Chen et al. |
| 2011/0140533 A1 | 6/2011 | Zeng et al. |
| 2011/0148198 A1 | 6/2011 | Tripathi et al. |
| 2011/0187184 A1* | 8/2011 | Ichikawa ............... B60L 1/003 307/10.1 |
| 2011/0198936 A1* | 8/2011 | Graovac ............... B60L 3/0046 307/82 |
| 2012/0074949 A1 | 3/2012 | Kepley et al. |
| 2012/0155140 A1 | 6/2012 | Chen et al. |
| 2012/0161858 A1 | 6/2012 | Permuy et al. |
| 2012/0195084 A1 | 8/2012 | Norrga |
| 2012/0262967 A1 | 10/2012 | Cuk |
| 2013/0027126 A1 | 1/2013 | Jayaraman et al. |
| 2013/0083563 A1 | 4/2013 | Wang et al. |
| 2013/0088254 A1 | 4/2013 | Hoang et al. |
| 2013/0088903 A1 | 4/2013 | Sagona et al. |
| 2013/0154521 A1 | 6/2013 | Butzmann et al. |
| 2013/0302652 A1 | 11/2013 | Wolff et al. |
| 2014/0042827 A1 | 2/2014 | Wolff |
| 2014/0104899 A1 | 4/2014 | Fischer et al. |
| 2014/0239927 A1 | 8/2014 | Nascimento et al. |
| 2014/0254219 A1 | 9/2014 | Davies |
| 2014/0354212 A1 | 12/2014 | Sugeno et al. |
| 2015/0049532 A1 | 2/2015 | Bernet et al. |
| 2015/0229227 A1 | 8/2015 | Aeloiza et al. |
| 2015/0249351 A1 | 9/2015 | Wolff et al. |
| 2015/0280604 A1 | 10/2015 | Hassanpoor |
| 2015/0288287 A1 | 10/2015 | Madawala et al. |
| 2015/0296292 A1 | 10/2015 | Hogan et al. |
| 2015/0303820 A1 | 10/2015 | Cubaines |
| 2015/0340964 A1 | 11/2015 | Modeer |
| 2015/0364935 A1 | 12/2015 | Fetzer et al. |
| 2016/0183451 A1 | 6/2016 | Conrad et al. |
| 2016/0240894 A1 | 8/2016 | Wartenberg et al. |
| 2017/0054306 A1 | 2/2017 | Vo et al. |
| 2017/0366079 A1 | 12/2017 | Bhowmik et al. |
| 2019/0312504 A1 | 10/2019 | Kim et al. |

FOREIGN PATENT DOCUMENTS

| | | |
|---|---|---|
| CN | 204156591 U | 2/2015 |
| EP | 0 907 238 A1 | 4/1999 |
| EP | 2 290 799 A1 | 3/2011 |
| WO | WO 2011/009689 A2 | 1/2011 |
| WO | WO 2011/082855 A2 | 7/2011 |
| WO | WO 2011/082856 A2 | 7/2011 |
| WO | WO 2011/128133 A1 | 10/2011 |
| WO | WO 2012/016735 A1 | 2/2012 |
| WO | WO 2012/038162 A1 | 3/2012 |
| WO | WO 2013/056900 A2 | 4/2013 |
| WO | WO 2014/151178 A2 | 9/2014 |
| WO | WO 2014/193254 A1 | 12/2014 |
| WO | WO 2018/072837 A1 | 4/2018 |
| WO | WO 2019/180699 A1 | 9/2019 |

OTHER PUBLICATIONS

WO PCT/US18/38089 ISR and Written Opinion, dated Oct. 29, 2018.

WO PCT/US19/23695 ISR and Written Opinion, dated Aug. 12, 2019.

Maharjan, L., et al., "State-of-Charge (SOC)—Balancing Control of a Battery Energy Storage System Based on a Cascade PWM Converter", IEEE Transaction on Power Electronics, 2009, vol. 24, No. 6, pp. 1628-1636.

Maharjan, L., et al., "Fault-Tolerant Operation of a Battery-Energy-Storage System Based on a Multilevel Cascade PWM Converter With Star Configuration", IEEE Transactions on Power Electronics, 2010, vol. 25, No. 9, pp. 2386-2396.

* cited by examiner

MODULE-BASED ENERGY SYSTEMS HAVING CONVERTER-SOURCE MODULES AND METHODS RELATED THERETO

CROSS-REFERENCE TO RELATED APPLICATIONS

This application claims the benefit of and priority to U.S. Provisional Application Ser. No. 62/826,158, filed Mar. 29, 2019, U.S. Provisional Application Ser. No. 62/826,238, filed Mar. 29, 2019, and U.S. Provisional Application Ser. No. 62/906,007, filed Sep. 25, 2019, all of which are incorporated by reference herein for all purposes.

FIELD

The subject matter described herein relates generally to module-based energy systems and modules for use therein, and systems, devices, and methods that facilitate the interconnection and control of modules in module-based energy systems.

BACKGROUND

Energy systems having multiple energy sources or sinks are commonplace in many industries. One example is the automobile industry. Today's automotive technology, as evolved over the past century, is characterized, amongst many things, by an interplay of motors, mechanical elements, and electronics. These are the key components that impact vehicle performance and driver experience. Motors are of the combustion or electric type and one usually finds one motor per car, exceptions being cars with hybrid drive-trains, featuring a combination of a combustion engine with one or two electric motors, or performance oriented electric vehicles that are outfitted with two motors. In almost all cases the rotational energy from the motor(s) is delivered via a set of highly sophisticated mechanical elements, such as clutches, transmissions, differentials, drive shafts, torque tubes, couplers, etc. These parts control to a large degree torque conversion and power distribution to the wheels and are key elements to define the performance of the car. They also impact road handling. Over the years individual car manufacturers have highly optimized these mechanical parts to provide better performance, higher fuel efficiency and ultimately differentiation in the market place. On the control side, apart from driver comforts such as entertainment, navigation and human machine interface elements, there are typically only a few clusters of specialty electronics hardware and embedded software that control/optimize motors, clutch/transmission operation and road holding/handling.

An EV comprises various electrical systems that are related to the drivetrain including, among others, the battery, the charger and motor control. A short inventory of the present capabilities and shortcomings of these electrical systems are described below.

Conventional Battery Design

High voltage battery packs are typically organized in a serial chain of lower voltage battery modules. Each such module is further comprised of a serially connected set of individual cells and a simple embedded battery management system to regulate basic cell related characteristics, such as state of charge and voltage. Electronics with more sophisticated capabilities or some form of smart interconnectedness are absent. As a consequence, any monitoring or control function is handled by a separate system, which, if at all present elsewhere in the car, lacks the ability to monitor individual cell health, state of charge, temperature and other performance impacting metrics. There is also no ability to adjust power draw per individual cell in any form. Some of the major consequences are: (1) the weakest cell constrains the overall performance of the entire battery pack, (2) failure of any cell or module leads to a need for replacement of the entire pack, (3) battery reliability and safety are considerably reduced, (4) battery life is limited, (5) thermal management is difficult, (6) battery packs always operate below maximum capabilities, (7) sudden inrush into the battery packs of regenerative braking derived electric power cannot be readily stored in the batteries and will require dissipation via a dump resistor.

Conventional Charger Design

Charging circuits are typically realized in separate on-board systems. They stage power coming from outside the EV in the form of an AC signal or a DC signal, convert it to DC and feed it to the battery pack(s). Charging systems monitor voltage and current and typically supply a steady constant feed. Given the design of the battery packs and typical charging circuits, there is little ability to tailor charging flows to individual battery modules based on cell health, performance characteristics, temperature, etc. Charging cycles are also typically long as the charging systems and battery packs lack the circuitry to allow for pulsed charging or other techniques that would optimize the charge transfer or total charge achievable.

Conventional Motor Control Design

Conventional controls contain DC to DC conversion stages to adjust battery pack voltage levels to the bus voltage of the EV's electrical system. Motors, in turn, are then driven by simple two-level multiphase converters that provide the required AC signal(s) to the electric motor. Each motor is traditionally controlled by a separate controller, which drives the motor in a 3-phase design. Dual motor EVs would require two controllers, while EVs using four in-wheel motors would require 4 individual controllers. The conventional controller design also lacks the ability to drive next generation motors, such as switch reluctance motors (SRM), characterized by higher numbers of pole pieces. Adaptation would require higher phase designs, making the systems more complex and ultimately fail to address electric noise and driving performance, such as high torque ripple and acoustical noise.

Many of these deficiencies apply not only to automobiles but other motor driven vehicles, and also to stationary applications to a certain extent. For these and other reasons, needs exist for improved systems, devices, and methods for energy systems for the vehicular industry and elsewhere.

SUMMARY

Example embodiments of systems, devices, and methods are provided herein for module-based energy systems widely relevant to many applications. In many of these embodiments, a module-based energy system includes multiple modules, where each module includes at least an energy source and a converter. More complex configurations of each module are also disclosed. The modules of the system can be connected together in different arrangements of varying complexities to perform functions specific to the particular technological application to which the system is applied. The system can be configured to monitor status information, at least one operating characteristic, or other parameter of each module repeatedly during use of the system, assess the state of each module based on that monitored status information, operating characteristic, or other parameter, and control each module independently in an effort to achieve and/or maintain one or more desired targets, such as electrical performance, thermal performance, lifespan, and others. This control can occur to facilitate energy provision from the system (e.g., discharging) and/or energy consumption (e.g., charging). Numerous example applications of these systems, devices, and methods are described.

In many example embodiments, the at least one energy source of the module can include a capacitor (such as an ultra-capacitor or super-capacitor), a battery, and a fuel-cell.

In many example embodiments, the system can include at least two converter-source modules connected in a one-dimensional array or in a multi-dimensional array. At least two one-dimensional arrays can be connected together, for example, at different rows and columns directly or by one or more additional converter-source modules. In such configurations, an output voltage of any shape and frequency can be generated at the outputs of the module-based energy system as a superposition of output voltages of individual converter-source modules.

The various interconnected architectures of the example embodiments enable inter-phase power management within a single module-based energy system (e.g., a battery pack) and inter-system power management between multiple module-based energy systems (e.g., battery packs), as well as connection of auxiliary loads to the system(s), and maintenance of uniform distribution of energy provided to those loads from all converter-source modules of such systems.

The various interconnected architectures of the example embodiments also enable the control of power sharing among converter-source modules. Such control enables, for example, regulation of parameters like State of Charge of the energy sources of the converter-source modules to be balanced, in real time and continually during cycling, as well as at rest, which fosters utilization of the full capacity of each energy source regardless of possible differences in their capacities. In addition, such control can be used to balance the temperature of the energy sources of the converter-source modules. Temperature balancing, for example, can increase the power capability of the system (e.g., a battery pack) and provide more uniform aging of the energy sources regardless of their physical location within the system and differences in their thermal resistivity.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
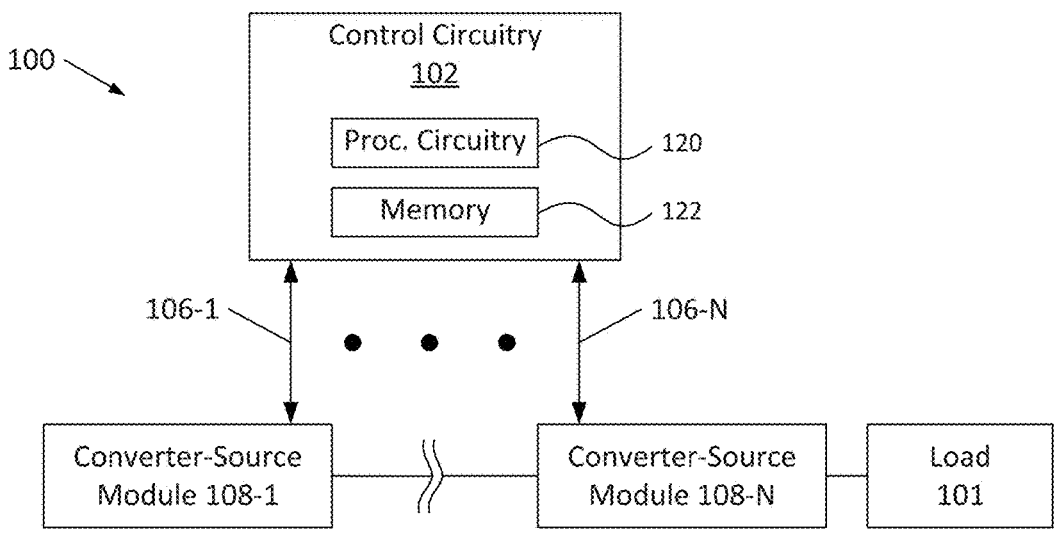
FIGS. 1A, 1B and 1C are block diagrams depicting example embodiments of a module-based energy system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Example embodiments of module-based energy systems are described herein, as are: example embodiments of devices, circuitry, software, and components within such systems; example embodiments of methods of operating and using such systems; and example embodiments of applications (e.g., apparatuses, machines, grids, locales, structures, environments, etc.) in which such systems can be implemented or incorporated or with which such systems can be utilized. In many cases, these applications can be classified as a mobile application or a stationary application.

Examples of Applications

Mobile applications are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, etc.), a military vehicle, a spacecraft, and a satellite.

Stationary applications are generally applications other than mobile applications. Generally, in stationary applications the module-based energy system resides in a static location while providing electrical energy for consumption by one or more other entities. Examples of stationary applications in or with which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), and systems that convert solar power, wind, geothermal energy, fossil fuels, or nuclear reactions into electricity for storage. Examples of stationary applications in or with which the embodiments disclosed herein can be used include, but are not limited to: energy systems for charging the mobile applications described above (e.g., a charging station). Other examples of stationary applications in or with which the embodiments disclosed herein can be used include, but are not limited to: a data center storage system, a power grid, or a micro-grid. A stationary energy system can be used in either a storage or non-storage role.

In describing embodiments herein, reference may be made to a particular mobile application (e.g., an electric vehicle (EV)) or stationary application (e.g., grid). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Example Embodiments of Module-Based Energy Systems

FIG. 1A depicts an example embodiment of a module-based energy system 100. Here, system 100 includes control circuitry 102 communicatively coupled with N converter-source modules 108-1 through 108-N, over communication paths or links 106-1 through 106-N, respectively. In these embodiments, any number of two or more converter-source modules can be used (e.g., N is greater than or equal to two). The converter-source modules 108, referred to herein as "ConSource" modules, can be connected to each other in a variety of manners as will be described in more detail with respect to FIGS. 15-29. For ease of illustration, in FIGS. 1A-1C, the ConSource modules are shown connected in series, or as a one dimensional array, where the Nth ConSource module is coupled to a load 101. Load 101 is the electrical load to which system 100 outputs power when used to provide power. Load 101 can be any type of load including, but not limited to, a motor or a grid. For charging, the ConSource modules can be coupled with a charging source (not shown) either in addition to, or instead of, load 101. As will be described in greater detail herein, system 100 can be configured to supply multiple loads 101, including both primary and auxiliary loads.

In the embodiment of FIG. 1A, control circuitry 102 is configured to control one or more ConSource modules 108 based on status information received from the same or different one or more of the ConSource modules. Control can also be based on one or more other factors, such as requirements of load 101. In many embodiments, the aspect that is controlled is the output power of each ConSource module over time; however other aspects can be controlled as an alternative to or in addition to output power.

In many embodiments, status information of every ConSource module in system 100 will be communicated to control circuitry 102, from which control circuitry 102 will independently control every ConSource module 108-1 . . . 108-N. Other variations are possible. For example, control of a particular ConSource module (or subset of ConSource modules) can be based on status information of that particular ConSource module (or subset of ConSource modules), based on status information of a different ConSource module that is not the particular ConSource module (or subset of ConSource modules), based on status information of all ConSource modules other than the particular ConSource module (or subset of ConSource modules), based on status information of that particular ConSource module (or subset of ConSource modules) and status information of at least one other ConSource module that is not that particular ConSource module (or subset of ConSource modules), or based on status information of all ConSource modules in system 100.

As will be described herein, the status information can be information about one or more aspects of each ConSource module. The status information can be an operating characteristic or other parameter. Types of status information include, but are not limited to, the following aspects of a ConSource module or components thereof: State of Charge (SOC) (e.g., the level of charge of an energy source relative to its capacity, such as a fraction or percent), State of Health (SOH) (e.g., a figure of merit of the condition of an energy source compared to its ideal conditions), capacity, temperature, voltage, current, or the presence of absence of a fault. Each ConSource module 108-1 . . . 108-N includes one or more sensors or other measuring elements for collecting sensed or measured signals or data that constitute status information, or can be converted into status information. A separate sensor is not needed to collect each type of status information, as more than one type of status information can be sensed or measured with a single sensor, or otherwise algorithmically determined without the need for additional sensors.

Figure 1B:
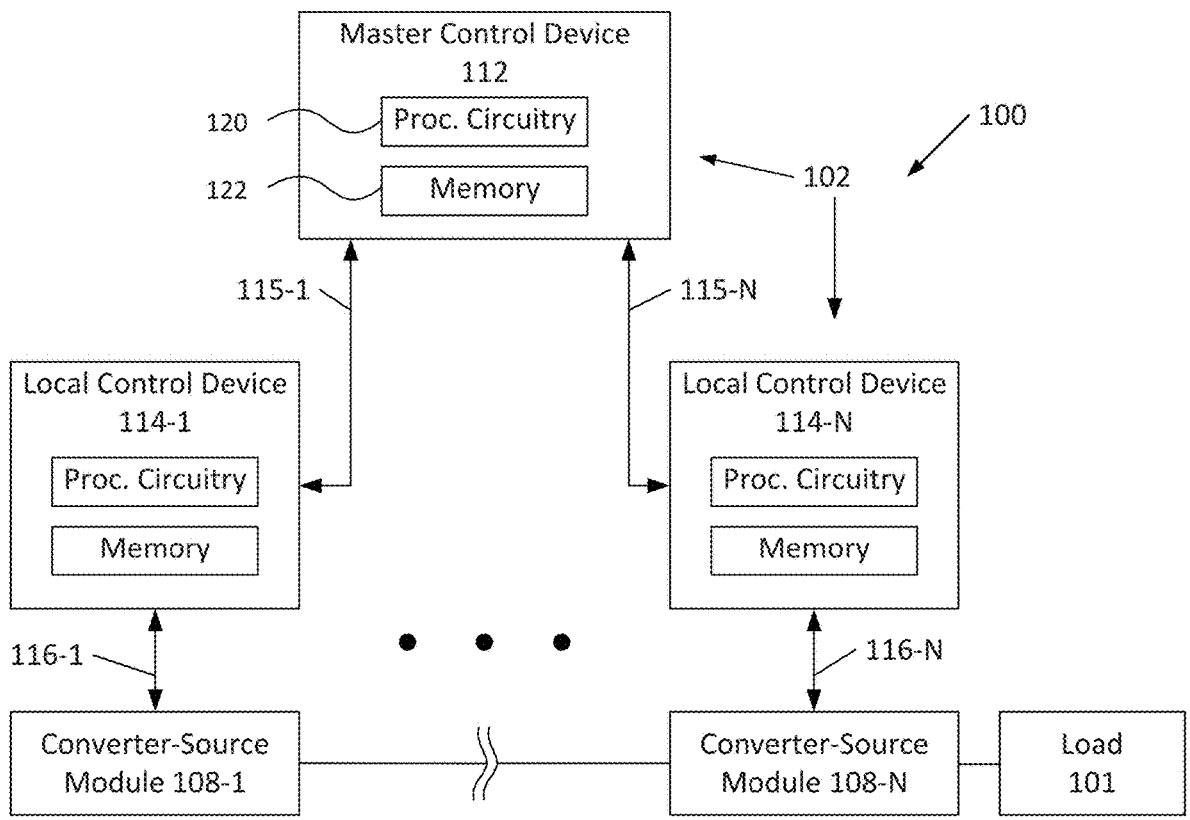

FIG. 1B depicts another example embodiment of system 100. Here, control circuitry 102 is implemented as a master control device 112 communicatively coupled with N different local control devices 114-1 through 114-N over communication paths or links 115-1 through 115-N, respectively. Each local control device 114-1 through 114-N is communicatively coupled with one converter-source module 108-1 through 108-N over communication paths or links 116-1 through 116-N, respectively, such that there is a 1:1 relationship between local control devices 114 and converter-source modules 108.

Figure 1C:
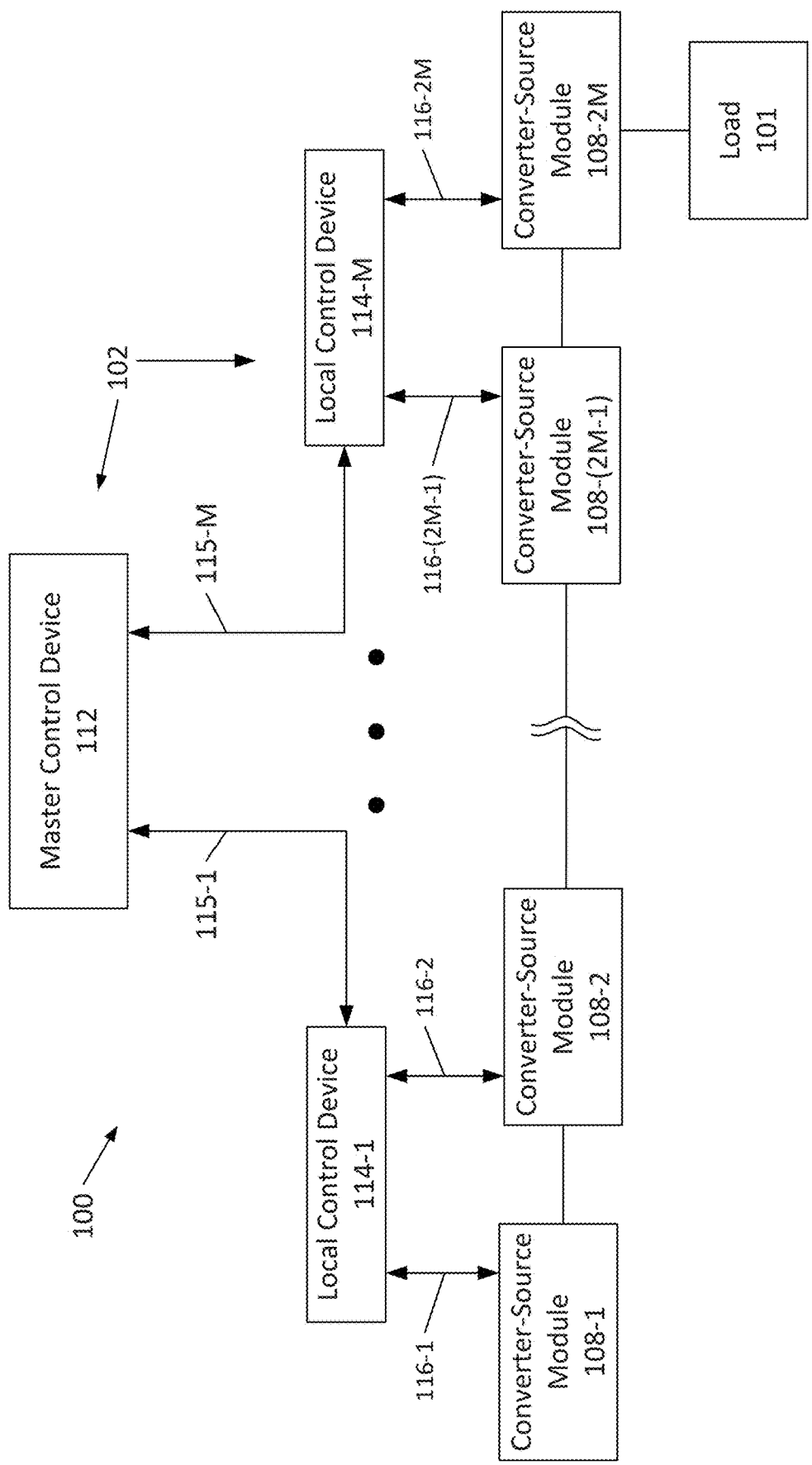

FIG. 1C depicts another example embodiment of system 100. Here, master control device 112 is communicatively coupled with M different local control devices 114-1 through 114-M over communication paths or links 115-1 through 115-M, respectively. Local control devices 114 can be coupled with and control two or more converter-source modules 108. In the example shown here, each local control device 114 is communicatively coupled with two converter-source modules 108, such that M local control devices 114-1 through 114-M are coupled with 2M converter-source modules 108-1 through 108-2M over communication paths or links 116-1 through 116-2M, respectively.

Communication paths or links 106, 115, and 116 can each be wired or wireless communication paths or links that communicate data or information bidirectionally, in parallel or series fashion. Data can be communicated in a standard or custom format. In automotive applications, communication paths or links 115 can be configured to communicate data according to FlexRay or CAN protocols.

In the embodiments described with respect to FIGS. 1B and 1C, the local control devices 114 receive the status information from each ConSource module, or determine the status information from sensed or measured signals or data received from each ConSource module, and communicate that information to master control device 112. In some embodiments local control devices 114 communicate the measured or sensed data to master control device 112, which then algorithmically determines the status information on the basis of that raw data. Master control device 112 can then use the status information of the ConSource modules 108 to make control determinations accordingly. The control determinations may take the form of instructions, commands, or other information (such as a modulation index described below) that can be interpreted or utilized by local control devices 114 to either maintain or adjust the operation or contribution of the ConSource modules.

For example, master control device 112 may receive status information indicating one or more of the following conditions that a particular ConSource module (or component thereof) is operating in with respect to one or more other ConSource modules in system 100: with a relatively lower SOC, with a relatively lower SOH, with a relatively lower capacity, with a relatively lower voltage, with a relatively lower current, with a relatively higher temperature, or with a fault. In such an example, master control device 112 can output control information that causes the power output of that particular ConSource module to be reduced (or in some cases, raised depending on the condition). In this manner, the power output of a ConSource module that is operating with, e.g., a higher temperature, can be reduced so as to cause the temperature of that ConSource module to converge towards the temperature of one or more other ConSource modules.

In other embodiments, the determination of whether to adjust the operation of a particular ConSource module can be made by comparison of the status information to predetermined thresholds, limits, or conditions, and not necessarily by comparison to statuses of other ConSource modules.

The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, master control device 112 can adjust the operation of a ConSource module if the status information for that ConSource module indicates it to be operating in violation (e.g., above or below) of a predetermined threshold or limit, or outside of a predetermined range of acceptable operating conditions. Similarly, master control device 112 can adjust the operation of a ConSource module if the status information for that ConSource module indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like.

Local control device 114 can receive, process, and transmit: the signals from various sensors (e.g., temperature, voltage and current sensors) of the converter-source module; switching (e.g., triggering) and fault signals to and from semiconductor switches; the voltages of elementary cells of energy storage and buffering elements; and other signals. The local control device can perform communication with and transmission of corresponding control signals to and from the master control device 112.

In this manner, master control device 112 can control the ConSource modules 108 within system 100 to achieve or converge towards a desired target. The target can be, for example, operation of all ConSource modules at the same or similar levels with respect to each other, or within predetermined thresholds limits, or conditions. This process is also referred to as balancing or seeking to achieve balance in the operation or operating characteristics of the ConSource modules. The term "balance" as used herein does not require absolute equality between ConSource modules 108 or components thereof, but rather is used in a broad sense to convey to those of ordinary skill in the art that operation of system 100 can be used to actively reduce disparities in operation between ConSource modules that would otherwise exist.

Referring back to FIG. 1A, control circuitry 102 can be configured to operate and execute control using software (instructions stored in memory that are executable by processing circuitry), hardware, or a combination thereof. Control circuitry 102 can include processing circuitry and memory as shown here. Example implementations of processing circuitry and memory are described further below. Communication path or links 106 can also include wireline power so as to directly supply the operating power for control circuitry 102 from one or more converter source modules 108. In certain embodiments power for control circuitry 102 is supplied from only one or more converter source modules 108.

Referring to FIGS. 1B-1C, master control device 112 and local control devices 114 can similarly be configured to operate and execute control using software (instructions stored in memory that are executable by processing circuitry), hardware, or a combination thereof, and each can include processing circuitry and memory as shown here. Example implementations of processing circuitry 120 and memory 122 are described further below. Communication path or links 116 can also include wireline power so as to directly supply the operating power for local control devices 114 from one or more converter source modules 108. In certain embodiments, the operating power for each local control device 114 is supplied only by the one or more converter source modules 108 to which that local control device 114 is connected by path 116. The operating power for the master control device 112 can be supplied indirectly from one or more of the converter-source modules 108 (e.g., such as through a car's power network).

In some embodiments, control circuitry 102 can include a single control device for the entire system 100. In other embodiments, control circuitry can be distributed between local control devices 114 associated with the modules 108, such that a separate master control device 112 is not necessary and can be omitted from system 100.

In some embodiments, control of system 100 can be distributed between control circuitry 102 dedicated to or local to system 100, and control circuitry that is shared with other parts of the application. For example, in an automotive application, master control device 112 can be implemented as part of another control device (e.g., Electronic Control Unit (ECU)) of the vehicle having responsibility for one or more other automotive functions (e.g., motor control, driver interface control, traction control, etc.).

Control circuitry 102 can have a communicative interface for communicating with another control device of the application. For example, in an automotive application, control circuitry 102 (e.g., master control device 112) can output data or information about system 100 to another control device (e.g., the ECU) of the vehicle.

Example Embodiments of Converter-Source Modules within Module-Based Systems

Figure 2:
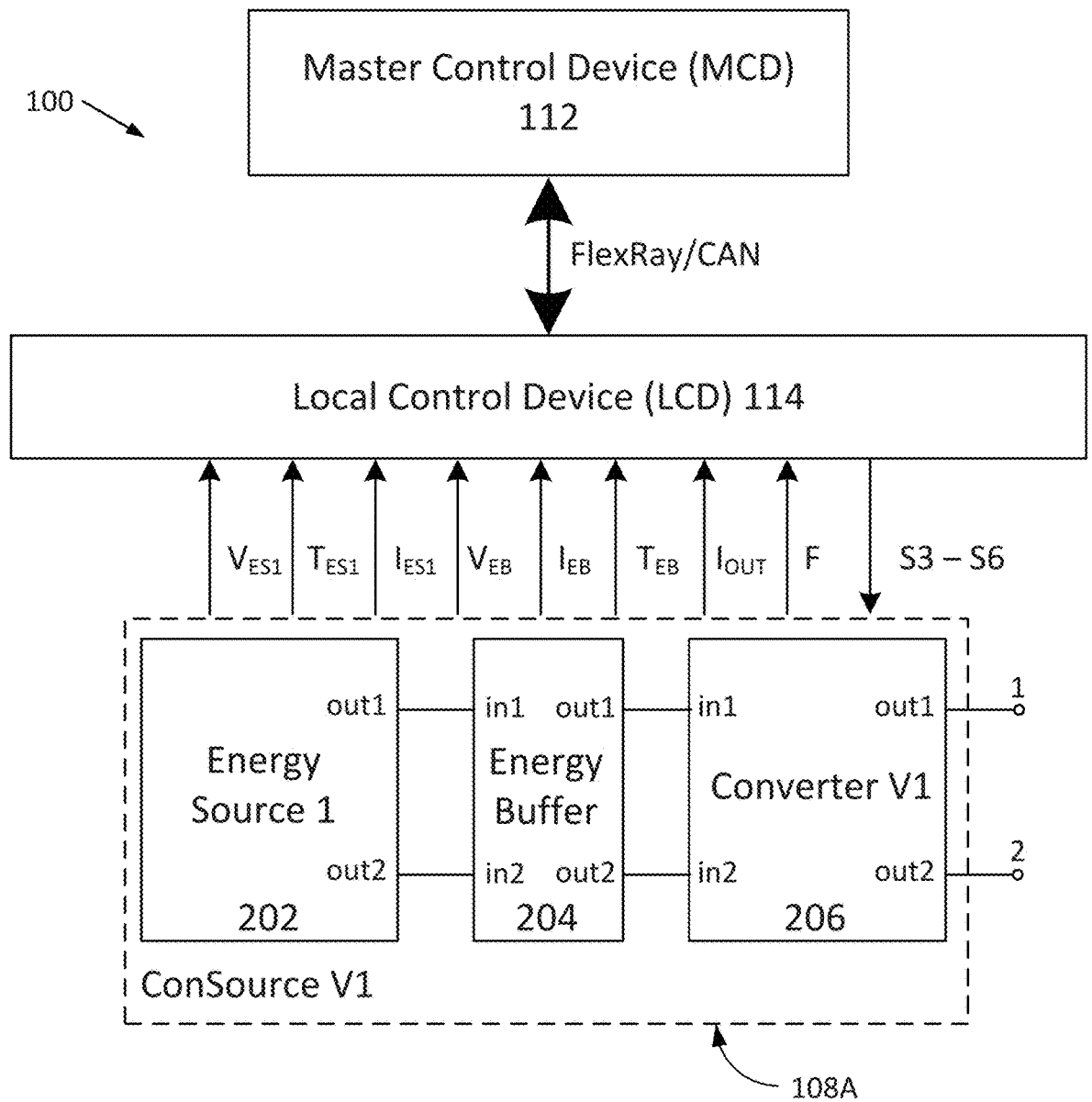
FIG. 2 is a block diagram depicting an example embodiment of a converter-source module (ConSource V1) with a local control device (LCD) interconnected to a master control device (MCD), according to embodiments of the present disclosure.
Figure 3:
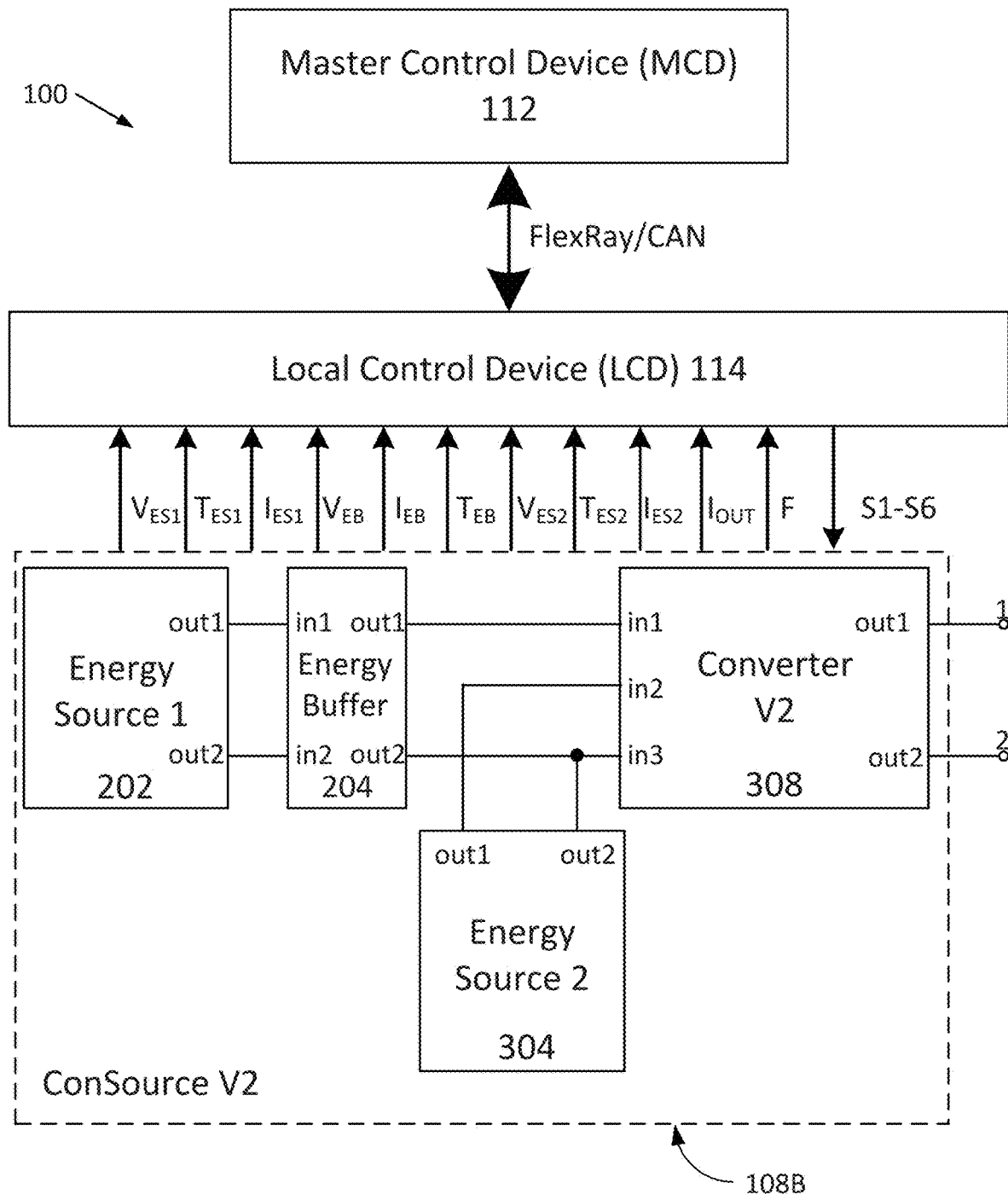
FIG. 3 is a block diagram depicting another example embodiment of a converter-source module (ConSource V2) with an LCD interconnected to an MCD, according to embodiments of the present disclosure.
Figure 4:
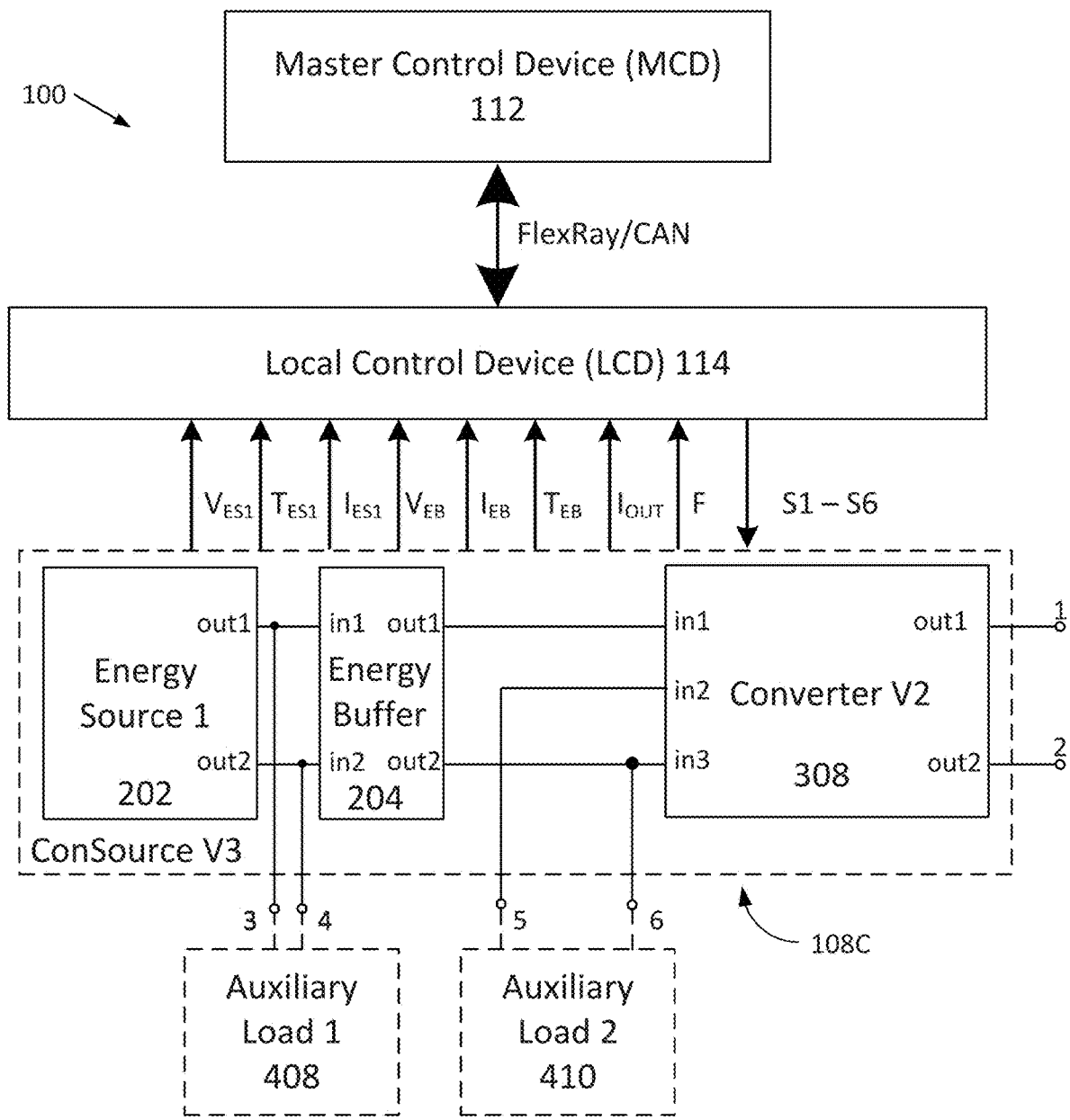
FIG. 4 is a block diagram depicting another example embodiment of a converter-source module (ConSource V3) with an LCD interconnected to an MCD and optional auxiliary loads, according to embodiments of the present disclosure.

FIGS. 2-4 depict example embodiments of converter-source modules 108, or ConSource modules, within system 100 as depicted in FIG. 1B, with one local control device 114 per ConSource module. The embodiments of FIGS. 2-4 and any and all other embodiments described herein can be implemented in accordance with the configurations of FIGS. 1A-1C unless otherwise noted.

ConSource modules 108 can be implemented as voltage converters or current converters. For ease of description, the embodiments described herein are done so with reference to voltage converters, although the embodiments are not limited to such.

FIG. 2 is a block diagram depicting an example embodiment of a ConSource module 108A within system 100. This embodiment of ConSource module 108A may be referred to herein as version 1 of an example ConSource module (ConSource V1) and is an example of a type of converter-source module 108. Also shown is a local control device 114 (LCD) and a master control device 112 (MCD). ConSource V1 108A is communicatively coupled with the LCD 114, which in turn is communicatively coupled with the MCD 112.

The ConSource V1 108A includes an energy source 202 (Energy Source 1), which can include one or more energy storage elements. Energy Source 1 can be, for example, one of the following, but not limited to, an ultra-capacitor 600 (FIG. 6A), a battery module 610 including at least one cell or multiple battery cells connected in series and/or in parallel (FIG. 6B), or fuel, a fuel-cell, or fuel cell module 620 (FIG. 6C).

Figure 7A:
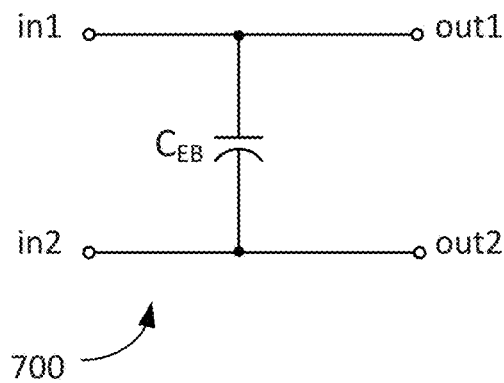
FIGS. 7A, 7B and 7C are schematics depicting of example embodiments for use as the energy buffer shown in FIGS. 1, 2 and 3, according to embodiments of the present disclosure.
Figure 7B:
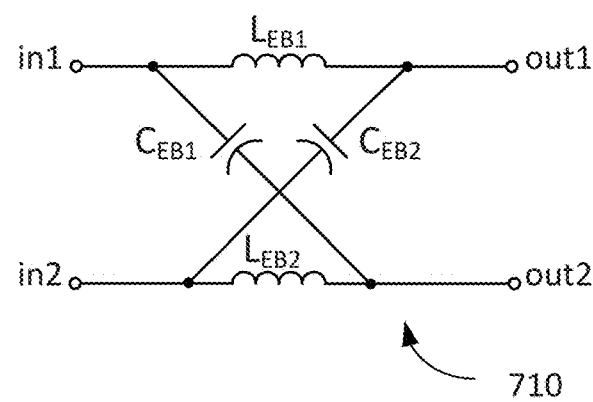
Figure 7C:
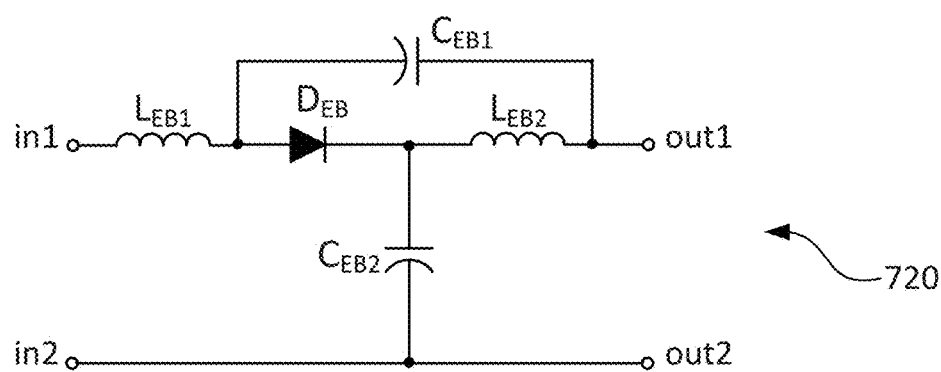

The outputs out1 and out2 of Energy Source 1 can be connected to input terminals in1 and in2 of an Energy Buffer, respectively, which can include, for example, one of the following, but not limited to, elements and topologies based on: an electrolytic and/or film capacitor CEB 700 (FIG. 7A), a Z-source network 710, formed by two inductors LEB1 and LEB2 and two electrolytic and/or film capacitors CEB1 and CEB2 (FIG. 7B), a Quasi Z-source network 720, formed by two inductors LEB1 and LEB2, two electrolytic and/or film capacitors CEB1 and CEB2 and a diode DEB (FIG. 7C). A choice of specific topology and components of Energy Buffer depends on a maximum permissible amplitude of high frequency voltage pulsations on output terminals out1 and out 2 of the Energy Buffer. These pulsations can degrade the performance of the ConSource module 108, thus they can be efficiently buffered by designing suitable elements and topologies as a basis thereof.

Figure 5A:
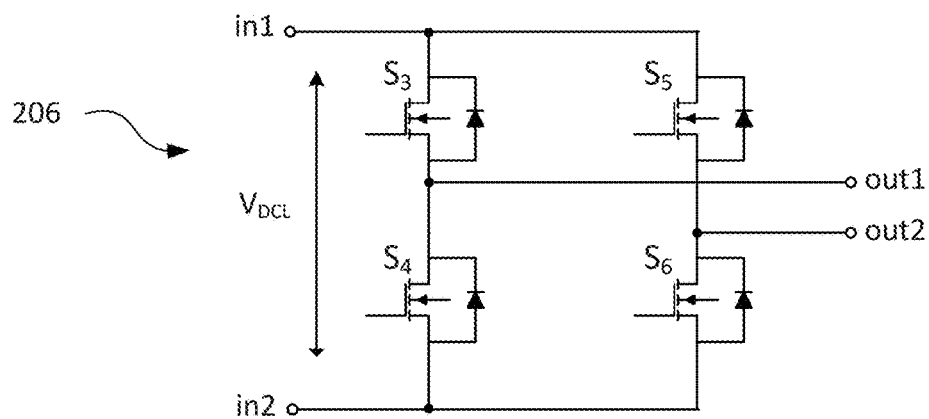
FIG. 5A is a schematic depicting an example embodiment of a converter (Converter V1) shown in FIG. 2, according to embodiments of the present disclosure.

The outputs out1 and out2 of the Energy Buffer are connected respectively to the inputs in1 and in2 of a Converter V1. A schematic representation of an example embodiment of a converter V1 206 is shown in FIG. 5A. In many embodiments, the Converter V1 206 can include at least four switches S3, S4, S5, S6, which can be configured as semiconductor switches, such as metal-oxide-semiconductor field-effect transistors or MOSFETs (as shown in FIG. 4). Another switch example is an insulated-gate bipolar transistor or IGBT. Semiconductor switches can be operated at relatively high switching frequencies, thereby permitting the Converter V1 to be operated in pulse-width modulated mode if desired, and to respond to control commands within a relatively short interval of time. This can provide a high tolerance of output voltage regulation and fast dynamic behavior in transient modes.

In this embodiment, Converter V1 206 generates three different voltage outputs, +VDCL, 0, and −VDCL by connecting the DC line voltage VDCL, between its terminals in1 and in2, to its output terminals out1 and out2 by different combinations of switches S3, S4, S5, S6. To obtain +VDCL, switches S3 and S6 are turned on, whereas −VDCL can be obtained by turning on the switches S4 and S5. By turning on S3 and S5 or S4 and S6, the output voltage is set to zero or a reference voltage.

Figure 9:
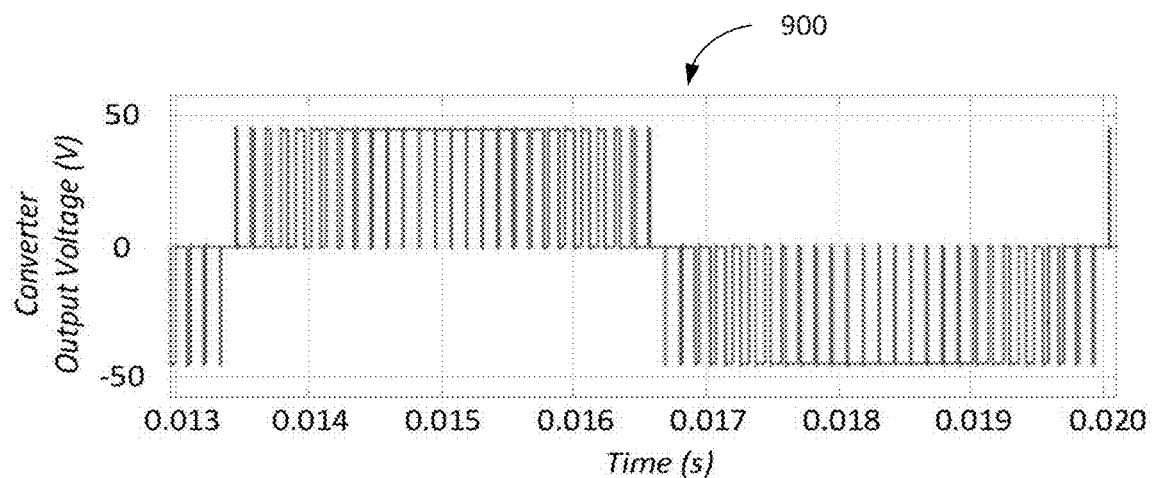
FIG. 9 is a graph depicting the output voltage from an example converter according to embodiments of the present disclosure.

The control switching signals for semiconductor switches S3, S4, S5, S6 may be generated in different ways depending on the flexibility and requirements of the adopted control technique in the LCD and MCD (shown in FIG. 2). One approach is to use space vector pulse-width modulation SVPWM or sinusoidal pulse-width modulation SPWM, or variations thereof, to generate the output voltage of Converter V1. An example of an output voltage waveform 900 of a Converter V1 is shown in FIG. 9. The modulation method also depends on which version of system 100 to which it is applied and one possible solution of modulation will be presented herein further as an example.

In some embodiments using pulse width modulation, the LCD (and not the MCD) generates the switching signals for the switches in the ConSource module. In some embodiments, such as those using hysteresis, generation of the switching signals can be performed by the MCD. The LCD 114 shown in FIG. 2 can be connected to ConSource V1 108A via a set of diagnostics, measurement, protection and control signal lines, and can perform one or more of three primary functions. The first function is management of Energy Source 1. The second function is protection of the Energy Buffer and more specifically it's components from over-current, over-voltage and high temperature conditions. The third function is control and protection of Converter V1 206.

In one example embodiment, the function of management, by the LCD 114, of Energy Source 1 for ConSource V1 module 108A is as follows. The LCD 114 accepts the measurement signals VES1, TES1, IES1, which are: VES1—the voltages of at least one of the, preferably all, elementary components of Energy Source 1 or the voltages of groups of elementary components, such as, for example and not limited to, battery cells (individual or connected in series and/or in parallel), ultra-capacitor cells (individual, or connected in series and/or in parallel); TES1—the temperatures of at least one of, preferably all, elementary components of Energy Source 1 or the temperatures of groups of elementary components; IES1—the output current of Energy Source 1. Based on these measurement signals the LCD 114 can perform one or more of the following: calculation or determination of a real capacity, actual State of Charge (SOC) and State of Health (SOH) of the elementary components or groups of elementary components; set a warning or alarm signal, based on measured and/or calculated data; and/or transmission of corresponding signals to the MCD 112.

In one example embodiment, the function of protection, by the LCD, of the Energy Buffer 204 for ConSource V1 module 108A is as follows. The LCD 114 accepts the measurement signals VEB, TEB, IEB, which are: VEB—the voltages of at least one major component of the Energy Buffer, for example and not limited to, capacitor CEB, or capacitors CEB1, CEB2 (see FIGS. 7A-7C); TEB—the temperature of at least one component of the Energy Buffer; and/or IEB—the current through at least one component of the Energy Buffer. Based on these measurement signals, the LCD 114 can perform the following: setting of a warning or alarm signal based on measured data; and/or transmission of corresponding warning or alarm signals to the MCD 112.

In one example embodiment, the function of control and protection, by the LCD 114, of the Converter V1 206 for ConSource V1 module 108A is as follows. The LCD can receive the command signals from the MCD (e.g., over FlexRay or CAN), which in some embodiments can be a modulation reference signal and an enable signal, or a reference signal and a modulation index, which can be used with a pulse width modulation technique in the LCD to generate the control signals for semiconductor switches S3, S4, S5, S6. The current feedback signal IOUT (not shown in FIG. 2) coming from an integrated current sensor of Converter V1 206 can be used for overcurrent protection together with one or more signals F, coming from driver circuits (not shown in FIG. 2) of the switches of Converter V1 206, which can carry information about failure statuses (e.g., short circuit or open circuit failure modes) of all switches in Converter V1. Based on this data, the LCD can make a decision on which combination of switching signals to be applied to corresponding semiconductor switches S3, S4, S5, S6 to bypass or to disconnect the Converter V1 and the entire ConSource V1 module 108A from system 100. (A switching signals for a particular switch can turn that switch on or off.)

FIG. 3 is a block diagram depicting another example embodiment of a ConSource module 108B that may be referred to herein as version 2 of the ConSource module (ConSource V2) and is an example of a type of converter-source module 108. ConSource V2 108B is communicatively coupled with the LCD114, which in turn is communicatively coupled with the MCD 112.

In this embodiment, the ConSource V2 108B is in a dual energy source configuration with a primary Energy Source 1 202 and secondary Energy Source 2 304. Energy Source 1 202 can include, for example, one of the following, but not limited to, an ultra-capacitor or super-capacitor 600 (FIG. 6A), a battery module 610 (FIG. 6B) including at least one cell or plurality of battery cells connected in series and/or in parallel, and fuel, a fuel-cell, or a fuel-cell module 620 (FIG. 6C).

The outputs out1 and out2 of Energy Source 1 202 can be connected to input terminals in1 and in2 of an Energy Buffer 204, respectively, which can include, for example, one of the following, but not limited to, elements and topologies based on: an electrolytic and/or a film capacitor CEB 700 (FIG. 7A), a Z-source network 710, formed by two inductors LEB1 and LEB2 and two electrolytic and/or film capacitors CEB1 and CEB2 (FIG. 7B), a Quasi Z-source network 720, formed by two inductors LEB1 and LEB2, two electrolytic and/or film capacitors CEB1 and CEB2 and a diode DEB (FIG. 7C). The outputs out1 and out2 of Energy Buffer 204 are connected respectively to the inputs in1 and in3 of Converter V2 308.

Figure 8A:
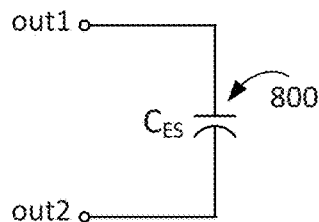
FIGS. 8A, 8B, 8C, 8D, 8E, and 8F are diagrams depicting example embodiments for use as energy source 2 shown in FIG. 3, according to embodiments of the present disclosure.
Figure 8B:
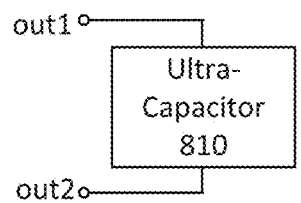
Figure 8C:
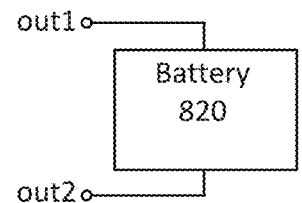
Figure 8D:
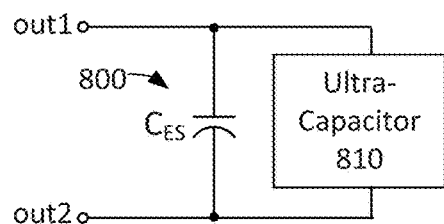
Figure 8E:
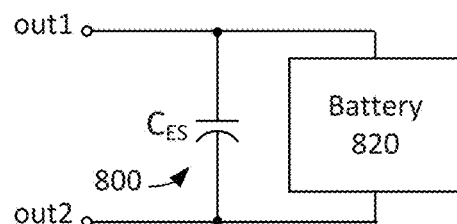
Figure 8F:
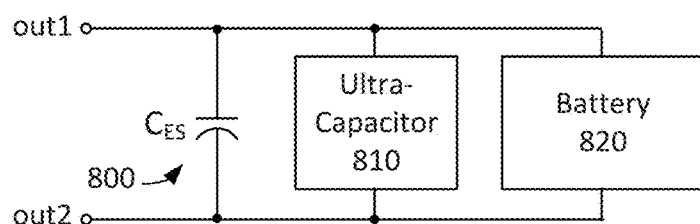

The output out2 of the Energy Buffer 204 can be connected also to the output out2 of Energy Source 2 304. Another output of Energy Source 2, out1, is connected to input in2 of Converter V2 308. The Energy Source 2 can include, for example, one of the following, but not limited to, storage elements such as: an electrolytic and/or a film capacitor CEB 800 (FIG. 8A); an ultra-capacitor or a super-capacitor 810 (FIG. 8B); a battery module 820 including at least one cell or plurality of battery cells connected in series and/or in parallel (FIG. 8C); an electrolytic and/or a film capacitor CEB 800 connected in parallel with an ultra-capacitor or super-capacitor 810 (FIG. 8D); an electrolytic and/or a film capacitor CEB 800 connected in parallel with battery module 820, including at least one cell or plurality of battery cells connected in series and/or in parallel (FIG. 8E); an electrolytic and/or a film capacitor CEB 800 connected in parallel with an ultra-capacitor (or super-capacitor) 810 and a battery module 820, including at least one cell or plurality of battery cells connected in series and/or in parallel (FIG. 8F).

Figure 5B:
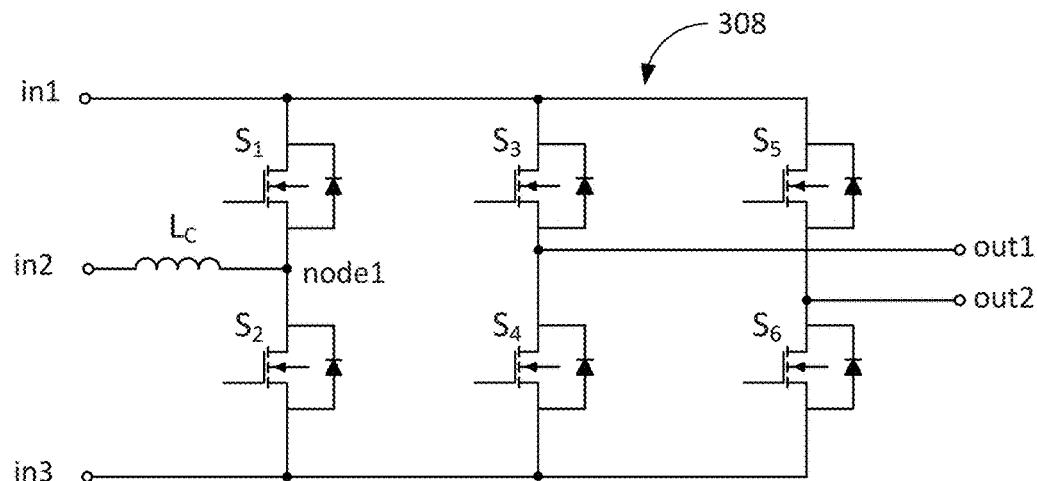
FIG. 5B is a schematic depicting an example embodiment of a converter (Converter V2) shown in FIGS. 2 and 3, according to embodiments of the present disclosure.

A simplified schematic representation of example embodiment of a Converter V2 308 is shown in FIG. 5B. Here, the Converter V2 308 includes six switches S1, S2, S3, S4, S5, S6, which can be configured as semiconductor switches, such as e.g. MOSFETs (as shown in FIG. 5B) or IGBTs. Semiconductor switches can be operated at high switching frequency, thereby permitting the Converter V2 308 to be operated in pulse-width modulated mode if required, and to respond to the control commands within a short interval of time, providing a high tolerance of output voltages regulation and fast dynamic behavior in transient modes.

The left-hand side of the Converter V2 308 includes two switches S1 and S2, and can generate two different voltages at Node 1, which are +VDCL and 0, referenced to input In3, which can be at virtual zero potential. The coupling inductor $L_C$ is connected between input In3 and Node 1. The output out1 of Energy Source 2 is connected to coupling inductor LC at the input In 3 of Converter V2 308. The current consumed from or generated to Energy Source 2 304 can be controlled by regulating the voltage on coupling inductor $L_C$, using, for example, a pulse-width modulation technique or a hysteresis control method for commutating switches S1 and S2. Other techniques can be used as well.

The right-hand side of Converter V2 308 includes four switches S3, S4, S5, S6, and is capable of generating three different voltage outputs, +VDCL, 0, and −VDCL by connecting the DCL-voltage VDCL between terminals in1 and in2 to the output terminals out1 and out2 by different combinations of switches S3, S4, S5, S6. To obtain +VDCL voltage between out1 and out2, switches S3 and S6 are turned on, whereas −VDCL voltage between out1 and out2 can be obtained by turning on switches S4 and S5. By turning on S3 and S5 or S4 and S6, the output voltage is set to zero or a reference potential.

The control switching signals for semiconductor switches S3, S4, S5, S6 may be generated in different ways depending on the flexibility and requirements of the adopted control technique in the LCD 114 and the MCD 112. One approach is to use pulse width modulation, such as space vector pulse-width modulation (SVPWM) or sinusoidal pulse-width modulation (SPWM), including additional variations of thereof, to generate the output voltage of Converter V2. A typical output voltage waveform 900 of Converter V2 308 is shown in FIG. 9. The modulation method also depends on which version of ACi-battery pack it is applied to and one possible solution of modulation will be presented further as an example.

In this example ConSource V2 module 108B, Energy Source 1 202 acts as a primary energy source and therefore supplies the average power needed by the load. Energy Source 2 304 can be a secondary energy source with the function of assisting Energy Source 1 by providing additional power at load power peaks, or absorbing excess power.

Figure 10:
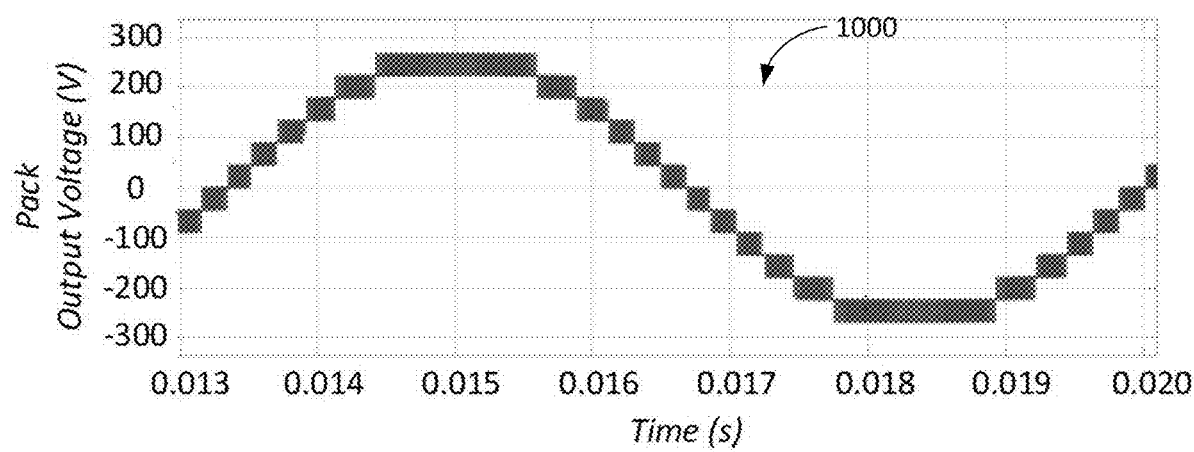
FIG. 10 is a graph depicting the output voltage from an example module-based energy storage system having six example converter-source modules, according to embodiments of the present disclosure.

FIG. 10 shows the output voltage waveform 1000 from an example module-based energy storage system having six example converter-source modules.

Figure 11:
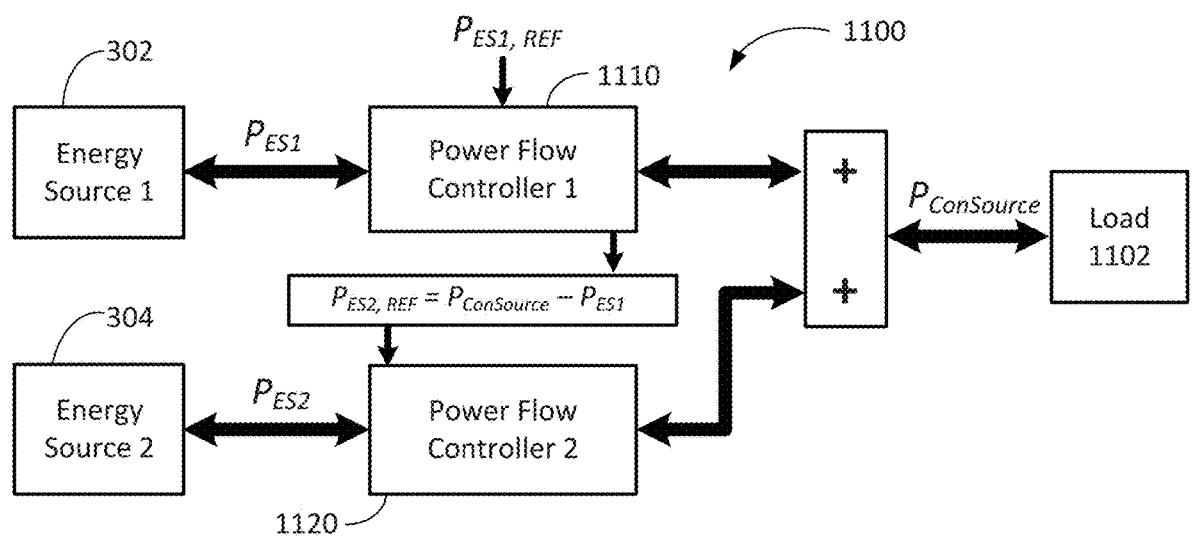
FIG. 11 is a block diagram depicting an example embodiment of power flow management for the example converter-source module (ConSource V2) shown in FIG. 3, according to embodiments of the present disclosure.

FIG. 11 is a block diagram depicting an example embodiment of power flow management 1100 between two Energy Sources (Energy Source 1 202 and Energy Source 2 304) and a load for an example embodiment of a ConSource V2 module 108B. The load can be, for example, but not limited to, a single phase of an electric vehicle motor or an electrical grid. This embodiment allows a complete decoupling between the electrical characteristics (terminal voltage and current) of each energy source and those of the load 1102.

In these embodiments, Power Flow Controller 1 1110 and Power Flow Controller 2 1120 can be discrete control devices, separate from the LCD 114 and MCD 112, can be implemented as software within the LCD, can be implemented as hardware within the LCD, or can be implemented as a combination of hardware and software within the LCD. In some embodiments, the functions of Power Flow Controller 1 1110 and Power Flow Controller 2 1120 can be shared or distributed between the LCD 114 and MCD 112.

Power Flow Controller 1 1110 can receive a signal of reference power flow of Energy Source 1 (PER, REF) from the LCD 114. This signal can be determined by a main Power Management Controller located in the MCD 112 based on motor power or electrical grid power requirements and a status of Energy Source 1 202 of the ConSource V2 module 108B. Power Flow Controller 1 1110 can estimate a maximum allowable charge and/or discharge current of Energy Source 1 202 and calculate a real permissible power flow ($P_{ES1}$) of Energy Source 1. This value can be compared with $P_{CONSOURCE}$ and the difference can be applied to Power Flow Controller 2 1120 as a signal ($P_{ES2, REF}$). Power Flow Controller 2 1120 can calculate the reference current in coupling inductor $L_C$ based on the voltage between output terminals out1 and out2 of Energy Source 2 304 and determines the switching signals for switches S1 and S2 of Converter V2 308, using, for example, but not limited to pulse-width modulation or hysteresis control algorithms. Thus, the total power flow ($P_{CONSOURCE}$) can be provided by the switching portion of Converter V2 that includes switches S3, S4, S5, S6. The power flow of Energy Source 1 202 ($P_{ES1}$) can be estimated based on a maximum permissible current of Energy Source 1 and actual conditions of Energy Source 1, such as, but not limited to, State of Charge (SOC), State of Health (SOH), temperature of elementary cells or a group of parallel and/or series connected cells, equivalent series resistance, and the like. The power flow ($P_{ES1}$) can be maintained as a difference between current values of the load ($P_{LOAD}$) and energy source 2 ($P_{ES2}$), where $P_{ES2}$ is managed by the switching portion of Converter V2 308 that includes switches S1, S2 and the coupling inductor LC.

In many embodiments, Energy Source 2 304 can be a secondary energy source and its function is to assist Energy Source 1 by providing power at load power peaks and/or absorbing excess power. A secondary function of Energy Source 2 304 can be active filtering, such as to reduce (attenuate) or eliminate any second-order current harmonic that appears in the current IDC_CONV flowing at the inputs in1 and in3 of the Converter V2 as a result of, e.g., the intrinsic pulsating power nature of a single-phase system. This harmonic can have a considerable peak-to-peak value, which can reach up to two times the load current amplitude. The second-order current component exhibits some disadvantages, e.g., increase of the inner losses in the Energy Source 1 202 related to the resulting current RMS value. To perform this secondary function, Energy Source 2 304 can include an electrolytic capacitor or an ultra-capacitor (or super-capacitor) as standalone components, or connected in parallel with other energy storage elements as shown in FIGS. 8A, 8B, and 8D-8F.

Figure 12A:
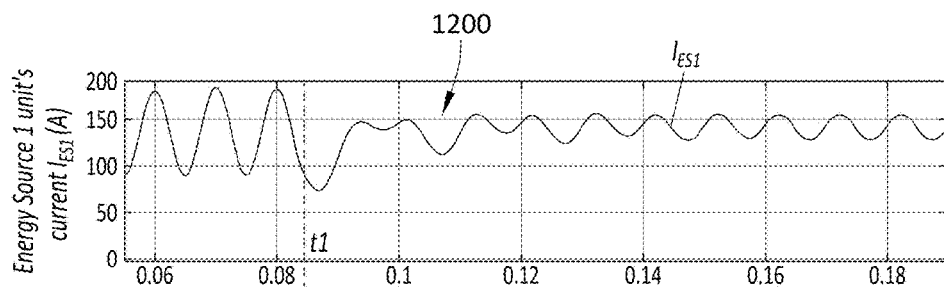
FIGS. 12A and 12B are graphs depicting example waveforms of a converter-source (ConSource V2) module shown in FIG. 3, in which the converter V2 provides a secondary function of reduction of a second order current harmonic.
Figure 12B:
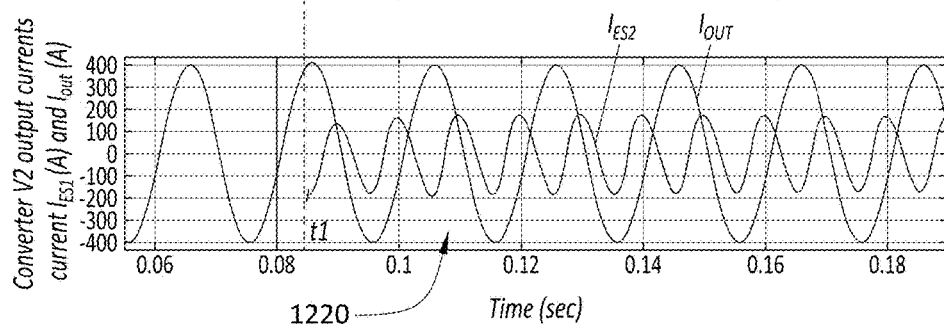

FIGS. 12A and 12B show examples of waveforms 1200, 1220 occurring before and during performance this active filtering secondary function. Before the compensations starts (before time moment $t_1$), the current of Energy Source 1 202 (FIG. 12A) includes a DC-component (IDC=130 A) and a second order harmonic component with an amplitude I2AC=60 A. The high frequency harmonics (not shown) that are determined by the switching behavior of Converter V2 308 are efficiently buffered by the Energy Buffer 204. Starting from the time moment $t_1$, the Converter V2 starts generating current $I_{ES2}$, redirecting the second order harmonic of current $I_{ES1}$ to Energy Source 2. This current $I_{ES2}$ has an amplitude of main harmonic equal to that of the second order harmonic of $I_{ES1}$ current, but with nearly opposite phase angle, in such a way that the resulting current in Energy Source 1 $I_{ES1}$ includes either DC-component only or mostly DC-component with some significantly reduced AC-ripples, as shown in FIG. 12A. In a case where only the secondary function is performed by Converter V2, and if the Energy Source 2 includes only a capacitor and/or a super-capacitor 810, the current $I_{ES2}$ (FIG. 12B) may include a DC component which is needed to be supplied from the load or from Energy Source 1 202 to maintain the voltage on the capacitor and/or the super-capacitor 810 of Energy Source 2 304 at set value, which is required for correct operation of Converter V2 308.

Both primary and secondary functions performed by Converter V2 and described above can be performed either separately or at the same time. If at the same time, the Energy Source 2 304 preferably includes an electrolytic capacitor or ultra-capacitor 810 connected in parallel with other energy storage elements as shown in FIGS. 8A, 8B, and 8D-8F.

The LCD 114 for ConSource V2 module is shown in FIG. 3 connected to ConSource V2 module 108B via a set of diagnostics, measurement, protection and control signal lines, and can perform at least one of, preferably all of, four major functions. The first function is management of Energy Source 1 202. The second function is management of Energy Source 2 304. The third function is protection of the Energy Buffer 204 and more specifically its components from over-current, over-voltage and high temperature. The fourth function is control and protection of Converter V2 308.

The function of management of Energy Source 1 for ConSource V2 module 108B can be as follows. The LCD 114 accepts the measurement signals VES1, TES1, IES1, which are: VES1—the voltages of all elementary components/cells of Energy Source 1 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of Energy Source 1. Based on these measurement signals LCD can perform the following: calculates a real capacity, actual State of Charge (SOC) and State of Health (SOH) of the elementary components or groups of elementary components; set a warning or alarm signal based on measured and calculated data; transmission of corresponding signals to the MCD 112.

The function of management of Energy Source 2 304 for ConSource V2 module 108B can be as follows. The LCD 114 can receive the measurement signals VES2, TES2, IES2, which are: VES2—the voltages of all elementary components or cells of Energy Source 2 or the voltages of groups of elementary components or cells, such as, for example and not limited to, battery cells, individually or connected in series and/or in parallel, ultra-capacitor cells, individually or connected in series and/or in parallel; TES2—the temperatures of all elementary components of Energy Source 2 or the temperatures of groups of elementary components; IES2—the output current of Energy Source 2. Based on these measurement signals, the LCD can perform the following: calculates a real capacity, actual State of Charge (SOC) and State of Health (SOH) of the elementary components or groups of elementary components; set a warning or alarm signal, based on measured and calculated data; and/or communicated corresponding signals to the MCD.

The function of protection of Energy Buffer for ConSource V2 module 108B can be as follows. The LCD 114 receives the measurement signals VEB, TEB, IEB, which are: VEB—the voltages of at least one major component of Energy Buffer, for example and not limited to, capacitor CEB, or capacitors CEB1, CEB2 (see FIGS. 7A-7C); TEB—the temperature of at least one major components of Energy Buffer; and/or IEB—the current through at least one major components of Energy Buffer. Based on these measurement signals LCD can perform the following: set a fault (e.g., warning or alarm) signal based on measured data; and/or transmit corresponding fault signals to the MCD 112.

The function of control and protection of Converter V2 308 for ConSource V2 module 108B can be as follows. The LCD 114 receives the command signals from the MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, IOUT coming from the integrated current sensors (not shown in FIG. 3) of Converter V2 can be used for overcurrent protection together with signals F, for example, coming from driver circuits (not shown in FIG. 3), of semiconductor devices of Converter V2 308, which carry the information about failure statuses (e.g., short circuit or open circuit failure mode) of one or more, preferably all, of the semiconductor switches. Based on this specific data, the LCD 114 can make a decision on which combination of switching signals S1, S2, S3, S4, S5, S6 to be applied to the corresponding semiconductor switches to bypass or disconnect the Converter V2 and the entire ConSource V2 module from system 100 (e.g., the battery pack, etc.).

FIG. 4 is a block diagram depicting an example embodiment of a ConSource module 108C, referred to as version 3 of the ConSource module (ConSource V3) and is an example of a type of converter-source module 108. ConSource V3 108C is communicatively coupled with the LCD 114, which in turn is communicatively coupled with the MCD 114.

The ConSource V3 module 108C can include an energy source Energy Source 1 202 and Converter V2 308 with an additional input for connection of an Auxiliary Load 2 410, if desired, as shown in FIG. 4. The ConSource V3 module 108C has output ports 1 and 2 for connection with other ConSource (e.g., V1/V2/V3) modules within an example system 100. The illustrated output ports 3 and 4 of ConSource V3 are used for connection of the example ConSource V3 module to the same output ports of other ConSource V3 modules of an example system 100, if needed, and/or for connection to an Auxiliary Load 1 408, if desired, as shown in FIG. 4. The illustrated output ports 5 and 6 of ConSource V3 108C are used for connection of the example ConSource V3 module to the same output ports of other ConSource V3 modules of an example system 100, if needed, and/or for connection to an Auxiliary Load 2 410, if desired, as shown in FIG. 4.

Figure 6A:
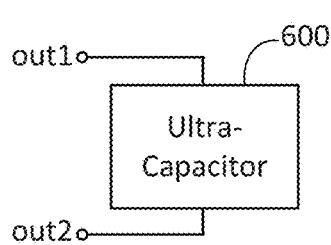
FIGS. 6A, 6B and 6C are diagrams depicting example embodiments of energy storage elements for use as an energy source shown in FIGS. 1, 2 and 3, according to embodiments of the present disclosure.
Figure 6B:
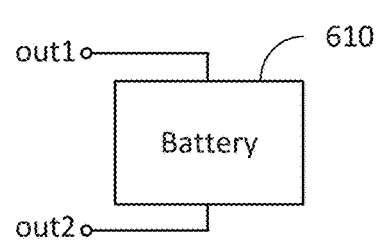
Figure 6C:
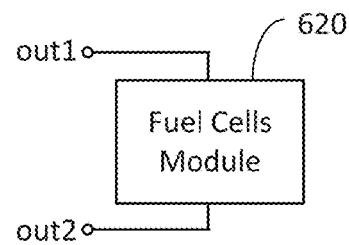

Energy Source 1 can include, for example, one of the following, but not limited to, storage elements according to FIG. 6: an ultra-capacitor or super-capacitor 600 (FIG. 6A), a battery module 610 including at least one cell or plurality of battery cells connected in series and/or in parallel (FIG. 6B), and fuel, a fuel-cell, or a fuel-cell module 620 (FIG. 6C).

The outputs out1 and out2 of Energy Source 1 202 are connected to input terminals in1 and in2 of the Energy Buffer 204, respectively, which can include, for example, one of the following, but not limited to, elements and topologies based on: an electrolytic and/or a film capacitor CEB 700 (FIG. 7A), a Z-source network 710, formed by two inductors LEB1 and LEB2 and two electrolytic and/or film capacitors CEB1 and CEB2 (FIG. 7B), a Quasi Z-source network 720, formed by two inductors LEB1 and LEB2, two electrolytic and/or film capacitors CEB1 and CEB2 and a diode DEB (FIG. 7C). The outputs out1 and out2 of Energy Buffer 204 are connected respectively to the inputs in1 and in3 of Converter V2 308.

A simplified schematic representation of Converter V2 308 is shown in FIG. 5B. The Converter V2 includes six switches S1, S2, S3, S4, S5, S6, which can be configured as semiconductor switches, such as e.g. MOSFETs (as shown in FIG. 5B), JFETs or IGBTs. The left-hand side of the Converter V2 includes two switches S1 and S2 that can generate two different voltages at Node 1, which are +VDCL and 0, referenced to input In3, which is at virtual zero potential. The coupling inductor $L_C$ is connected between input In3 and Node 1. The output of coupling inductor $L_C$ is connected through input In2 of Converter V2 308 to port 5 of ConSource V3 module 108C and to optional Auxiliary Load 2 410 as shown in FIG. 4. It is assumed that Auxiliary Load 2 has an input capacitor, so the Converter V2 308 can regulate and stabilize the required constant voltage on the load regulating the voltage on and current through coupling inductor LC.

The right-hand side of the Converter V2 308 includes four switches S3, S4, S5, S6, and can generate three different voltage outputs, +VDCL, 0, and −VDCL by connecting the DCL-voltage VDCL between terminals in1 and in2 to the output terminals out1 and out2 by different combinations of switches S3, S4, S5, S6. To obtain +VDCL voltage between out1 and out2, switches S3 and S6 are turned on, whereas −VDCL voltage between out1 and out2 can be obtained by turning on switches S4 and S5. By turning on S3 and S5 or S4 and S6, the output voltage is set to zero or a reference potential.

The control switching signals for semiconductor switches S3, S4, S5, S6 may be generated in different ways depending on the flexibility and requirements of the adopted control technique in the LCD 114 and the MCD 112.

Figure 13:
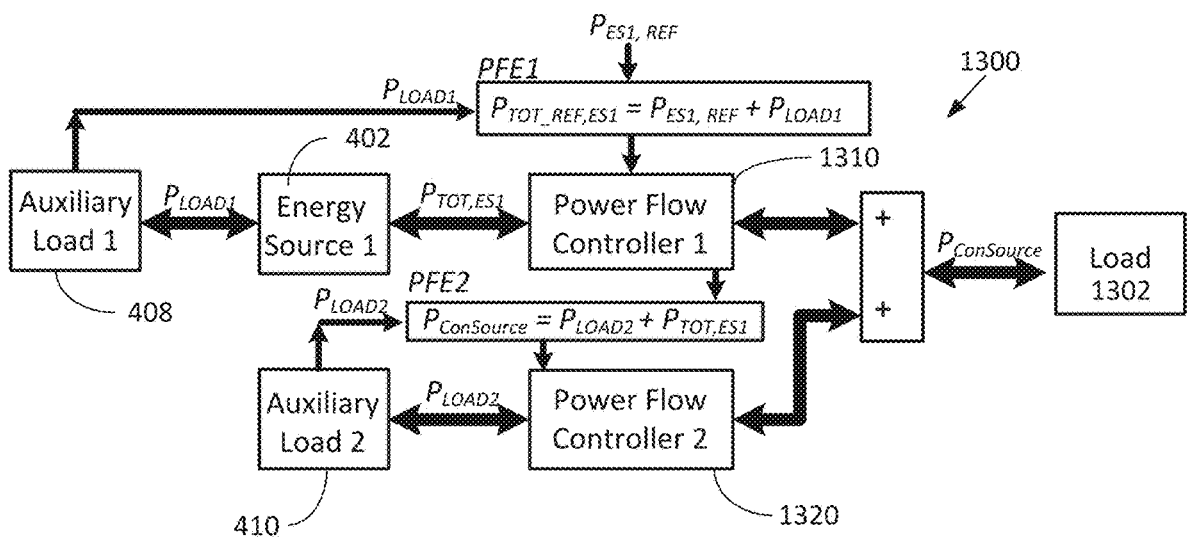
FIG. 13 is a block diagram depicting an example embodiment of power flow management for the converter-source (ConSource V3) module shown in FIG. 4, according to embodiments of the present disclosure.

Energy Source 1 202 can supply the corresponding part of power needed by the load of system 100, Auxiliary Load 1 408 and/or Auxiliary Load 2 410, if connected. FIG. 13 shows an example of power flow management for a Con-Source V3 module, where power flow between Energy Source 1, Auxiliary Load 1, and Auxiliary Load 2 can be adjusted. Examples of auxiliary loads can be, for example, an on-board electrical network of an electric vehicle, an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

In these embodiments, referring to FIG. 13, Power Flow Controller 1 1310 (PFC 1), Power Flow Controller 2 1320 (PFC 2), Power Flow Estimator 1 (PFE 1), and Power Flow Estimator 2 (PFE 2) can be discrete control devices, separate from the LCD 114 and MCD 112, can be implemented as software within the LCD, can be implemented as hardware within the LCD, or can be implemented as a combination of hardware and software within the LCD. In some embodiments, the functions of PFC 1, PFC 2, PFE 1, and PFE 2 can be shared or distributed between the LCD and MCD.

PFE 1 can receive a signal of reference power flow of Energy Source 1 202 $P_{ES1,\ REF}$ from the LCD 114. This signal can be determined by a main Power Management Controller located in the MCD 112 based on load power requirements and status of Energy Source 1 of this specific ConSource V3 module 108C. PFE1 can also receive the signal $P_{LOAD1}$, determined by power consumption and/or generation of Auxiliary Load 1 408 and obtained in power calculation block (not shown in FIG. 13), based on the current in Auxiliary Load 1 (e.g., measured by a current sensor which can be integrated in ConSource V3 module or received by the LCD directly from Auxiliary Load 1). The total reference power flow for Energy Source 1 202 $P_{TOT\_REF\_ES1}$ can be a sum of $P_{ES1,\ REF}$ and $P_{LOAD1}$. PFC 1 1310 can estimate a maximum allowable charge and/or discharge current of Energy Source 1 and calculate a real permissible power flow $P_{TOT,ES1}$ of Energy Source 1.

PFE 2 1320 can receive a signal of total power flow of Energy Source 1 $P_{TOT,ES1}$ from PFC 1. PFE2 can receive also the signal $P_{LOAD2}$, determined by power consumption and/or generation of Auxiliary Load 2 and obtained in a power calculation block (not shown in FIG. 13), based on the current in Auxiliary Load 2 (e.g., measured by a current sensor, which can be integrated in ConSource V3 module or received by the LCD directly from Auxiliary Load 2). The total reference power flow for ConSource V3 module with two Auxiliary loads $P_{CONSOURCE}$ can be the sum of $P_{LOAD2}$ and $P_{TOT,ES1}$. The total $P_{CONSOURCE}$ power flow is provided by the switching portion of the Converter V2, which includes switches S3, S4, S5, S6. The power flow $P_{LOAD2}$ can be managed by the switching portion of Converter V2 that includes switches S1, S2 and coupling inductor $L_C$.

The LCD 114 for ConSource V3 module 180C is shown in FIG. 4. It can be connected to ConSource V2 module 108B via a set of diagnostics, measurement, protection and control signal lines, and can perform at least one of, preferably all of, four major functions. The first function can be management of Energy Source 1 202. The second function can be management of Auxiliary Load 2 410. The third function can be protection of the Energy Buffer 204 and more specifically its components from over-current, over-voltage and high temperature. The fourth function can be control and protection of Converter V1.

In some example embodiments, the function of management of Energy Source 1 202 for ConSource V3 module 108C can be as follows. The LCD 114 accepts the measurement signals VES1, TES1, IES1, which are: VES1—the voltages of all elementary components/cells of Energy Source 1 202 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of Energy Source 1. Based on these measurement signals LCD can perform the following: calculates a real capacity, actual State of Charge (SOC) and State of Health (SOH) of the elementary components or groups of elementary components; set a warning or alarm signal based on measured and calculated data; transmission of corresponding signals to the MCD.

The function of management of Auxiliary Load 2 410 for ConSource V3 module 108C can be as follows. The LCD receives the measurement signals VAL2, IAL2, which are: VAL2—the voltage between ports 5 and 6 of ConSource V3 module, and IAL2—the current in coupling inductor LC of Converter V2, which is a current of Auxiliary Load 2. Based on these signals the LCD performs a correction of the reference signal for pulse width modulation in the LCD to stabilize and/or to control the voltage on Auxiliary Load 2.

The function of protection of Energy Buffer 204 for ConSource V3 module 108C can be as follows. The LCD can receive the measurement signals VEB, TEB, IEB, which are: VEB—the voltages of at least one major component of Energy Buffer, for example and not limited to, capacitor CEB, or capacitors CEB1, CEB2 (see FIGS. 7A-7C); TEB—the temperature of at least one major components of Energy Buffer; IEB—the current through at least one major components of Energy Buffer. Based on these measurement signals LCD can perform the following: set a fault (e.g., warning or alarm) signal based on measured data; and/or transmit corresponding fault signals to the MCD.

The function of control and protection of Converter V2 308 for ConSource V3 module 108C can be as follows. The LCD 114 receives the command signals from the MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, IOUT coming from integrated current sensors of Converter V2 (not shown in FIG. 4) can be used for overcurrent protection together with one or more signals F, coming from driver circuits (not shown in FIG. 4), of semiconductor devices of Converter V2, which carry the information about failure statuses (e.g., short circuit or open circuit failure mode) of one or more, preferably all, of the semiconductor switches. Based on this specific data, the LCD can make a decision on which combination of switching signals S1, S2, S3, S4, S5, S6 to be applied to the corresponding semiconductor switches to bypass or disconnect the Converter V2 308 and the entire ConSource V3 module from system 100 (e.g., the battery pack, etc.).

One example of a ConSource module is a converter-battery module having a battery as the first energy source. A converter-battery module can be referred to as a ConBatt module. A ConBatt module can be used in, e.g., a battery pack of a mobile application such as an electric vehicle (EV). System 100, configured for use as a battery pack with a plurality of ConBatt modules, can be referred to as a ConBatt pack.

In other example embodiments, the ConSource modules can connect with additional sources of electrical power, such as photovoltaic panels and/or a wireless charging receiver. In other example embodiments, system 100 can connect to another system 100 (e.g., another ConBatt pack) coupled with other auxiliary loads of different voltage levels, such as, e.g., an EV's on-board electrical network system and air-conditioner.

Example Embodiments of Module Arrangements for Module-Based Systems

FIGS. 15-29 depict example embodiments of system 100 arranged according to various architectures or configurations. In these embodiments system 100 is referred to as a ConSource pack, although the embodiments are not limited to packs. For ease of illustration, the MCD and the LCDs in each embodiment are not shown. As can be seen, the modules can be arranged in numerous ways such that the power contributed by each module can be summed to form one or more of, e.g., a single phase AC output, multiple phases of AC outputs, and a DC output.

Figure 15:
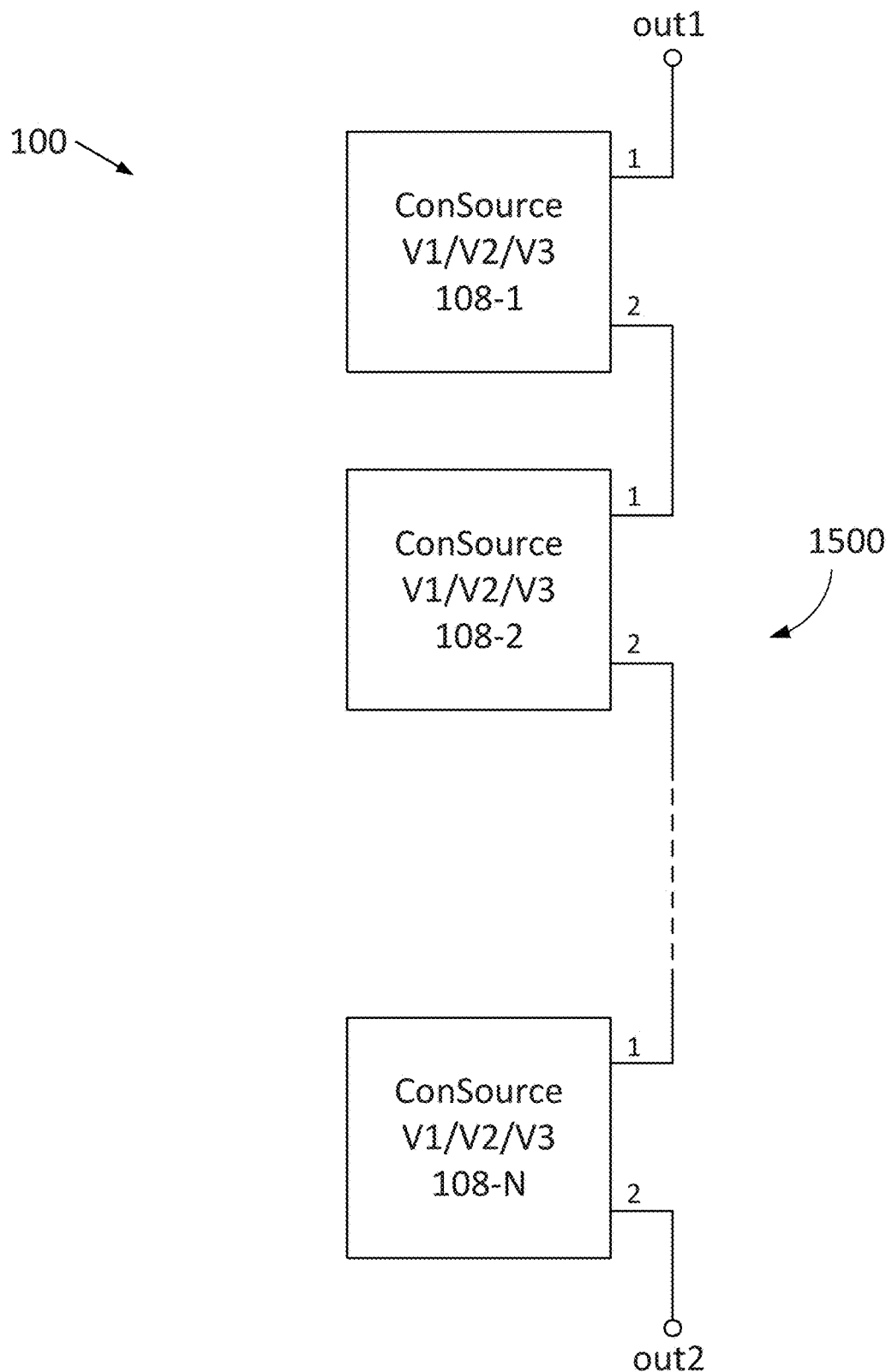
FIG. 15 is a schematic depicting an example one-dimensional array of connected example converter-source modules, according to example embodiments of the present disclosure.

FIG. 15 shows an example embodiment of a ConSource pack 1500 including a one-dimensional array of N number of interconnected ConSource modules 108-1, 108-2 . . . 108-N according to the present disclosure. Each of the ConSource modules in the array may be configured according to any one of the three module versions (V1, V2 and V3) discussed above with regard to FIGS. 2, 3 and 4. The plurality of ConSource modules may include modules configured according to the same module version (V1, V2 or V3) or a mixture of modules configured according to two or more of the three module versions (V1, V2 and V3). A first port 1 of an ConSource V1/V2/V3 module of a first row of the one-dimensional array ("first ConSource V1/V2/V3 module") is connected to a first output terminal out1 of the one-dimensional array of ConSource modules. A second port 2 of the first ConSource V1/V2/V3 module is connected to a first port 1 of a ConSource V1/V2/V3 module in a second row ("second ConSource V1/V2/V3 module"). A second port 2 of the second ConSource V1/V2/V3 module is connected to a first port of ConSource V1/V2/V3 module in a third row ("third ConSource V1/V2/V3 module") and so on in the same order further down to a Nth ConSource V1/V2/V3 module in an Nth or last row. A second port 2 of the Nth ConSource V1/V2/V3 module is connected to a second output terminal out 2 of the one-dimensional array 1500. This one-dimensional array of N number of interconnected ConSource modules can be used as a DC or single phase AC energy source, such as, e.g., a battery pack, for stationary energy storage applications for DC or AC single-phase loads. A DC or AC single-phase load can be connected between the first and second output terminals out1 and out2.

The output voltage of the one-dimensional array of N number of interconnected ConSource modules can be generated using, for example, but not limited to, space vector modulation or sine pulse width modulation ("PWM") with a Phase Shifted Carrier technique. The switching signals for each of the ConSource modules' Converter may then be generated using Phase Shifted Carrier technique. This technique ensures that the ConSource modules are continuously rotated and the power is almost equally distributed among them.

Figure 14A:
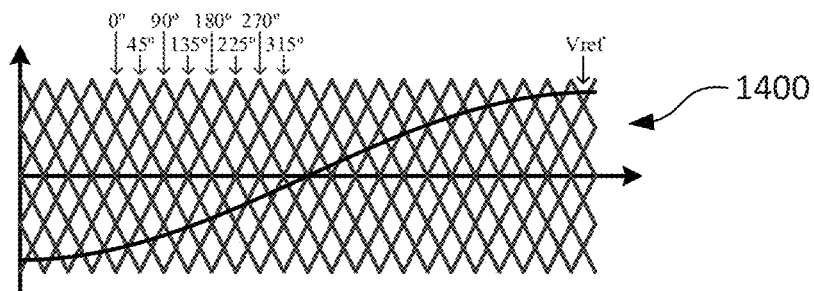
FIGS. 14A, 14B, 14C, and 14D are graphs depicting an example embodiment of pulse width modulation applicable to example embodiments of module-based energy systems.
Figure 14B:
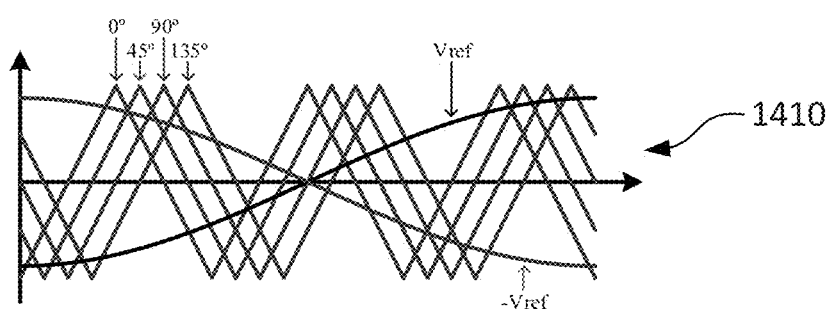
Figure 14C:
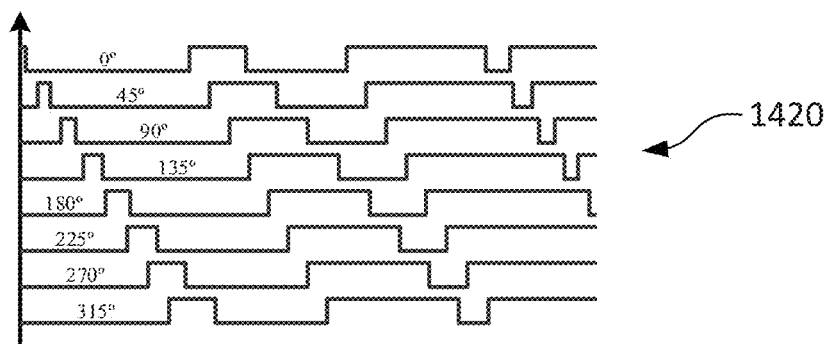
Figure 14D:
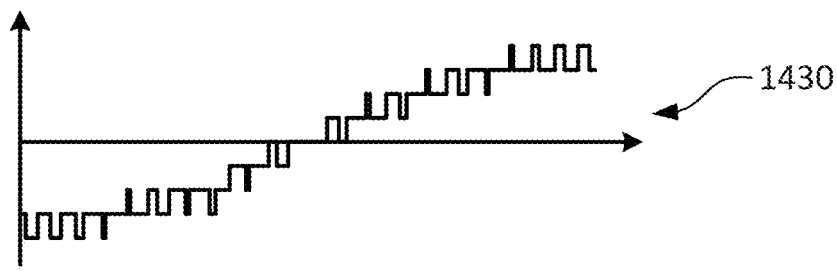

The principle of a phase shifted technique is to generate a multilevel output PWM waveform using incrementally shifted two-level waveforms. Therefore an N-level PWM waveform is created by the summation of N−1 two-level PWM waveforms. These two-level waveforms are generated by comparing the reference waveform to triangular carriers 1400, 1410 (FIGS. 14A, 14B) that are incrementally shifted by 360°/(N−1). A 9-level example 1400 is shown in FIG. 14A. The carriers are incrementally shifted by 360°/(9−1)= 45° and compared to the reference waveform. The resulted two-level PWM waveforms 1420 are shown in FIG. 14C. These two-level waveforms may be used as the switching signals for semiconductor switches of the Converters in each ConSource module 108. As an example, for a one-dimensional array including four interconnected ConSource modules, each having a Converter V1, the 0° signal is used for S3 and 180° signal for S6 of the first ConSource module, the 45° signal is used for S3 and 225° signal for S6 of the second ConSource module, and so on. Note that in all Converter V1s, the signal for S3 is complementary to S4 and the signal for S5 is complementary to S6 along with certain dead-time to avoid shoot through of each leg. FIG. 14D depicts an example AC waveform 1430 produced by superposition of output voltages from the four modules.

This one-dimensional array 1500 embodiment of system 100 shown in FIG. 15 enables obtaining a high voltage of any shape with very low total harmonic distortion between first and second terminals out 1 and out 2 using low and/or medium voltage rated energy source elements and switching components (MOSFETs, JFETs, IGBTS, etc.) with significantly reduced switching and conduction losses in the ConSource modules.

Figure 16:
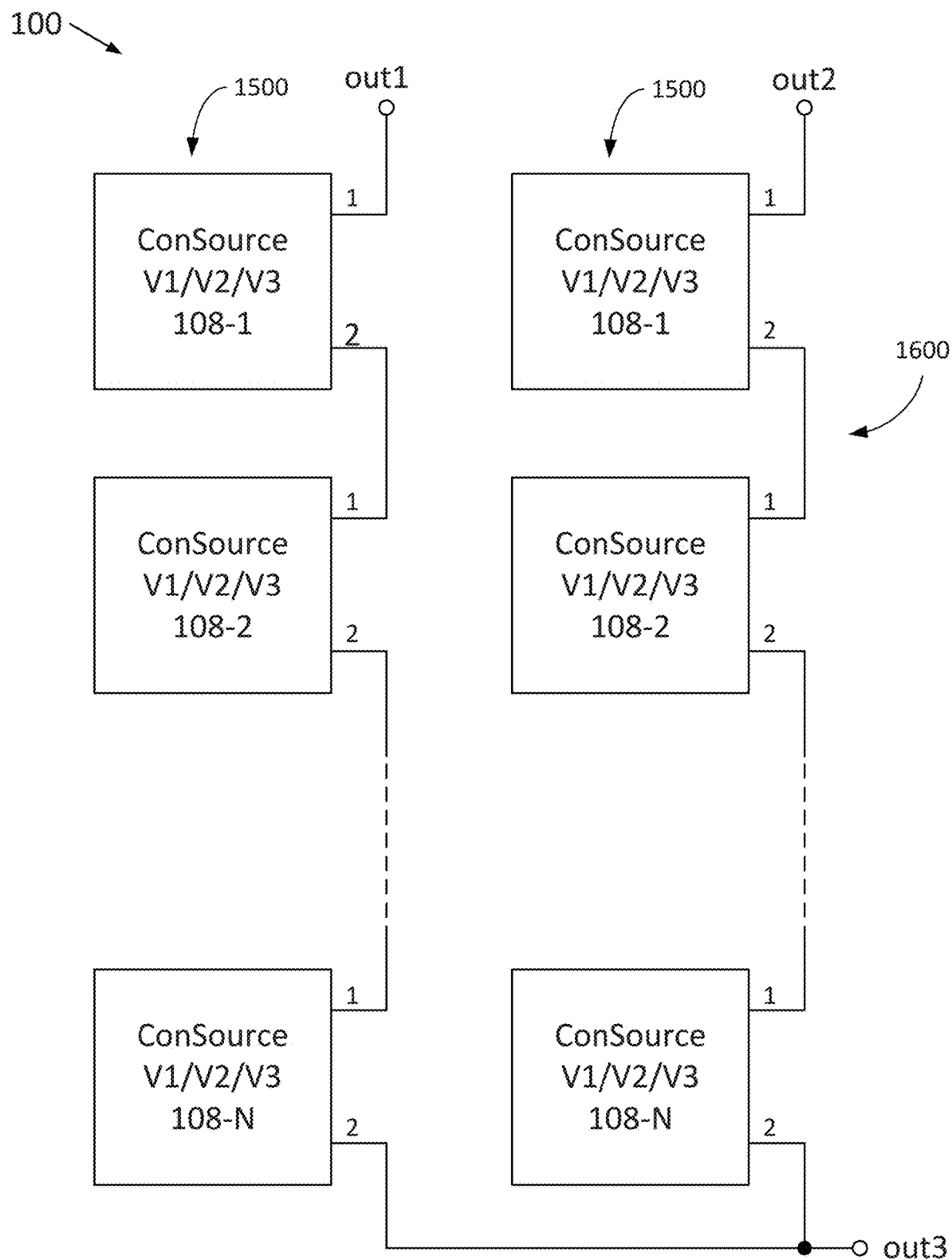
FIG. 16 is a schematic depicting an example two-dimensional array of connected example converter-source modules, according to example embodiments of the present disclosure.

FIG. 16 shows an example embodiment of a first version of a ConSource pack including a two-dimensional array 1600 or two one-dimensional arrays 1500 of N number of interconnected ConSource V1/V2/V3 modules 108-1, 108-2 . . . 108-N according to the present disclosure. A principle of configuration and output of DC or AC voltage generation of each of the two one-dimensional arrays 1500, which form this two-dimensional array 1600, is described above with regard to FIG. 15. A second port 2 of each of an Nth ConSource V1/V2/V3 module in Nth or last rows of both of the one-dimensional arrays are connected together and to a common output terminal Out3 of the two-dimensional array. Output voltages are provided between first and second output terminals Out1 and Out2 and the common output terminal Out3.

This two-dimensional array of 2N number of interconnected ConSource V1/V2/V3 modules can be used as a two-phase AC energy source for stationary energy storage applications for DC or AC single-phase loads. The load can be connected between first and second output terminals Out1 and Out2, while the common terminal Out3 can be connected to a neutral of the load, if required.

The first and second output terminals out1 and out2 of the example two-dimensional array based ConSource pack can be connected together via coupling inductors and connected to the same first terminal of an AC or DC load, when the common output terminal out3 is connected to the second terminal of the AC or DC load. In this case the output power capability of such two-dimensional array based ConSource pack with N rows is two times higher than one of the single-dimensional array based ConSource pack with the same number N of rows.

This two-dimensional array embodiment of system 100 shown in FIG. 16, enables obtaining a two phase system of high voltages with 90 degree phase displacement. For example, such systems can be used in electrical furnaces. In general, the high voltages of any shape with very low total harmonic distortion can be obtained between terminals out1, out2 and common terminal out3, which can serve as a Neutral, using low and/or medium voltage rated energy source elements and switching components (MOSFETs, JFETs, IGBTS, etc.) with significantly reduced switching and conduction losses in the ConSource modules.

Figure 17:
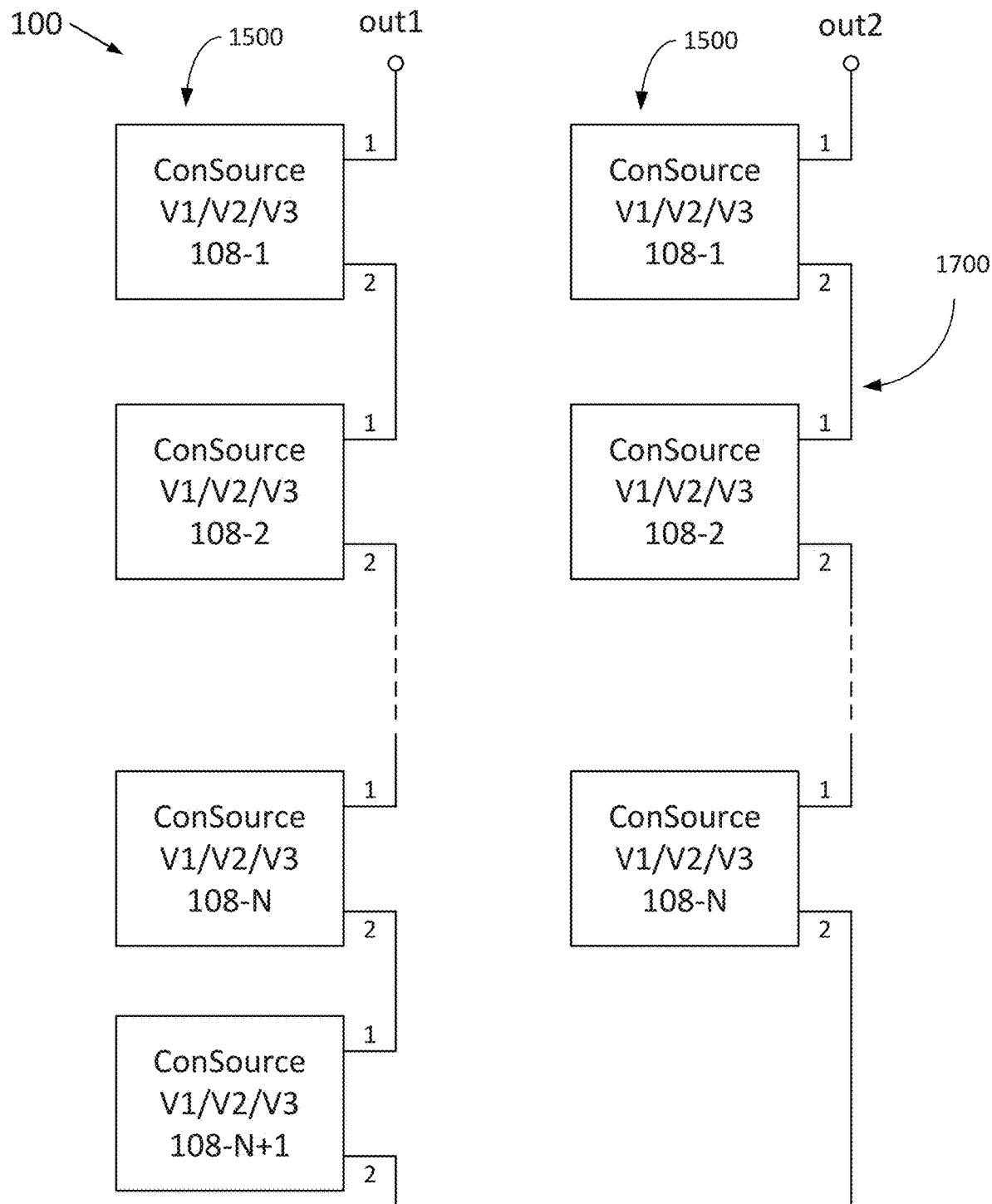
FIG. 17 is a schematic depicting another example two-dimensional array of connected example converter-source modules, according to example embodiments of the present disclosure.

FIG. 17 shows an example embodiment of a second version of a ConSource pack including a two-dimensional array 1700 or two one-dimensional arrays of N and N+1 numbers of interconnected ConSource modules 108-1, 108-2 . . . 108-N according to the present disclosure. A principle of configuration and output of DC or AC voltage generation of each of the two one-dimensional arrays 1500 with N and N+1 numbers of interconnected ConSource modules, which form this two-dimensional array, is described above with regard to FIG. 15. A second port 2 of each of an Nth ConSource V1/V2/V3 module in Nth or last rows of both of the one-dimensional arrays are connected to first and second ports 1 and 2 of an additional or N+1th ConSource V1/V2/V3 module.

This two-dimensional array of 2N+1 number of interconnected ConSource V1/V2/V3 modules can be used as a single-phase AC energy source for stationary energy storage applications for DC or AC single-phase loads. The load can be connected between first and second output terminals Out1 and Out2 of a first ConSource V1/V2/V3 module in a first row of each of the one-dimensional arrays.

Figure 18:
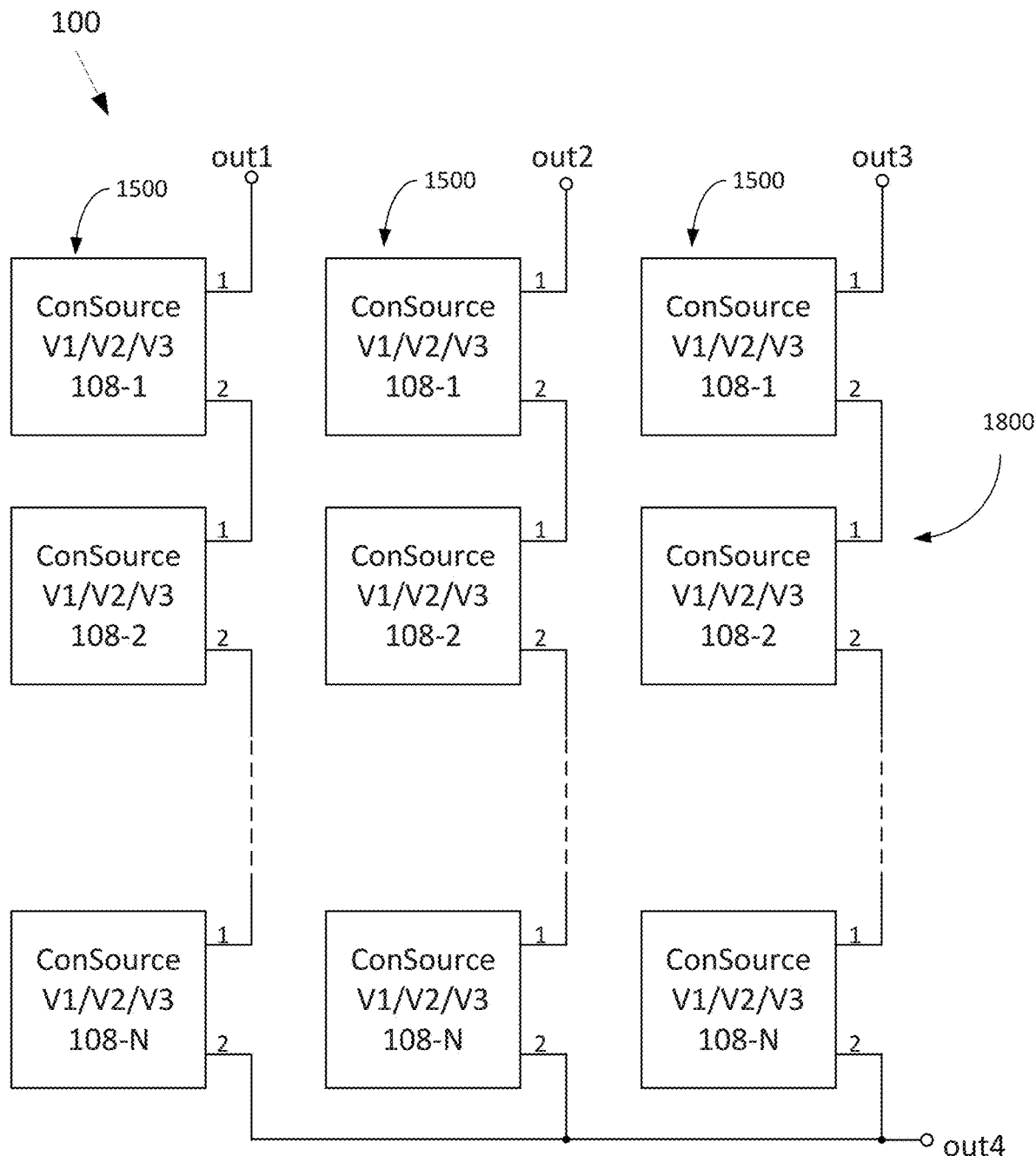
FIG. 18 is a schematic depicting an example system having multiple example converter-source modules connected in a three-dimensional array, according to example embodiments of the present disclosure.

FIG. 18 shows an example embodiment of a first version of a ConSource pack including a plurality of ConSource V1/V2/V3 modules 108-1, 108-2 . . . 108-N, interconnected in a three-dimensional array 1800, according to the present disclosure. First, second and third output terminals out1, out2 and out3 of the ConSource pack are connected to a first port 1 of a first ConSource V1/V2/V3 module of a first row of each of the three one-dimensional arrays 1500, which form this three-dimensional array 1800 based ConSource pack. A principle of configuration and output of DC or AC voltage generation of each of the three one-dimensional arrays 1500, which form this three-dimensional array 1800 based ConSource pack, is described above with regard to FIG. 15. A second port 2 of an Nth ConSource V1/V2/V3 module in an Nth or last row of each of the three one-dimensional arrays are connected together and to a common output terminal out4 of the three-dimensional array. The output voltages are provided between the first, second and third output terminals out1, out2, out3 and the common output terminal out4.

Figure 22:
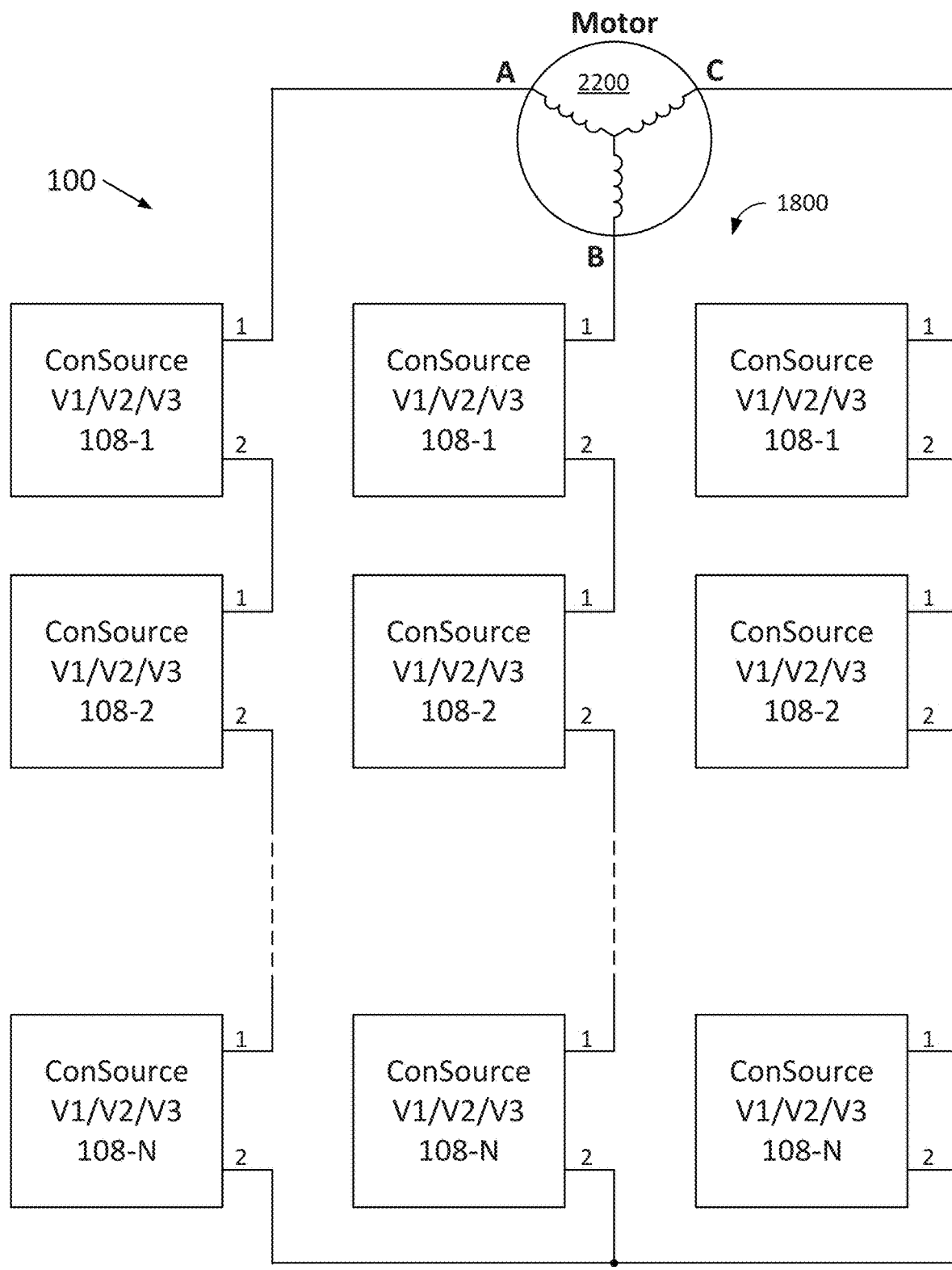
FIG. 22 is a schematic depicting an example system having multiple example converter-source modules connected in a three-dimensional array, and connected to an electrical motor, according to example embodiments of the present disclosure.

This three-dimensional array 1800 of 3N interconnected ConSource V1/V2/V3 modules 108-1, 108-2 . . . 108-N can be used as a three-phase AC energy source for stationary energy storage or electric vehicle applications for DC or AC single load, three-phase loads, three phase power grids or three-phase electric motors 2200, as shown in FIG. 22. The three-phase load can be connected between the first, second and third output terminals out1, out2, out3, while the common output terminal out4 can be connected to a neutral of the load, if required.

The first, second and third output terminals out1, out2 and out3 of the three-dimensional array based ConSource pack can be connected together via coupling inductors and connected to the same first terminal of a DC or single-phase AC load, when the common output terminal out4 is connected to the second terminal of the DC or single phase AC load. In this case, the output power capability of such three-dimensional array based ConSource pack with N rows is three times higher than the one single-dimensional array based ACi-battery pack with the same number N of rows.

Figure 19:
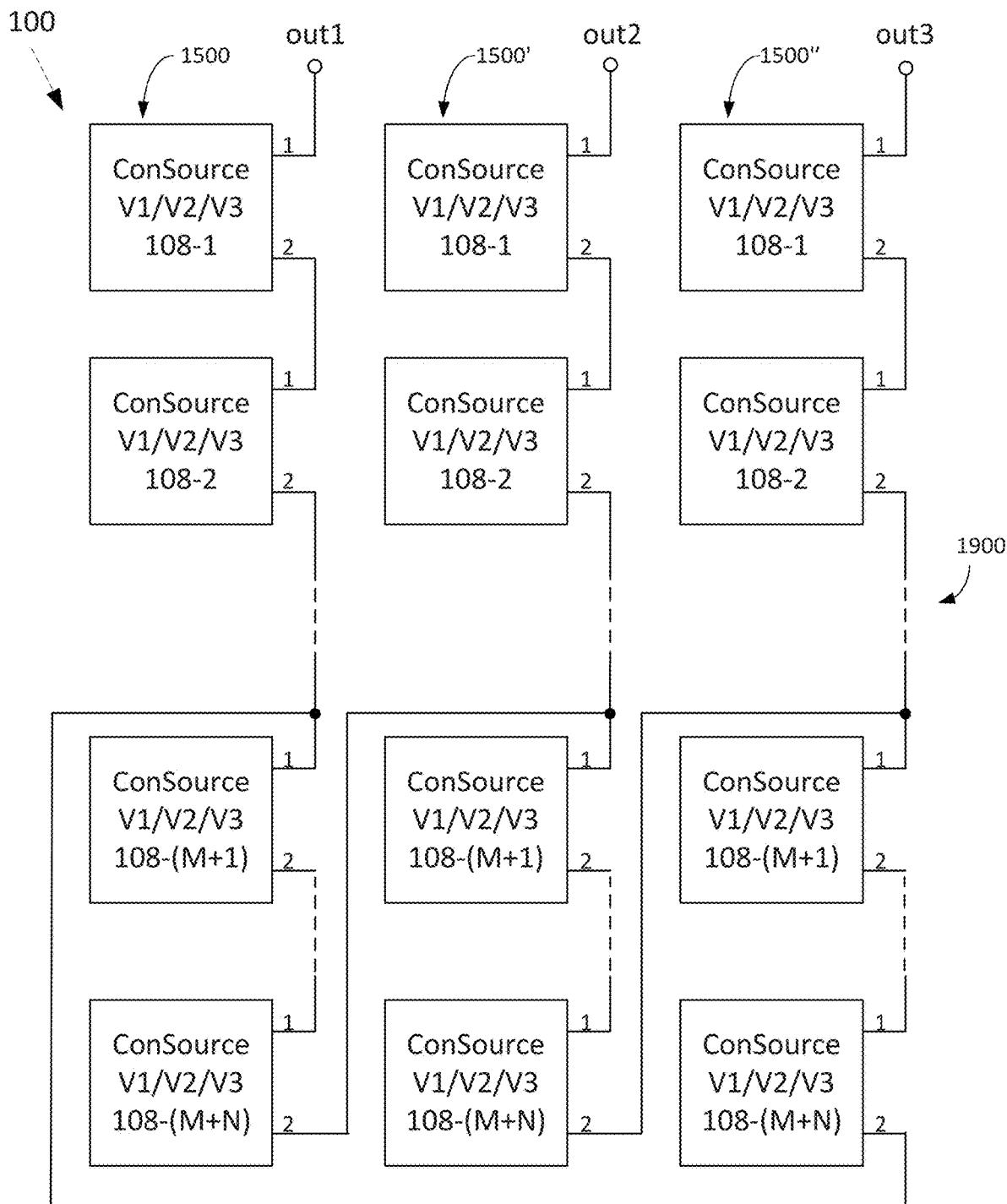
FIG. 19 is a schematic depicting another example system having multiple example converter-source modules connected in a three-dimensional array, according to example embodiments of the present disclosure.

This three-dimensional array 1900 embodiment of system 100 shown in FIG. 19 enables obtaining three-phase system of high voltages of any shape with very low total harmonic distortion between terminals oul, out2, out3 and common terminal out3 which can serve as a Neutral, using low and/or medium voltage rated energy source elements and switching components (MOSFETs, JFETs, IGBTS, etc.) with significantly reduced switching and conduction losses in the ConSource modules. Such a system can be connected to the power distribution grid and can be used as an active power source or buffer, reactive power compensator and power factor corrector, active harmonic filter with very high dynamic response and significantly reduced size of passive filter between out1, out2, out3 and the phases of power grid. This system can also be connected to three-phase load providing the energy from energy source elements such as batteries, supercapacitors, fuel-cells, etc.

FIG. 19 shows an example embodiment of a second version of a ConSource pack including a plurality of ConSource modules 108 interconnected in a three-dimensional array 1900 according to the present disclosure.

A first port 1 of a ConSource V1/V2/V3 module 108-1 of a first row ("first ConSource V1/V2/V3 module") of each of the three one-dimensional arrays 1500 are connected to first, second and third output terminals out1, out2 and out3 of each of the three one-dimensional arrays, which form this three-dimensional array based ConSource pack. A principle of configuration and output DC or AC voltage generation of each of the three one-dimensional arrays with N number of interconnected ConSource V1/V2/V3 modules, which form this three-dimensional array, is described above with regard to FIG. 15. A second port 2 of the first ConSource V1/V2/V3 modules 108-1 are connected to first ports 1 of ConSource V1/V2/V3 modules 108-2 in second rows of the three one-dimensional arrays ("second ConSource V1/V2/V3 modules"). Second ports 2 of the second ConSource V1/V2/V3 modules are connected to first ports 1 of ConSource V1/V2/V3 modules in third rows (not shown) of the three one-dimensional arrays and so on in the same order further down for M number of rows of ConSource V1/V2/V3 modules, wherein M is 2 or greater.

First ports 1 of ConSource V1/V2/V3 modules of M+1th rows are connected to second ports 2 of ConSource V1/V2/V3 modules of Mth rows (not shown). Second ports 2 of ConSource V1/V2/V3 modules in the M+1th rows are connected to first ports 1 of ConSource V1/V2/V3 modules in M+2th rows (not shown). Second output ports 2 of ConSource V1/V2/V3 modules in the M+2th rows are connected to first ports 1 of ConSource V1/V2/V3 modules in M+3th rows (not shown) and so on in the same order further down for M+N number of rows of ConSource V1/V2/V3 modules.

A second port 2 of a ConSource V1/V2/V3 module in a last row or M+Nth row of a first column 1500 of the three-dimensional array is connected to the first port 1 of the ConSource V1/V2/V3 module of the M+1 row of a second column 1500' of the three-dimensional array. A second port 2 of a ConSource V1/V2/V3 module in a last row or M+Nth row of the second column of the three-dimensional array is connected to the first port 1 of the ConSource V1/V2/V3 module of the M+1 row of a third column 1500" of the three-dimensional array. A second port 2 of a ConSource V1/V2/V3 module in a last row or M+Nth row of the third column of three-dimensional array is connected to the first port 1 of a ConSource V1/V2/V3 module of a M+1 row of the first column of the three-dimensional array.

Figure 23:
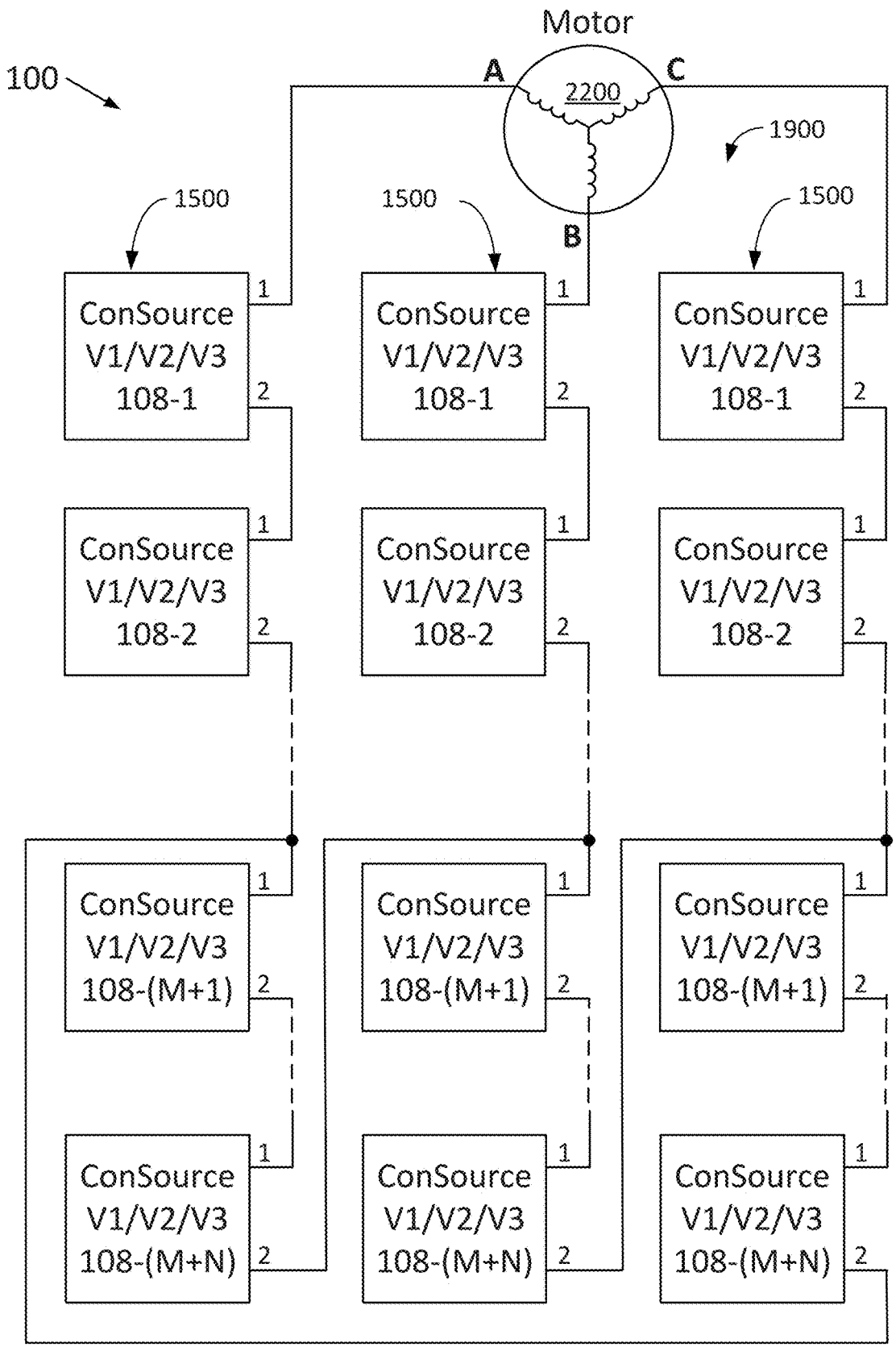
FIG. 23 is a schematic depicting another example system having multiple example converter-source modules connected in a three-dimensional array, and connected to an electrical motor, according to example embodiments of the present disclosure.

This three-dimensional array of interconnected Con-Source V1/V2/V3 modules can be used as a three-phase energy source for stationary energy storage or electric vehicle applications for DC or AC single load, three-phase loads, three phase power grids or three-phase electric motors, as shown in FIG. 23.

In addition to the advantages mentioned with regard to FIG. 18, this three-phase (three-dimensional array) configured embodiment of system 100 shown in FIG. 19, with a combination of series connected and delta connected Con-Source modules, enables an effective exchange of energy between all ConSource modules of the system (inter-phase balancing) and phases of power grid or load. A combination of delta and series connected ConSource modules allow reducing the total number of ConSource modules in array to obtain the desired output voltages.

Figure 20:
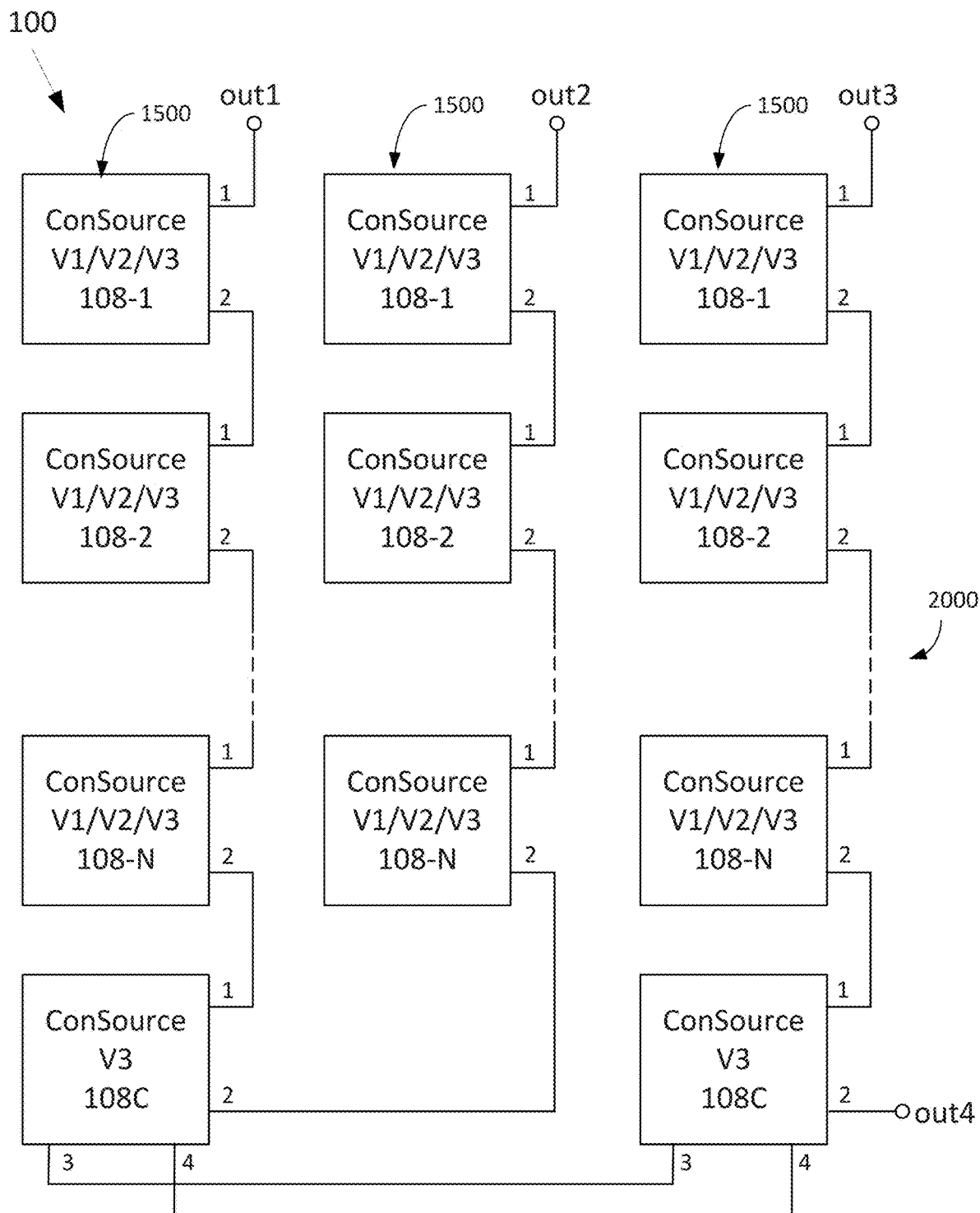
FIG. 20 is a schematic depicting another example system having multiple example converter-source modules connected in a three-dimensional array, according to example embodiments of the present disclosure.

FIG. 20 shows an example embodiment of a third version of a ConSource pack including a plurality of ConSource modules, interconnected in a three-dimensional array 2000 according to the present disclosure. First, second and third output terminals out1, out2 and out3 of the ConSource pack are connected to first ports 1 of ConSource V1/V2/V3 modules 108-1 of first rows of the three one-dimensional arrays 1500, which form this three-dimensional array 2000 based ConSource pack. A principle of configuration and output DC or AC voltage generation of each of the three one-dimensional arrays with N number of interconnected ConSource V1/V2/V3 modules 108-1, 108-2 . . . 108-N, which form this three-dimensional array, is described above with regard to FIG. 15. A second port 2 of a ConSource V1/V2/V3 module of an Nth row of a first column of the three-dimensional array is connected to a first port 1 of a first additional ConSource V3 module 108C of an N+1th row. A second port 2 of a ConSource V1/V2/V3 module of an Nth row of a second column of the three-dimensional array is connected to a second port 2 of the first additional ConSource V3 module 108C of the N+1th row. A second port 2 of a ConSource V1/V2/V3 module of an Nth row of a third column of the three-dimensional array is connected to a first port 1 of a second additional ConSource V3 module 108C of an N+1th row. A second port 2 of the second additional ConSource V3 module is connected to a fourth output terminal Out4 of the ConSource pack. Third and fourth ports 3 and 4 of the first and second additional ConSource V3 modules of the N+1th rows are interconnected as shown in FIG. 20.

Figure 24:
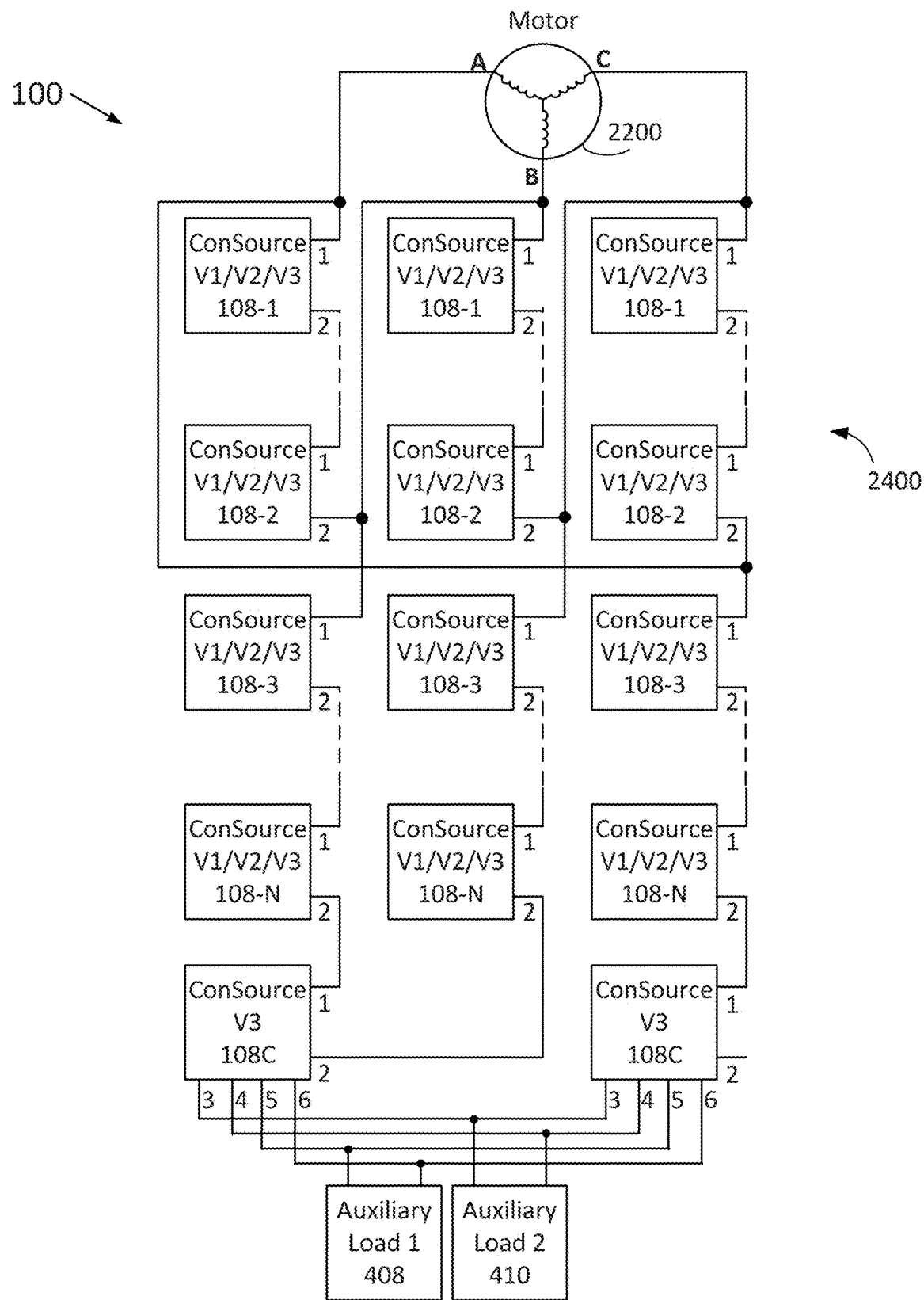
FIG. 24 is a schematic depicting another example system having multiple example converter-source modules connected in a three-dimensional array, and connected to an electrical motor and auxiliary loads, according to example embodiments of the present disclosure.

This three-dimensional array of interconnected ConSource V1/V2/V3 modules can be used as a three-phase energy source for stationary energy storage or electric vehicle applications for DC or AC single load, three-phase loads, three phase power grids or three-phase electric motors, as shown in FIG. 24. The three-phase load can be connected between the first, second and third output terminals out1, out2 and out3, while the fourth output terminal out4 can serve as one a charging terminal.

In addition to the advantages mentioned with regard to FIG. 18, this three-phase (three-dimensional array) configured embodiment of system 100 shown in FIG. 20, with two additional interconnection ConSource V3 modules 108C, enables an effective and fast exchange of energy between all ConSource modules of the system (inter-phase balancing) and phases of power grid or load.

Figure 21:
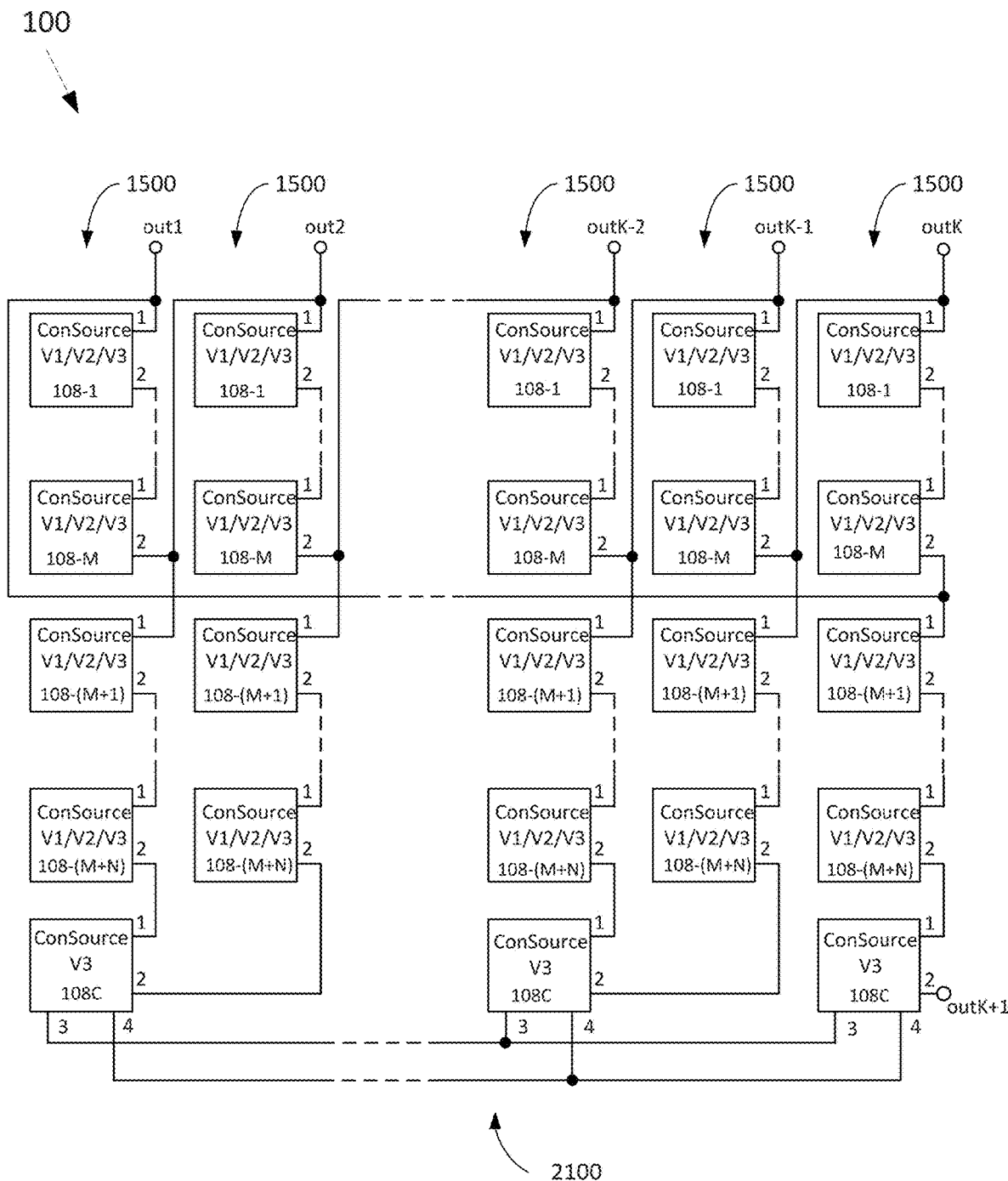
FIG. 21 is a schematic depicting an example system having multiple example converter-source modules connected in a multi-dimensional array, according to example embodiments of the present disclosure.

FIG. 21 shows an example embodiment of a fourth version of a ConSource pack including a plurality of ConSource modules, interconnected in a multi-dimensional array 2100 including K one-dimensional arrays 1500 according to the present disclosure, where K, as an example, is 3 or greater, and illustrated in an example orientation having a plurality of rows and K columns for presentation and reference purposes only. Each of the K one-dimensional arrays 1500 include M+N ConSource V1/V2/V3 modules 108-1 . . . 108-(M+N) having first and second ports. Each of the first, Kth and other odd integer one dimensional arrays include an M+N+1th additional ConSource V3 module 108C having first, second, third and fourth ports.

The first ports 1 of ConSource V1/V2/V3 modules of first rows of each of the K number of one-dimensional arrays, respectively, are connected to individual ones of first and second output terminals out1 and out2 and so on out to a Kth output terminal outK of the K number of one-dimensional arrays, which form this multi-dimensional array based ConSource pack. The second ports 2 of the ConSource V1/V2/V3 modules in the first rows are connected to the first ports 1 of ConSource V1/V2/V3 modules in second rows (not shown) of each of the K number of one-dimensional arrays. The second ports 2 of the ConSource V1/V2/V3 modules in the second rows are connected to the first ports 1 of ConSource V1/V2/V3 modules in third rows (not shown) of each of the K number of one-dimensional arrays, and so on in the same order further down for a M number of rows of ConSource V1/V2/V3 modules, where M is 2 or greater.

The second port2 of a ConSource V1/V2/V3 module 108-M of a first array column of an Mth row is connected to the first port 1 of a ConSource V1/V2/V3 module 108-1 of a second array column of the first row. The second port2 of a ConSource V1/V2/V3 module 108-M of the second array column of the Mth row is connected to the first port 1 of a ConSource V1/V2/V3 module 108-1 of a third array column of the first row, and so on in the same order to a Kth array column, where the second port2 of a ConSource V1/V2/V3 module 108-M in the Kth array column of the Mth row is connected to the first port 1 of the ConSource V1/V2/V3 module 108-1 of the first array column of the first row.

The first ports 1 of ConSource V1/V2/V3 modules 108-(M+1) of all of the first through Kth array columns of M+1th rows are connected to the second ports 2 of the ConSource V1/V2/V3 modules 108-M of the Mth rows. The second ports 2 of ConSource V1/V2/V3 modules 108-(M+1) of all of the first through Kth array columns of the M+1th rows are connected to the first ports 1 of ConSource V1/V2/V3 modules of all of the first through Kth columns of M+2th rows, and so on in the same order further down for an N number of rows of ConSource V1/V2/V3 modules, where N is 2 or greater.

The second port 2 of a ConSource V1/V2/V3 module of an M+Nth row of the first array column of the multi-dimensional array is connected to the first port 1 of a first additional ConSource V3 module of an M+N+1th row. The second port 2 of a ConSource V1/V2/V3 module of the M+Nth row of the second array column of the multi-dimensional array is connected to the second port 2 of the first additional ConSource V3 module of the M+N+1th row. The second port 2 of a ConSource V1/V2/V3 module of the M+Nth row of a K−2th array column of the multi-dimensional array is connected to the first port 1 of a ((K−1)/2)th additional ConSource V3 module of the M+N+1th row. The second port 2 of a ConSource V1/V2/V3 module of the M+Nth row of a K−1th column of the multi-dimensional array is connected to the second port 2 of the ((K−1)/2)th additional ConSource V3 module of the M+N+1th row. The second port 2 of a ConSource V1/V2/V3 module of the M+Nth row of the Kth column of the multi-dimensional array is connected to a first port 1 of a (K+1)/2th additional ConSource V3 module of M+N+1th row. The second port 2 of the (K+1)/2th additional ConSource V3 module is connected to a Kth output terminal outK+1 of of the ConSource pack. The output ports 3 and 4 of all (K+1)/2 additional ConSource V3 modules of M+N+1th rows are connected together as shown in FIG. 21.

This multi-dimensional array of interconnected ConSource V1/V2/V3 modules can be used as a multi-phase energy source for stationary energy storage or electric vehicle applications, for DC load, multi-phase AC loads, multi-phase power grids or multi-phase electric motors.

In addition to the advantages mentioned with regard to FIG. 18, this multi-dimensional array 2100 embodiment of system 100 shown in FIG. 21, with a combination of delta connected and series connected ConSource modules and additional interconnection ConSource V3 modules, enables an effective and fast exchange of energy between all ConSource modules of the system (inter-phase balancing) and phases of power grid or load. A combination of delta and series connected ConSource modules allow reducing the total number of ConSource modules in array to obtain the desired output voltages.

FIG. 22 and FIG. 23 shows example embodiments of first and second versions of ConSource packs 1800, 1900, respectively, as presented in FIG. 18 and FIG. 19, respectively, and further connected to a three-phase electrical motors 2200 of any type.

The three-dimensional array 1800 (three-phase motor drive system) embodiment of system 100 shown in FIG. 22, enables obtaining a three-phase system of high voltages of any shape with very low total harmonic distortion between motor phases A, B and C, using low and/or medium voltage rated energy source elements and switching components (MOSFETs, JFETs, IGBTS, etc.) with significantly reduced switching and conduction losses. Such a system does not require a usage of bulky passive filters as in case of 2-level inverter and has a high dynamic response.

In addition to the advantages mentioned with regard to FIG. 22, the three-phase motor drive embodiment 1900 of system 100 (three-dimensional array) shown in FIG. 23, with a combination of series connected and delta connected ConSource modules 108, enables an effective exchange of energy between all ConSource modules of the system (inter-phase balancing) and all phases of electric motor 2200. A combination of delta and series connected ConSource modules 108 allow reducing the total number of ConSource modules in array to obtain the desired output motor voltages.

FIG. 24 shows an example embodiment of a third version of a ConSource pack connected to a three-phase electrical motor 2200 of any type. The ConSource pack is as presented in FIG. 21, where K equals 3, with the third and fourth output ports 3 and 4 of the two additional ConSource V3 modules 108C of the N+1th rows connected together and to a second Auxiliary Load 2. The two additional ConSource V3 modules of the N+1th rows further include fifth and sixth output ports 5 and 6 connected together and to a first Auxiliary Load 1 408. The first Auxiliary Load 1 and the second Auxiliary Load 2 410 have different voltages and represent, for example, but not limited to, electric vehicle's onboard network system and air-conditioner power supply system, respectively.

In addition to the advantages mentioned with regard to FIG. 21, this three-phase motor drive embodiment 2400 of system 100 (three-dimensional array) shown in FIG. 24, with a combination of series connected and delta connected ConSource modules 108 and two additional interconnection ConSource V3 modules 108C, enables an effective and fast exchange of energy between all ConSource modules of the system (inter-phase balancing) and phases of electric motor 2200. A combination of delta and series connected ConSource modules allow reducing the total number of ConSource modules in array to obtain the desired output motor voltages. The additional output terminals 3, 4, 5, 6 of interconnection ConSource V3 modules provide low voltages of different levels, which can be used to provide a power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 25:
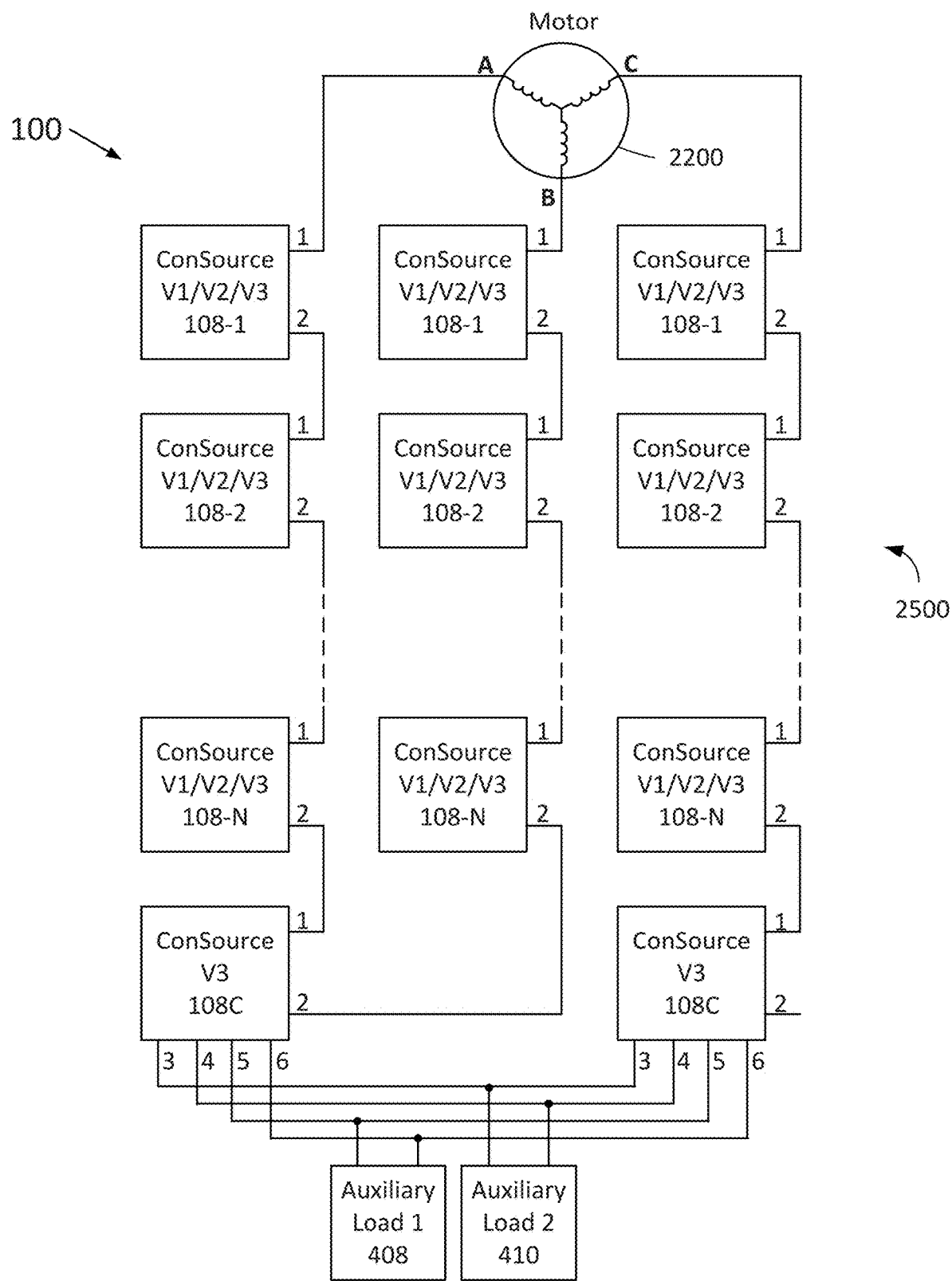
FIG. 25 is a schematic depicting another example system having multiple example converter-source modules connected in a three-dimensional array, and connected to an electrical motor and auxiliary loads, according to example embodiments of the present disclosure.

FIG. 25 shows an example embodiment 2500 of a fourth version of a ConSource pack connected to a three-phase electrical motor 2200 of any type. The ConSource pack is as presented in FIG. 20 with the third and fourth output ports 3 and 4 of the two additional ConSource V3 modules 108-C of the N+1th rows connected together and to a second Auxiliary Load 410. The two additional ConSource V3 modules of the N+1th rows further include fifth and sixth output ports 5 and 6 connected together and to a first Auxiliary Load 408. The first Auxiliary Load and second Auxiliary Load 410 have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 25, with two additional interconnection ConSource V3 modules 108C, enables an effective and fast exchange of energy between all ConSource modules of the system (inter-phase balancing) and phases electric motor. The additional output terminals 3, 4, 5, 6 of interconnection ConSource V3 modules 108C provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 26:
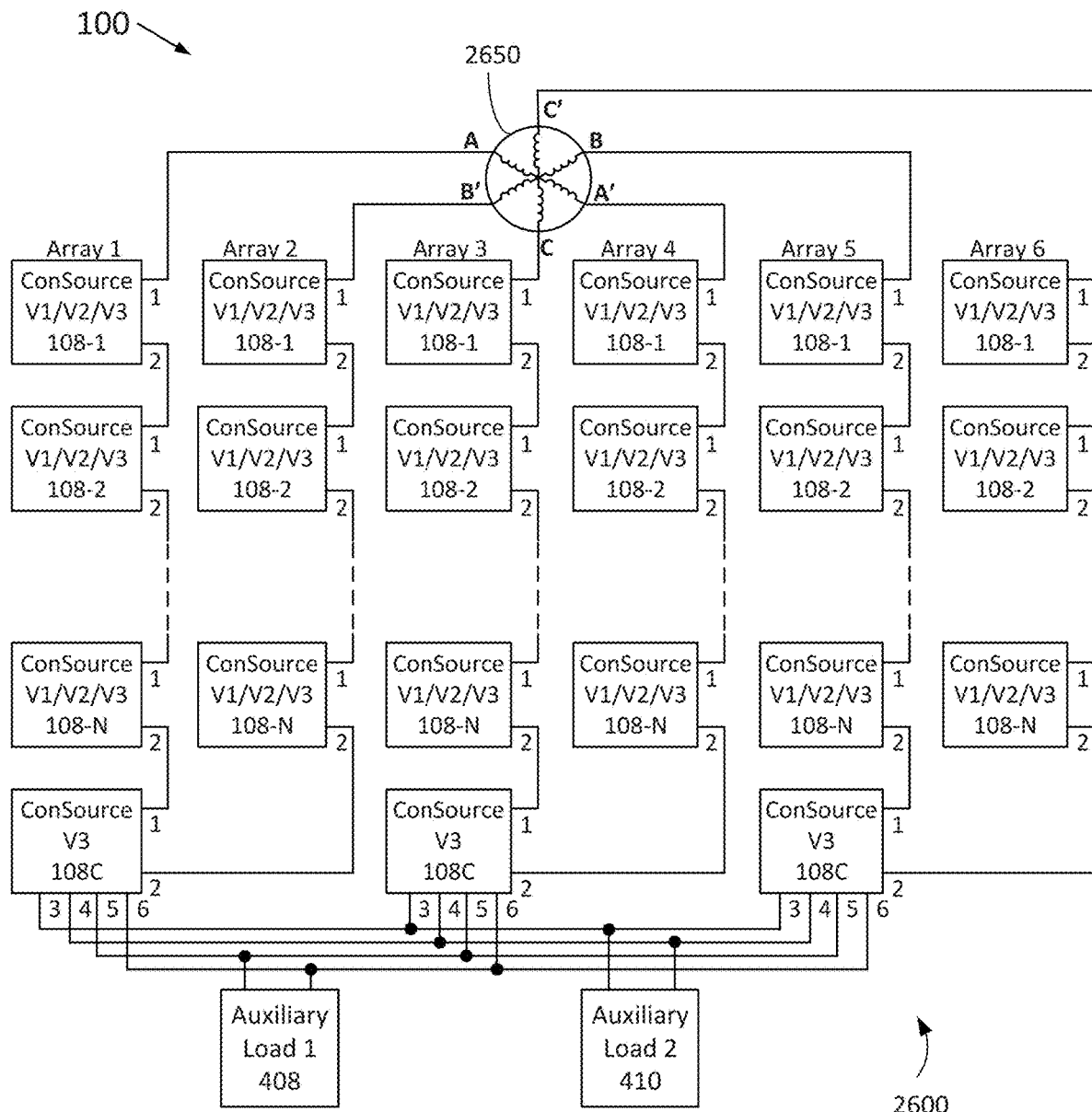
FIG. 26 is a schematic depicting another example system having multiple example converter-source modules connected in a six-dimensional array, and connected to a six-phase electrical motor and auxiliary loads, according to example embodiments of the present disclosure.

FIG. 26 shows an example embodiment 2600 of a fifth version of a ConSource pack connected to six-phase electrical motor 2650 of any type. The ConSource pack is as presented in FIG. 25 with the first and second array columns of the three dimensional array 2500 repeat twice to form six array columns of a six dimensional array including 3 sets of the first and second array columns shown in FIG. 25. The third and fourth ports 3 and 4 of the three additional ConSource V3 modules 108C of the N+1 rows are connected together and to the second Auxiliary Load 410 and the fifth and sixth ports 5 and 6 of the three additional ConSource V3 modules 108C of the N+1th rows are connected together and to the first Auxiliary Load 408. The first Auxiliary Load 408 and the second Auxiliary Load 410 have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 26, with three additional interconnection ConSource V3 modules 108C, enables an effective and fast exchange of energy between all ConSource modules of the system (inter-phase balancing) and all six phases electric motor. The additional output terminals 3, 4, 5, 6 of interconnection ConSource V3 modules provide low voltages of different levels, which can be used to provide power for auxiliary loads, which in turn represent, for example, the electrical on-board network and HVAC power line an electric vehicle. In this case an extra low-voltage battery is not required; the energy for above mentioned systems is delivered by entire six-dimensional array of ConSource modules.

Figure 27:
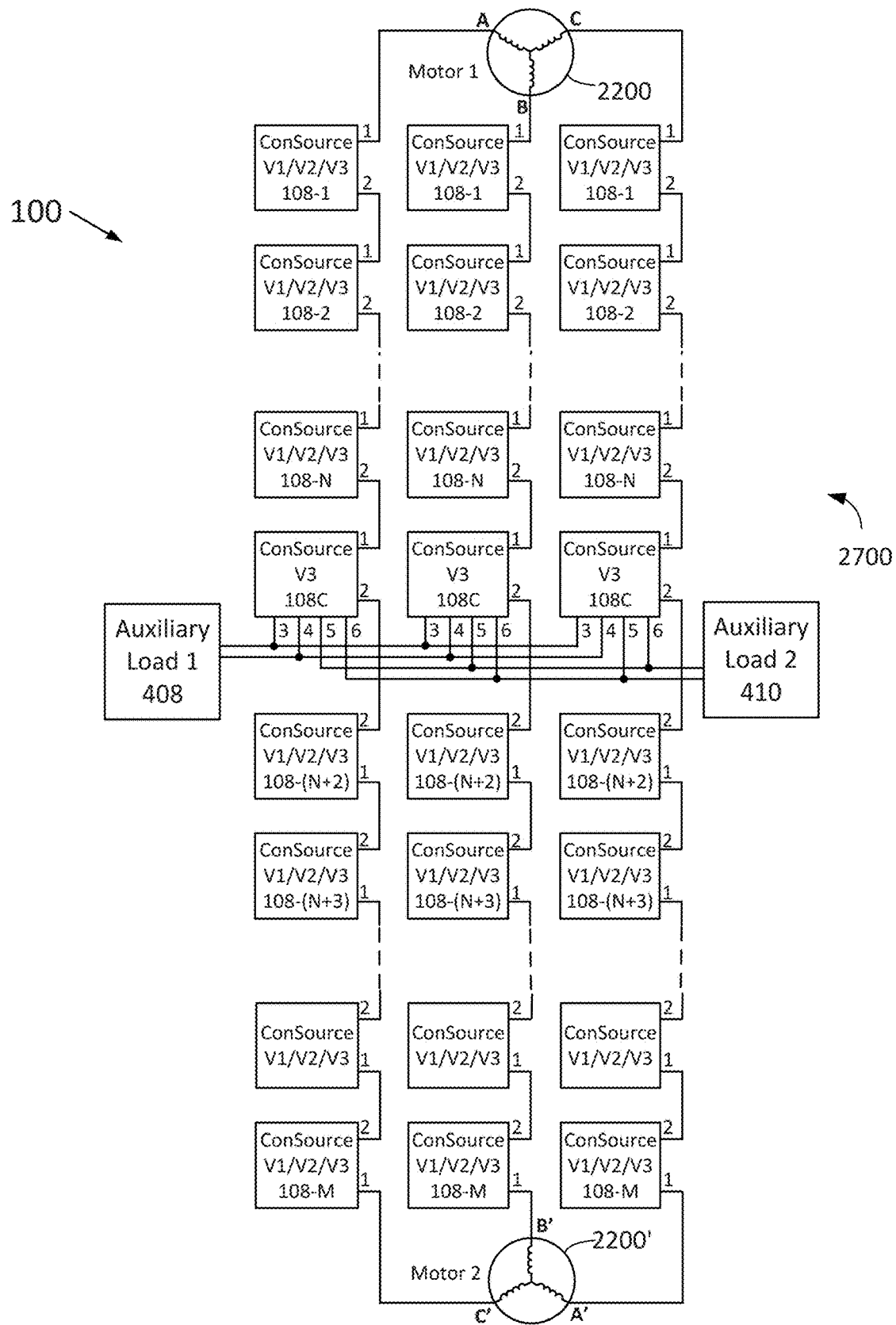
FIG. 27 is a schematic depicting another example system having multiple example converter-source modules connected in a three-dimensional array, and connected to two three-phase electrical motors and auxiliary loads, according to example embodiments of the present disclosure.

FIG. 27 shows an example embodiment 2700 of a sixth version of a ConSource pack including a plurality of ConSource modules, interconnected in three-dimensional array, connected to two three-phase electrical motors 2200, 2200' and auxiliary loads according to the present disclosure. The first, second and third output terminals A, B and C of a first Motor 1 2200 are connected to the ConSource pack at the first ports 1 of ConSource V1/V2/V3 modules 108-1 of a first row of the ConSource pack. The second ports 2 of ConSource V1/V2/V3 modules of the Nth row of all three array columns of the ConSource pack are connected to the first ports 1 of three corresponding ConSource V3 modules 108C of the N+1th row, as shown in FIG. 27. The second ports 2 of all three of the ConSource V3 modules 108C of the N+1th row are connected to the second ports 2 of the ConSource V1/V2/V3 modules of the N+2 row. The first ports 1 of the ConSource V1/V2/V3 modules of the N+2 row are connected to the second ports 2 of ConSource V1/V2/V3 modules of a N+3th row, and so on in the same order further down to the last row or Mth row of the ConSource pack, as shown in FIG. 27. The first, second and third output terminals A', B' and C' of a second Motor 2 2200' are connected to the ConSource pack at the first ports 1 of the ConSource V1/V2/V3 modules of the Mth row of the ConSource pack.

The third and fourth ports 3 and 4 of the three additional ConSource V3 modules 108C of the N+1th row are connected together and to a second Auxiliary Load 410. The fifth and sixth ports 5 and 6 of the three additional ConSource V3 modules 108C of the N+1 row are connected together and to a first Auxiliary Load 408. The first Auxiliary Load 408 and the second Auxiliary Load 410 have different voltages and represent, for example, but not limited to, electric vehicle's onboard network system and air-conditioner power supply system, respectively.

This three-dimensional array embodiment of system 100 with three additional interconnection ConSource V3 modules shown in FIG. 27, provides the independent voltage and frequency regulation (control) for two independent motors (dual-motor drive system) and enables an effective and fast exchange of energy (inter-phase balancing) between all ConSource modules of such a dual-motor system and phases of two electric motors. The additional output terminals 3, 4, 5, 6 of interconnection ConSource V3 modules 108C provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 28:
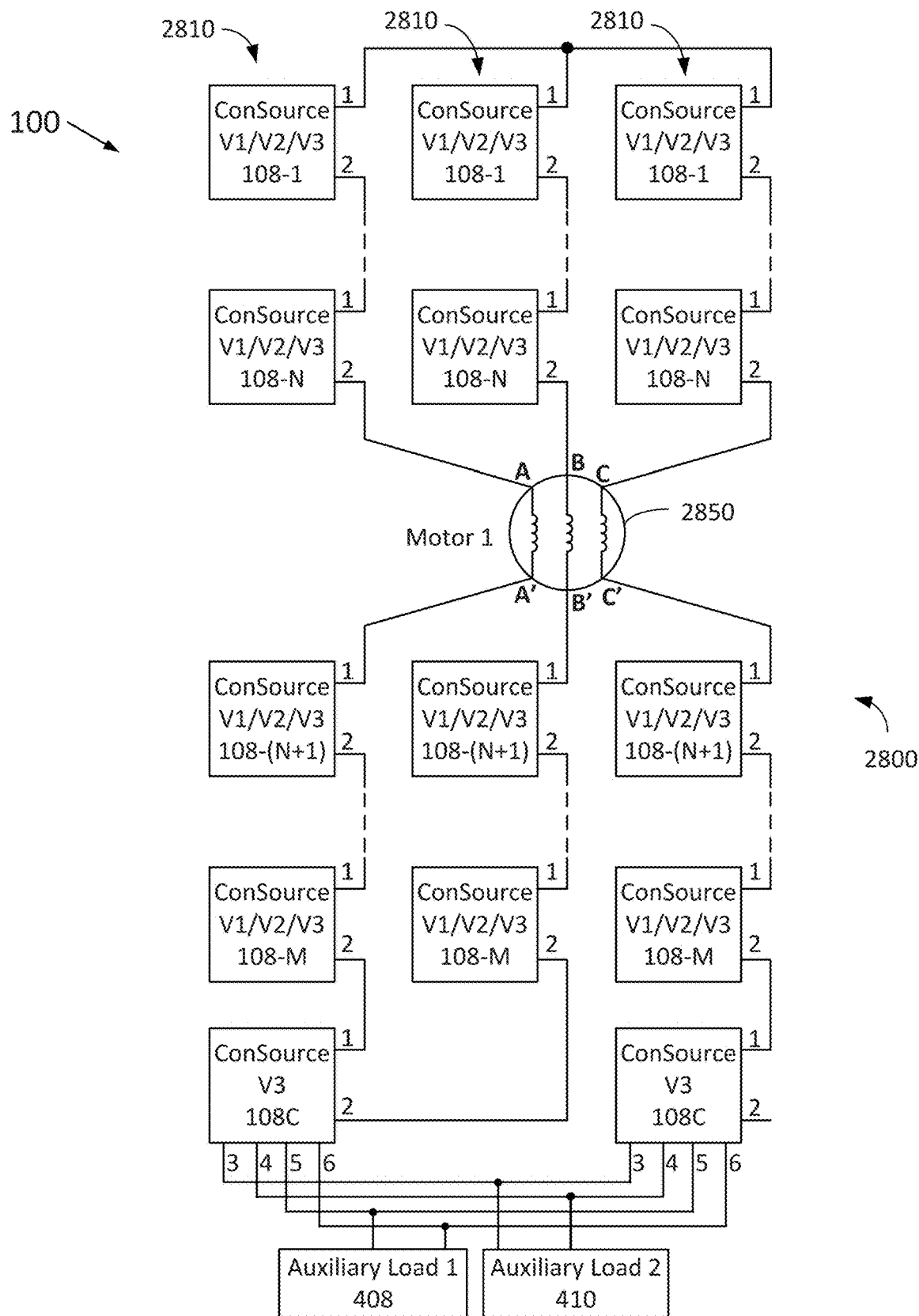
FIG. 28 is a schematic depicting another example system having multiple example converter-source modules connected in a three-dimensional array, and connected to a three-phase open-winding electrical motor and auxiliary loads, according to example embodiments of the present disclosure.

FIG. 28 shows an example embodiment 2800 of a seventh version of a ConSource pack including a plurality of ConSource modules 108, interconnected in three-dimensional array, connected to three-phase open-winding electrical motor 2850 and auxiliary loads 408, 410 according to the present disclosure.

The first ports 1 of ConSource V1/V2/V3 modules 108-1 of the first rows of all three array columns 2810 are connected together. The second ports 2 of the ConSource V1/V2/V3 modules of the first rows of all three array columns are connected to the first ports 1 of ConSource V1/V2/V3 modules (not shown) of the second rows of all three array columns 2810, and so on in the same order further down to the Nth row of each array column. The second ports 2 of ConSource V1/V2/V3 modules 108-N of the Nth rows of all three array columns are connected to the first, second and third input terminals A, B, C of the open-winding electrical motor 2850, as shown in FIG. 28. The first, second and third terminals A', B', C' of the open-winding electrical motor 2850 are connected to the first ports 1 of ConSource V1/V2/V3 modules of the N+1th rows of all three array columns. The second ports 2 of the ConSource V1/V2/V3 modules of the N+1th rows of all three array columns are connected to the first ports 1 of ConSource V1/V2/V3 modules of the N+2th rows of all three array columns, and so on in the same order further down to Mth row of each of the array columns. The second port 2 of ConSource V1/V2/V3 module of the Mth row of the first column is connected to the first port 1 of a first additional ConSource V3 module 108C of the M+1th row. The second port 2 of a ConSource V1/V2/V3 module of the Mth row of the second array column is connected to the second port 2 of the first additional ConSource V3 module 108C of the M+1th row. The second port 2 of a ConSource V1/V2/V3 module of the Mth row of the third column is connected to the first port 1 of a second additional ConSource V3 module 108C of the M+1th row.

The third and fourth ports 3 and 4 of the two additional ConSource V3 modules of the M+1th rows are connected together and to a second Auxiliary Load 410. The fifth and sixth ports 5 and 6 of the two additional ConSource V3 modules of the M+1th rows are connected together and to a first Auxiliary Load 408. The first Auxiliary Load and the second Auxiliary Load have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 28, with two additional interconnection ConSource V3 modules, is suitable for open winding motors and enables an effective and fast exchange of energy between all ConSource modules of the system (inter-phase balancing) and phases electric motor. The additional output terminals 3, 4, 5, 6 of interconnection ConSource V3 modules provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 29:
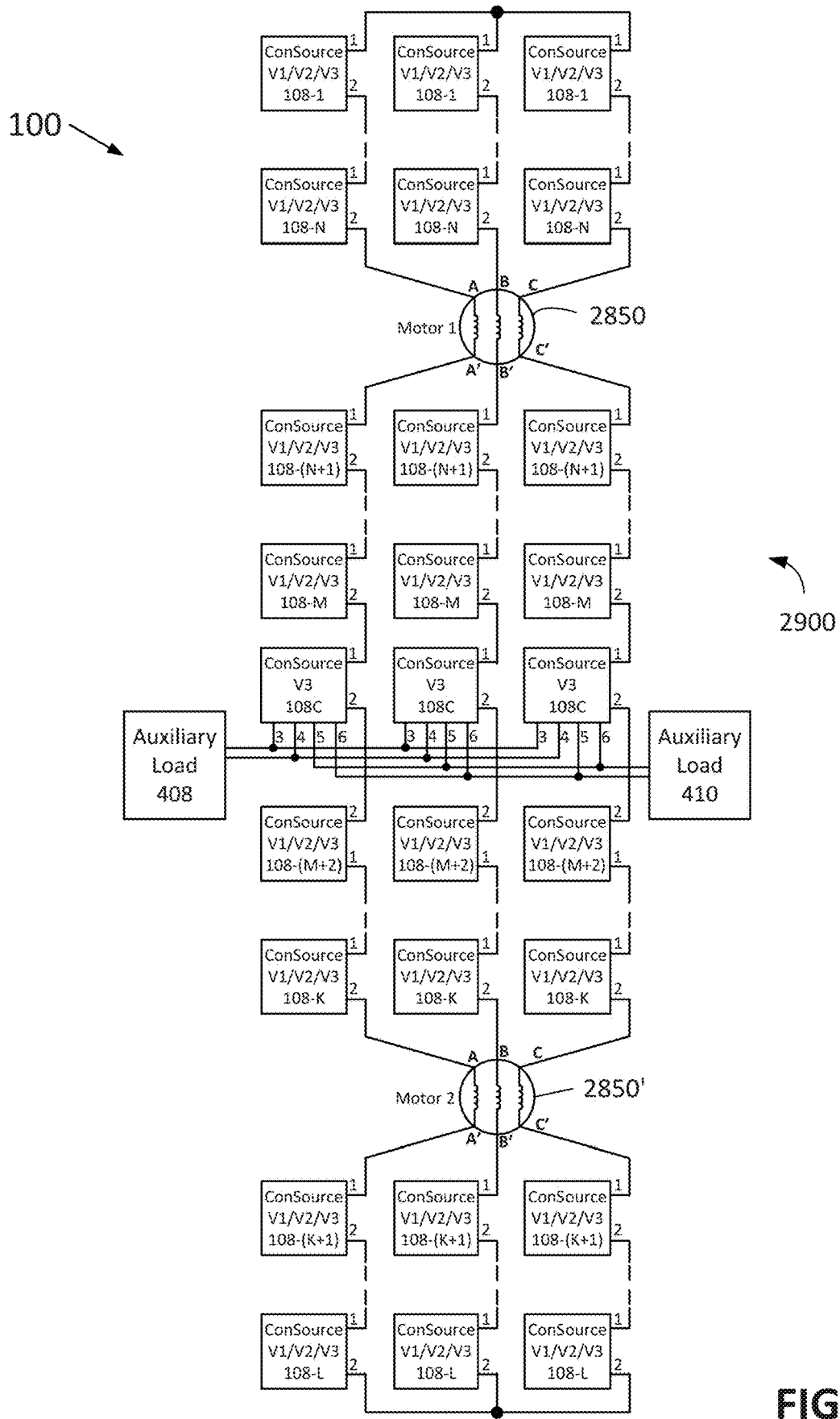
FIG. 29 illustrates a schematic depicting another example system having multiple example converter-source modules connected in a three-dimensional array, and connected to two three-phase open-winding electrical motor and auxiliary loads, according to example embodiments of the present disclosure.

FIG. 29 shows an example embodiment of a eighth version of a ConSource pack including a plurality of ConSource modules, interconnected in three-dimensional array 2900, connected to two three-phase open-winding electrical motors 2850, 2850' and auxiliary loads 408, 410 according to the present disclosure.

The first ports 1 of ConSource V1/V2/V3 modules 108-1 of the first rows of all three array columns are connected together. The second ports 2 of the ConSource V1/V2/V3 modules 108-1 of the first rows of all three array columns are connected to the first ports 1 of ConSource V1/V2/V3 modules 108-2 (not shown) of the second rows of all three array columns, and so on in the same order further down to an Nth row. The second ports 2 of ConSource V1/V2/V3 modules 108-N of the Nth rows of all three array columns are connected to the first, second and third input terminals A, B, C of a first open-winding electrical motor 2850, as shown in FIG. 29. The first, second and third output terminals A', B', C' of the first open-winding electrical motor 2850 are connected to the first ports 1 of ConSource V1/V2/V3 modules 108-(N+1) of the N+1th rows of all three array columns. The second ports 2 of the ConSource V1/V2/V3 modules 108-(N+1) of the N+1th rows of all three array columns are connected to the first ports 1 of ConSource V1/V2/V3 modules 108-(N+2) of the N+2th rows (not shown) of all three array columns, and so on in the same order further down to an Mth row.

The second ports 2 of ConSource V1/V2/V3 modules 108-M of the Mth rows of all three array columns of the ConSource pack are connected to the first ports 1 of three corresponding ConSource V3 modules 108C of the M+1th row, as shown in FIG. 29. The second ports 2 of all three ConSource V3 modules 108C of the M+1th row are connected to the second ports 2 of ConSource V1/V2/V3 modules 108-(M+2) of the M+2th row. The first ports 1 of ConSource V1/V2/V3 modules of the M+2th row are connected to the second ports 2 of ConSource V1/V2/V3 modules of the M+3th row (not shown), and so on in the same order further down to a Kth row. The first ports 1 of ConSource V1/V2/V3 modules 108-K of the Kth rows of all three array columns are connected to the first, second and third input terminals A, B, C of a second open-winding electrical motor 2850', as shown in FIG. 29.

The first, second and third output terminals A', B', C' of the second open-winding electrical motor 2850' are connected to the first ports 1 of ConSource V1/V2/V3 modules 108-(K+1) of the K+1th rows of all three array columns. The first ports 1 of ConSource V1/V2/V3 modules of the K+1th rows of all three array columns are connected to the second ports 2 of ConSource V1/V2/V3 modules of the K+2th rows (not shown) of all three array columns, and so on in the same order further down to an Lth row. The first ports 1 of ConSource V1/V2/V3 modules the Lth of rows of all three array columns are connected together.

The third and fourth ports 3 and 4 of the two additional ConSource V3 modules of the M+1th rows are connected together and to a second Auxiliary Load 410. The fifth and sixth ports 5 and 6 of the two additional ConSource V3 modules of the M+1 rows are connected together and to a first Auxiliary Load 408. The first Auxiliary Load and the second Auxiliary Load 410 have different voltages and represent, for example, but not limited to, electric vehicle's onboard network system and air-conditioner power supply system, respectively.

This three-dimensional array embodiment of system 100 with three additional interconnection ConSource V3 modules shown in FIG. 29, provides the independent voltage and frequency regulation (control) for two independent open-winding motors (dual-motor drive system) and allows an effective and fast exchange of energy (inter-phase balancing) between all ConSource modules of such a dual-motor system and phases of two electric motors. The additional output terminals 3, 4, 5, 6 of interconnection ConSource V3 modules provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Example Embodiments of Module Control

Turning to FIGS. 30-40B, example systems and methods that facilitate control of system 100 to provide state of charge (SOC) and temperature balancing between ConSource modules in different system configurations are shown. The interconnection architecture of the example embodiments shown in FIGS. 1 through 29 enables the control of power sharing among ConSource modules. Such control enables maintaining the SOC of the energy sources of the ConSource modules balanced during cycling and at rest which can help the full capacity of each energy source to be utilized regardless of possible differences in the capacities. In addition, it can be used to equalize the temperature of the energy sources of ConSource modules. Temperature balancing increases the power capability of system 100 and provides more uniform aging of the energy sources regardless of their location within system 100 and differences in thermal resistivity.

Figure 30:
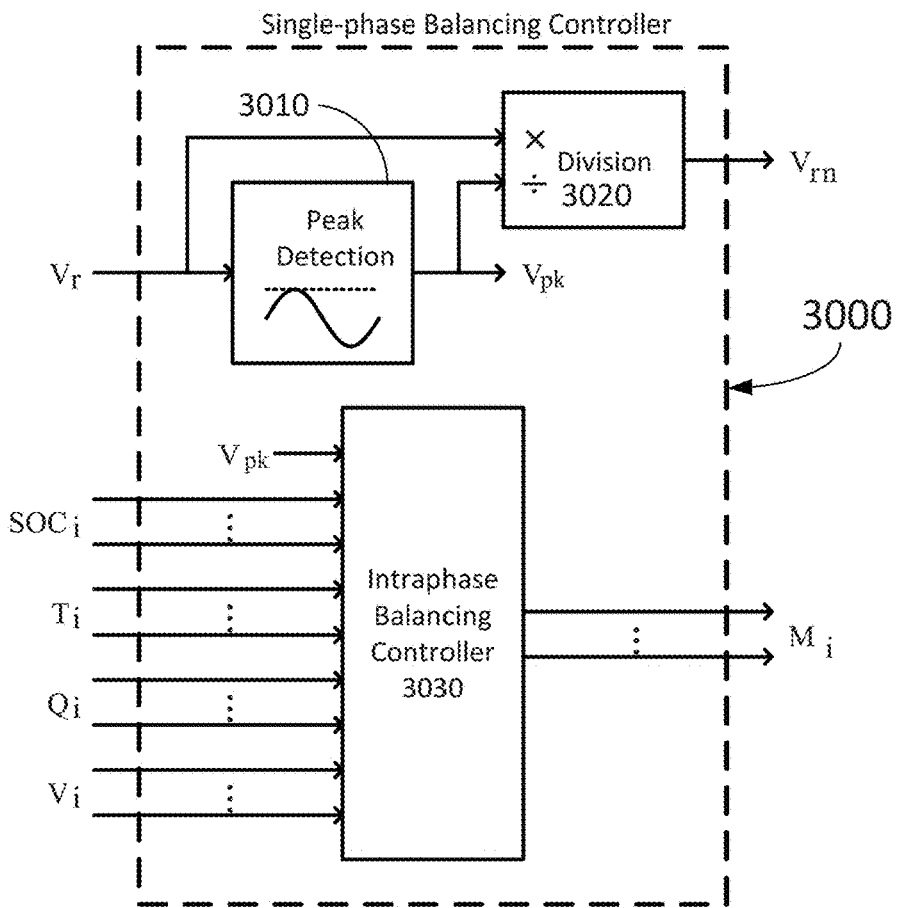
FIG. 30 is a schematic depicting an example embodiment of a single-phase balancing controller, for use with example embodiments of the present disclosure.

FIG. 30 depicts an example embodiment of a single-phase AC or DC balancing controller 3000 that may include a peak detector 3010 ("Peak Detection"), a divider 3020 ("Division"), and an Intra-phase balancing controller 3030 ("Intra-phase Balancing Controller"). The peak detector detects the peak Vpk of the reference voltage Vr. The divider generates normalized reference waveform Vrn by dividing the reference voltage Vr by its detected peak Vpk. The Intra-phase balancing controller uses peak voltage Vpk along with the ConSource status information (e.g., SOCi, Ti, Qi, Vi, etc.) to generate modulation indexes Mi for each module. The intra-phase balancing controller may be implemented in hardware, software or a combination thereof as a centralized controller, as a part of the MCD, or may be distributed partially or fully among the LCDs described herein.

In the single-phase AC or DC case, the intra-phase balancing controller, as a part of the MCD, receives the reference voltage Vr and collects status information such as state of charge SOCi, temperature Ti, capacity Qi, and voltage Vi from all ConSources of system 100. The balancing controller uses these signals to generate Modulation indexes Mi and a normalized reference waveform Vrn which is then sent to each LCD to generate switching signals. The reference waveform Vrn can be sent continually, and the modulation index can be sent at regular intervals, such as once for every period of the Vrn. The LCD can modulate or scale the normalized reference Vrn by the received modulation index. (The modulation index, in some examples, can be a number between zero and one (inclusive of zero and one).) This modulated or scaled Vrn can be used as Vref (or –Vref) according to the pulse width modulation technique described with respect to FIGS. 14A-14D. In this manner, the modulation index can be used to control the PWM switching signals generated by the LCD, and thus regulate the operation of each ConSource module. For example, a ConSource module being controlled to maintain normal or full operation may receive a modulation index of one, while a ConSource module that is being controlled to less than normal or full operation may receive a modulation index less than one. A ConSource module that is controlled to cease power output may receive a modulation index of zero. Those of ordinary skill in the art will readily recognize, after reading the present description, that other values of the modulation index can be used to achieve similar functionality.

Figure 31:
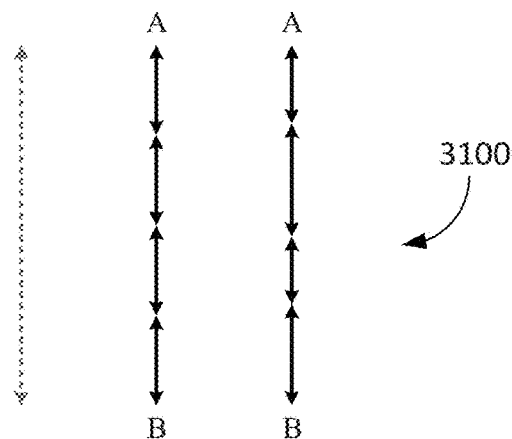
FIG. 31 depicts a phasor diagram of voltage sharing control for an example single-phase system, for use with example embodiments of the present disclosure.

The intra-phase balancing controller can generates a modulation index for each ConSource module according to any number of aspects or operating characteristics described herein, such as its energy source's state of charge, temperature, capacity, and/or voltage in a manner that facilitates the following: the sum of the generated ConSource voltages does not exceed the peak voltage Vpk. a different combination of modulation indexes may be used but the total generated voltage should remain the same, as shown in the phasor diagrams 3100 of FIG. 31; state of charge (SOC) of the battery modules of ConSources remain balanced or converge to the balanced condition if they are unbalanced; and the temperature of the battery modules of ConSources balance when the temperature of at least one battery module of one ConSource goes above a certain threshold.

Since state of charge and temperature balancing may not be possible at the same time, a combination of both may be applied with priority given to either one depending on the requirements of the application.

Figure 32:
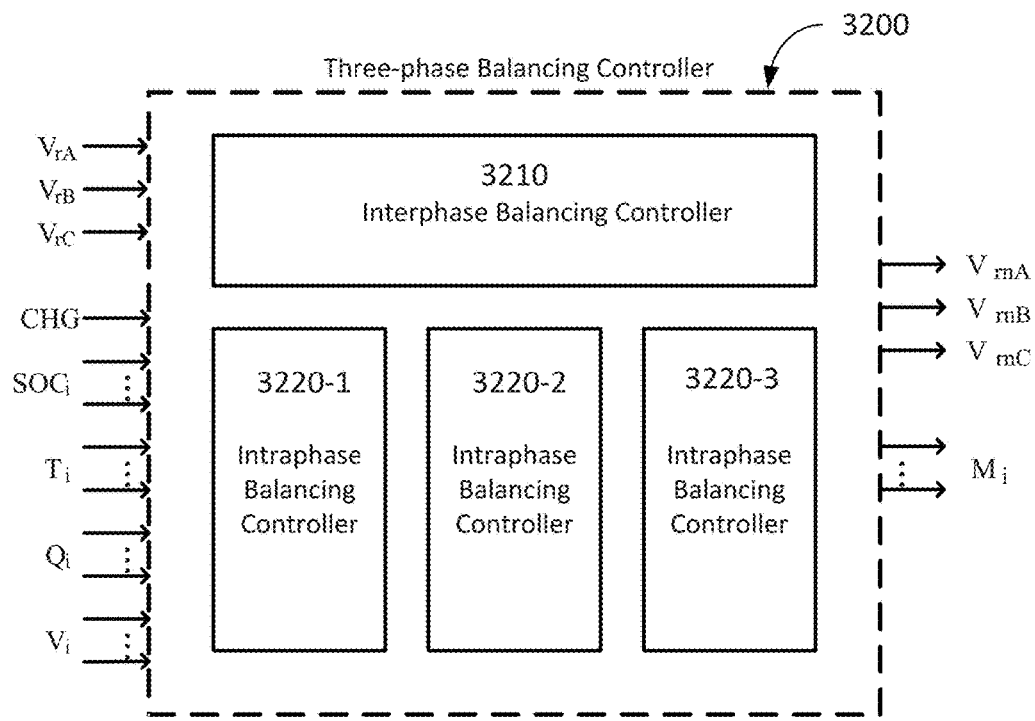
FIG. 32 depicts a schematic depicting an example embodiment of a single-phase balancing controller, for use with example embodiments of the present disclosure.

As shown in FIG. 32, a three-phase balancing controller 3200 can include one inter-phase 3210 and three intra-phase balancing controllers 3220-1, 3220-2, 3220-3. The intra-phase balancing controllers' task is to balance aspects of the ConSource modules within each one-dimensional array, in particular and as an example, within one-phase. The inter-phase balancing controller can balance aspects of the ConSource modules among the entire multi-dimensional array, in particular and as an example, among three phases. In a Y-connection of phases, this may be achieved through injecting common mode to the phases (neutral point shifting) or through common modules or through both. The intra-phase balancing controllers 3220-1, 3220-2, 3220-3 and inter-phase balancing controller 3210 may be implemented in hardware, software or a combination thereof as a centralized controller, as a part of the MCD, or may be distributed partially or fully among the LCDs described herein.

The reference signal input to this system may be $V_{rA}$, $V_{rB}$, $V_{rC}$ or any combination of two of these signals or any other transformation that can recreate these signals such as Clarke transform (i.e., $V_{r\alpha}$, $V_{r\beta}$).

Figure 33A:
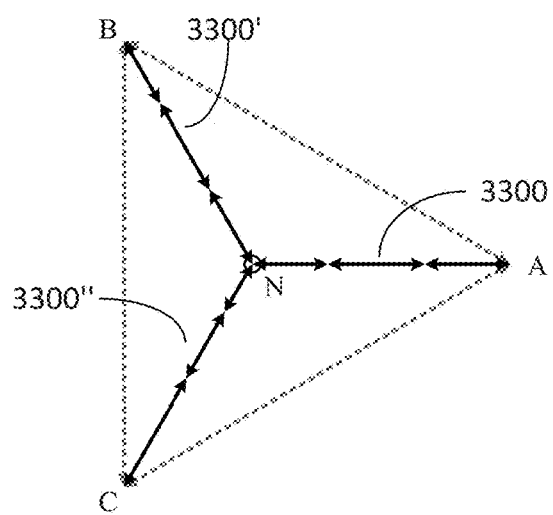
FIGS. 33A and 33B depict phasor diagrams of voltage sharing control for a three-phase structure for (A) intra-phase balancing only and (B) intra-phase and inter-phase balancing.
Figure 33B:
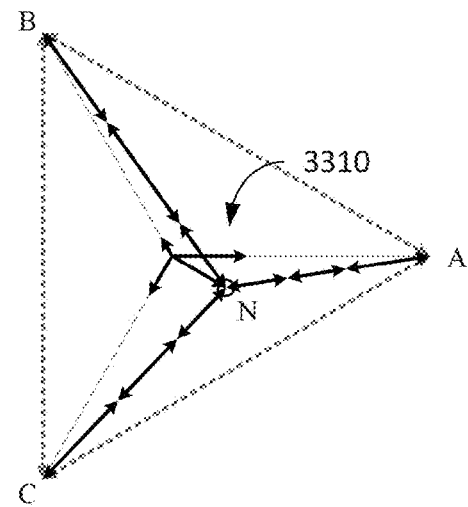

In a Y-connected three-phase structure without common modules between phases (see, e.g., system 100 as described with respect to FIGS. 18 and 22), intra-phase balancing can be achieved by controlling the modulation indexes of the modules within each phase 3300, 3300', 3300" as shown in FIG. 33A. By adding certain common modes to the phase references, the neutral point 'N' may be shifted 3310 as shown in FIG. 33B. This provides control over the share of each phase to establish the three phase voltages. For example in FIG. 33B, assuming that the system is discharging and the total energy available in the modules of phase A is smaller than the total energy available in modules of phase C and that is smaller than the total energy available in modules of phase B, for SOC balancing the neutral point shall be shifted as shown to decrease the contributions of phase A and C respectively and to increase the contribution of phase B.

Figure 34A:
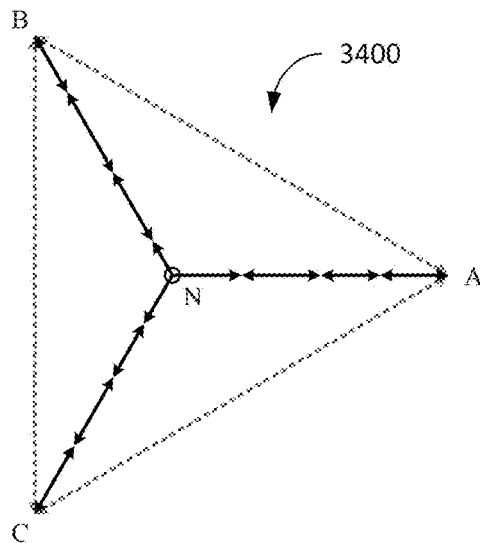
FIGS. 34A and 34B depict phasor diagrams of voltage sharing control for a three-phase structure with common modules with intra-phase and inter-phase balancing through (A) common modules and (B) common modules and neutral point shift.
Figure 34B:
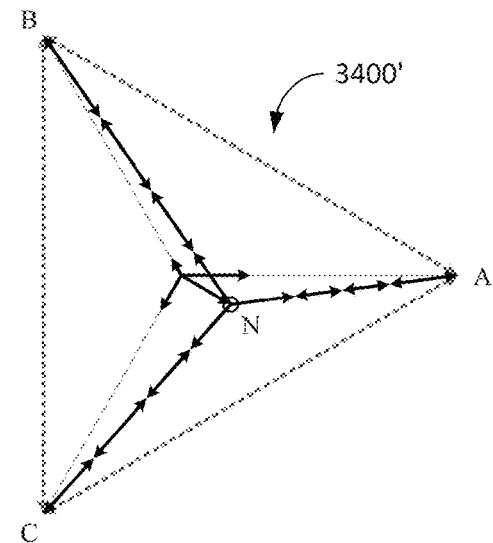

In a Y-connected three-phase structure with common modules between phases 3400, 3400', which are the ConSource V3 modules, (see, e.g., system 100, FIGS. 20 and 24), intra-phase balancing can be achieved by controlling the modulation indexes of the modules within each phase. Inter-phase balancing can be achieved either by: only controlling the contribution of the common module(s) to each phase as shown in FIG. 34A; neutral point shifting; or both as shown in FIG. 34B.

Figure 35A:
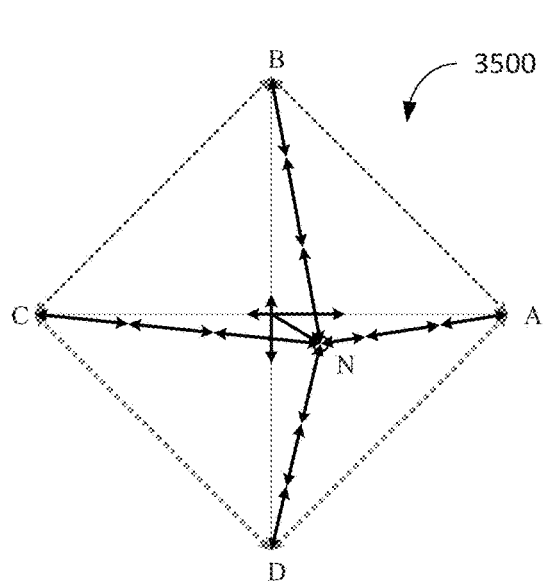
FIGS. 35A and 35B depict phasor diagrams of voltage sharing control with intra-phase and inter-phase balancing for four-phase systems with (A) neutral point shift and (B) common modules and neutral point shift.
Figure 35B:
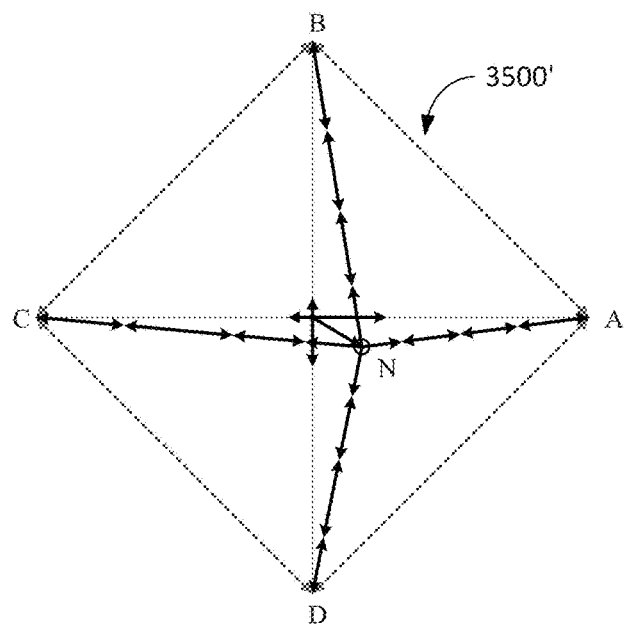

In four-phase systems 3500, 3500', as described with respect to FIG. 35A without common modules (ConSource V3), and in FIG. 35B with common modules (ConSource V3), intra-phase balancing can be achieved by controlling the modulation indexes of the modules within each phase. Inter-phase balancing can be achieved by neutral point shifting and/or by controlling the contribution of the common modules to each phase where applicable.

Figure 36A:
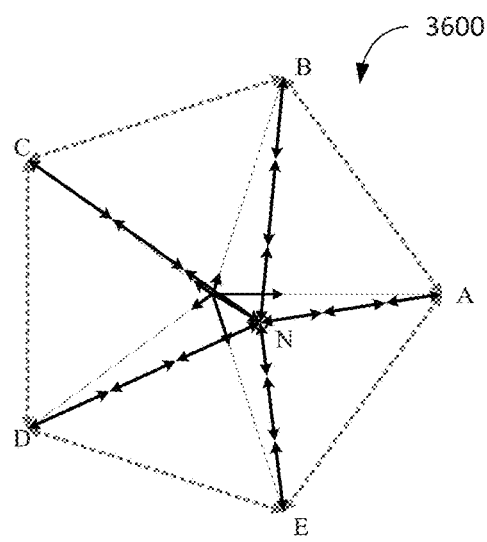
FIGS. 36A and 36B depict phasor diagrams of voltage sharing control with intra-phase and inter-phase balancing for five-phase systems with (A) neutral point shift and (B) common modules and neutral point shift.
Figure 36B:
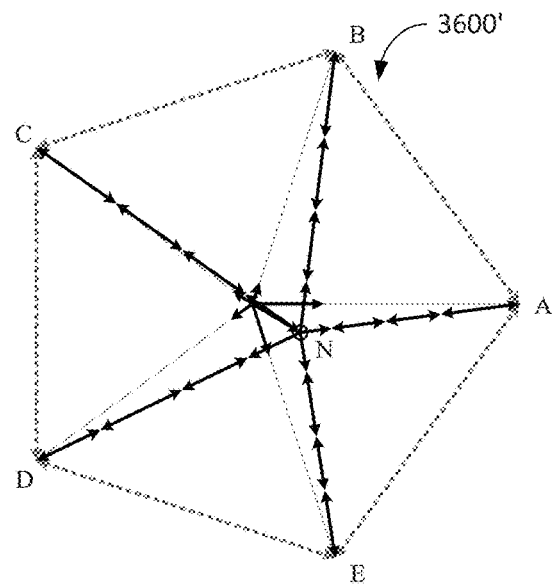

In five-phase systems 3600, 3600', as described with respect to FIG. 36A without common modules (ConSource V3), and FIG. 36B with common modules (ConSource V3), intra-phase balancing can be achieved by controlling the modulation indexes of the modules within each phase. Inter-phase balancing can be achieved by neutral point shifting and/or where applicable, by controlling the contribution of the common modules to each phase.

Figure 37A:
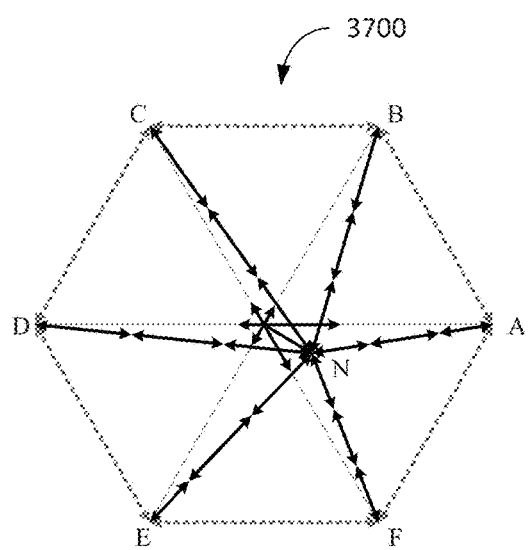
FIGS. 37A and 37B depict phasor diagrams of voltage sharing control with intra-phase and inter-phase balancing for six-phase systems with (A) neutral point shift and (B) common modules and neutral point shift.
Figure 37B:
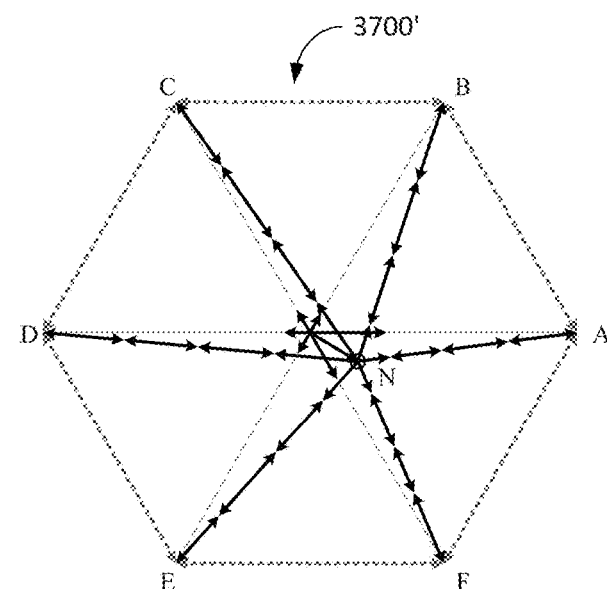

In six-phase systems 3700, 3700' as described with respect to FIG. 37A without common modules (ConSource V3) and FIG. 37B with common modules (ConSource V3), (modification of system 100, FIG. 26), intra-phase balancing can be achieved by controlling the modulation indexes of the modules within each phase. Inter-phase balancing can be achieved by neutral point shifting and/or where applicable, by controlling the contribution of the common modules to each phase.

Figure 38A:
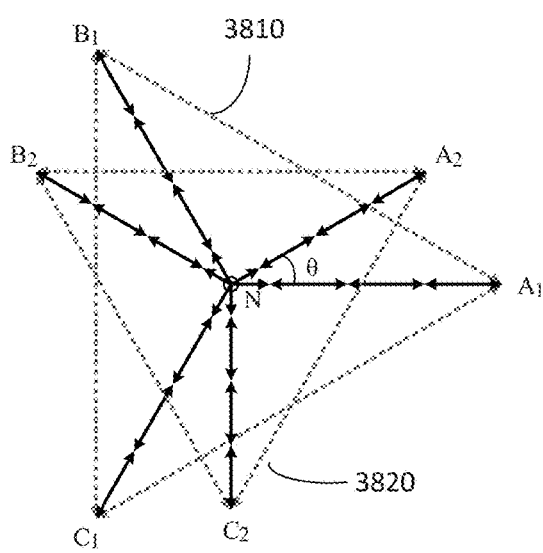
FIGS. 38A and 38B depict phasor diagrams of voltage sharing control with intra-phase and inter-phase balancing for an example system shown in FIG. 27 through (A) common modules and (B) common modules and neutral point shift.
Figure 38B:
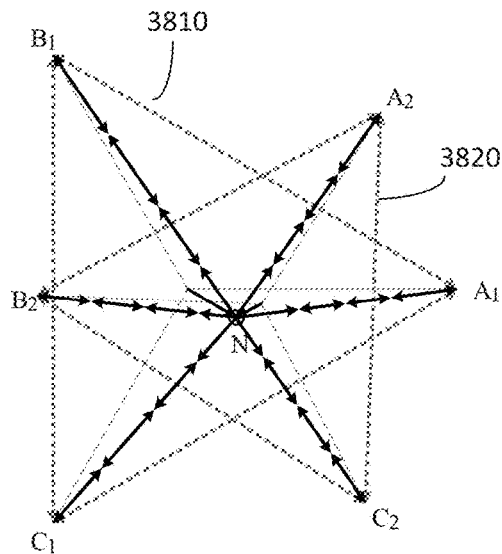

In system 100 as described with respect to FIG. 27, two systems 3810, 3820 of three-phase structures that may run with different voltage and frequency are considered. The intra-phase balancing can be achieved through controlling the modulation indexes of the modules within each phase. Inter-phase balancing within each system and between the two systems can be achieved by controlling the voltage contribution of the common modules (ConSource V3) to each phase as shown in FIG. 38A. Inter-phase balancing within each system 3810, 3820 may further be improved by neutral point shifting as shown in FIG. 38B.

In system 100 as described with respect to FIG. 28, two systems of three-phase structure that run with similar frequency but may have different voltage are considered.

Figure 39A:
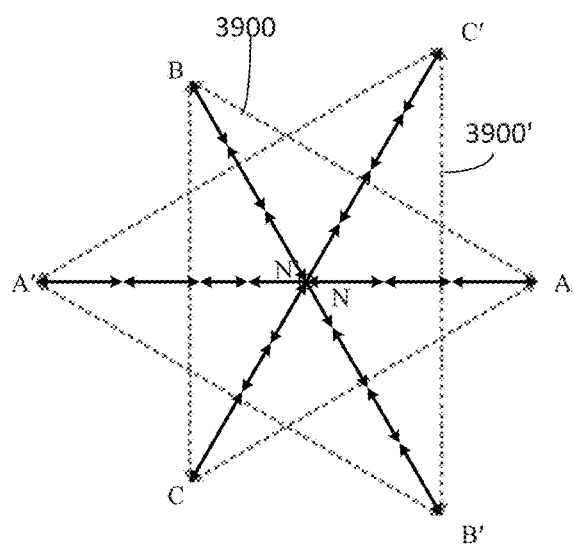
FIGS. 39A and 39B depict phasor diagrams of voltage sharing control with intra-phase and inter-phase balancing for systems shown in FIG. 28 through (A) common modules and (B) common modules and neutral point shift.

In FIG. 39A, since complementary phases in the two systems 3900, 3900' work in pairs to generate voltage across each motor winding, modules in phase pairs may be considered for intra-phase balancing. For example, to establish a certain voltage between A and A', all the modules in the A and A' phases shall contribute respective to their status information.

Figure 39B:
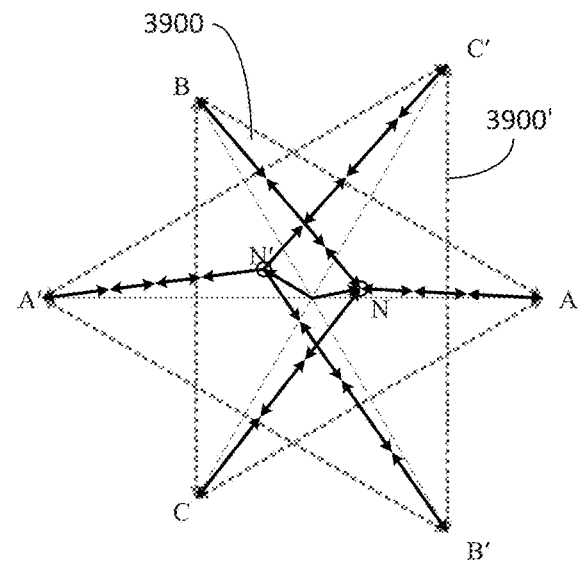

Inter-phase balancing, or in this case balancing between phase pairs may be implemented through common modules as shown in FIG. 39A and/or through neutral points shift as shown in FIG. 39B.

In system 100 as described with respect to FIG. 29, two systems of ACi-battery packs are connected through common modules and are used to drive two motors. Therefore system 1 and system 2 may operate in different voltages and frequencies while in each system the two parts operate at equal frequency but may have different voltages.

Figure 40A:
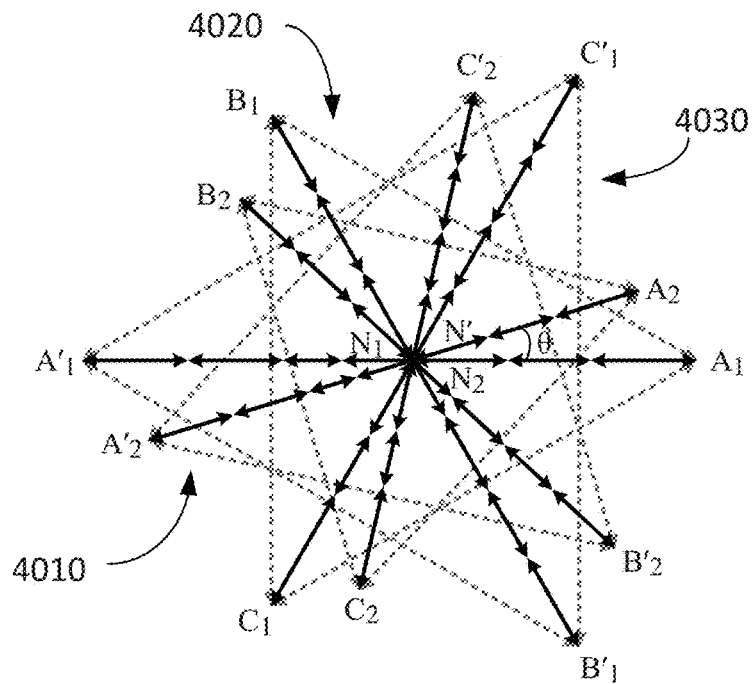
FIGS. 40A and 40B depict phasor diagrams of voltage sharing control with intra-phase and inter-phase balancing for systems shown in FIG. 29 through (A) common modules and (B) common modules and neutral point shift.

Without the neutral point shift, FIG. 40A intra-phase balancing among modules of phase pairs of each system 4010, 4020, 4030 e.g. $A_1$ and $A'_1$ may be implemented. Inter-phase balancing within and between the two systems may be achieved through controlling the voltage contribution of the common modules to each phase in the two systems.

Figure 40B:
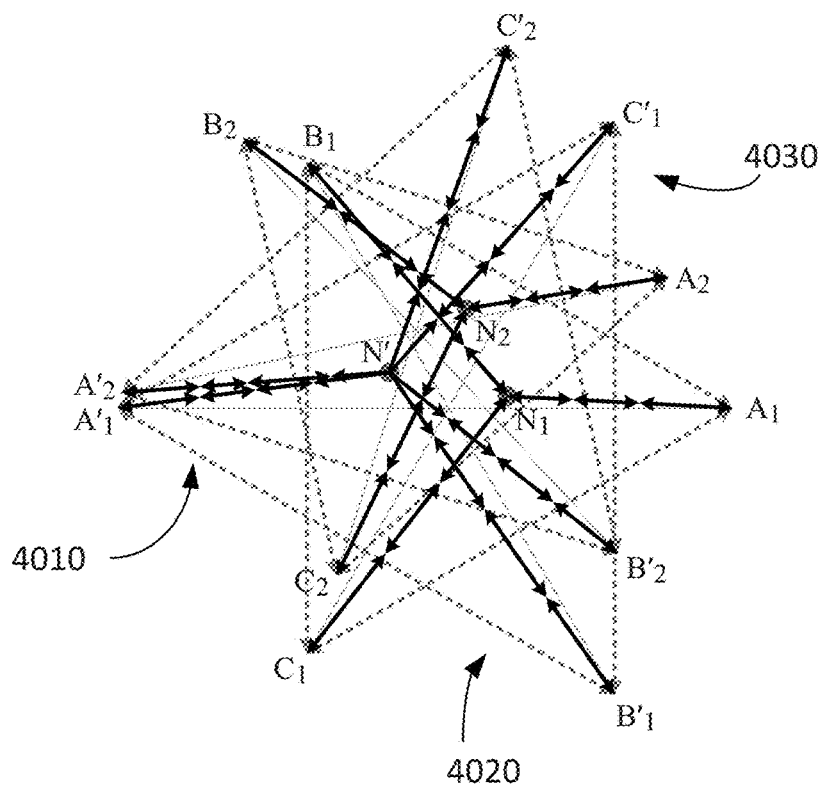

Neutral point shift as shown in FIG. 40B may be added to improve inter-phase and inter-system 4010, 4020, 4030 balancing.

Figure 41:
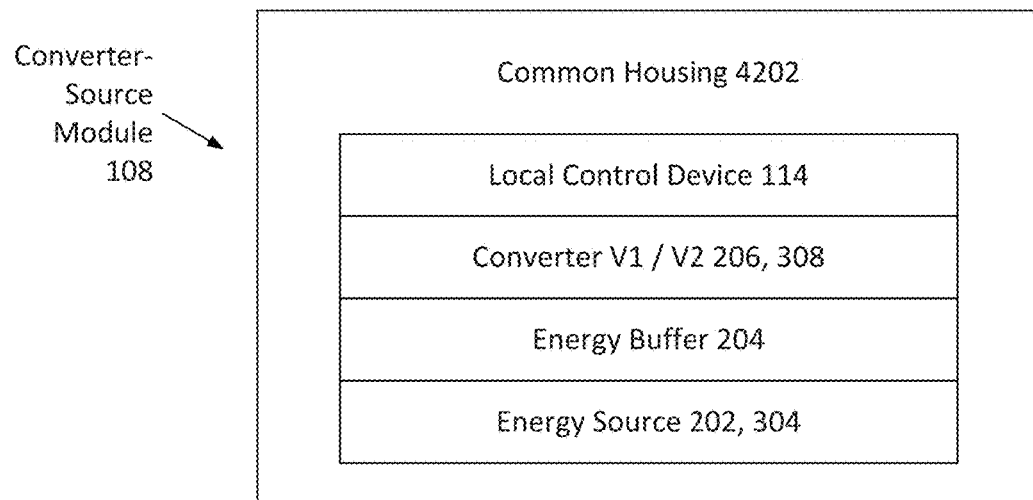
FIGS. 41 and 42 are block diagrams depicting example embodiments of a converter-source module.

In many of the embodiments herein, the ConSource module is shown or described as being separate from the LCD. However, in any and all embodiments described herein, the ConSource module can be configured such that the LCD is a component thereof. For example, FIG. 41 is a block diagram depicting an example embodiment of a converter-source module 108 (which can also be referred to as a ConSource module V1, V2, or V3). In this embodiment, module 108 has a common housing or physical encasement 4202 that holds the LCD 114 for module 108, as well as the Converter V1 or V2 206, 308, the Energy Buffer 204 and Energy Source 1 202 (and optionally Energy Source 2 304 if present). Thus, in this embodiment module 108 is provided or manufactured as an integrated or unitary device or sub-system.

Figure 42:
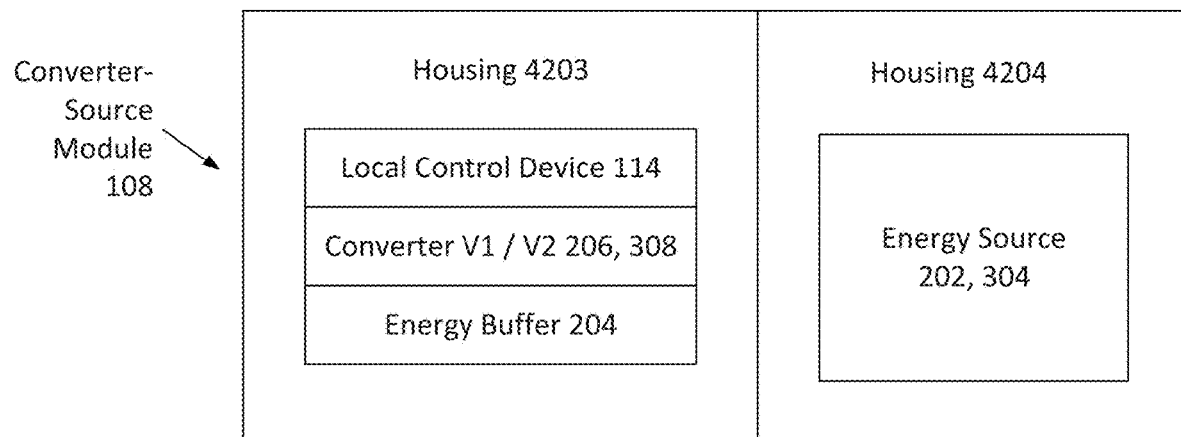

FIG. 42 is a block diagram depicting another example embodiment of a converter-source module 108. In this embodiment, module 108 has a housing or physical encasement 4203 that holds the LCD for module 108, as well as the Converter V1 or V2 and the Energy Buffer. Energy Source 1 202 (and optionally Energy Source 2 304 if present) is provided in a separate housing 4204. Housings 4203 and 4204 can be physically joined or connected together prior to installation in system 100, or can be separate unconnected entities.

Figure 43A:
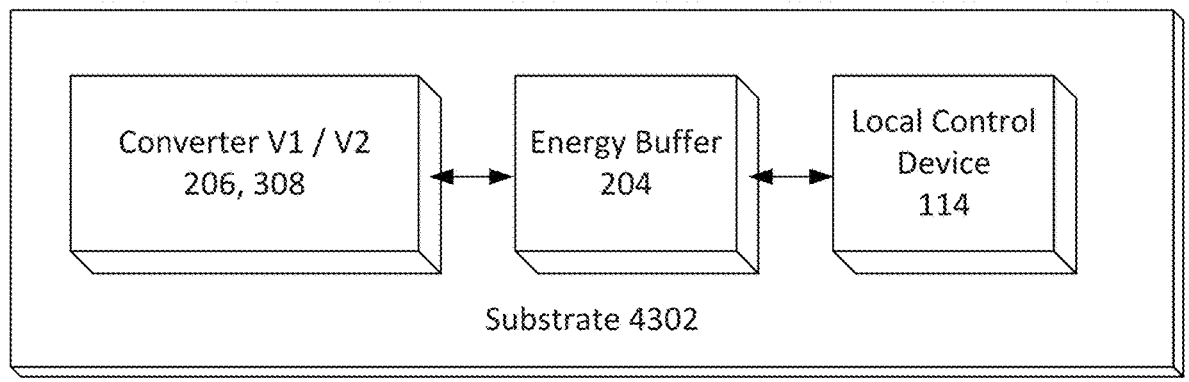
FIGS. 43A and 43B are schematic diagrams depicting example embodiments of a components of a converter-source module mounted on one or more substrates.

In any and all embodiments described herein, the various circuitry components can be integrated on or more substrates to reduce the form factor. For example, the LCD can be part of a ConSource module as described with respect to FIGS. 41-42. FIG. 43A is a schematic view depicting an example embodiment where the LCD 114, converter V1 or V2 206, 308, and Energy Buffer 204 are each mounted or secured to a single common substrate 4302, which can be a single printed circuit board (PCB). These components can be electrically coupled with substrate 4302 and each other to permit the exchanging of signals or data therebetween. Other passive or active componentry can likewise be mounted or secured to substrate 4302.

Figure 43B:
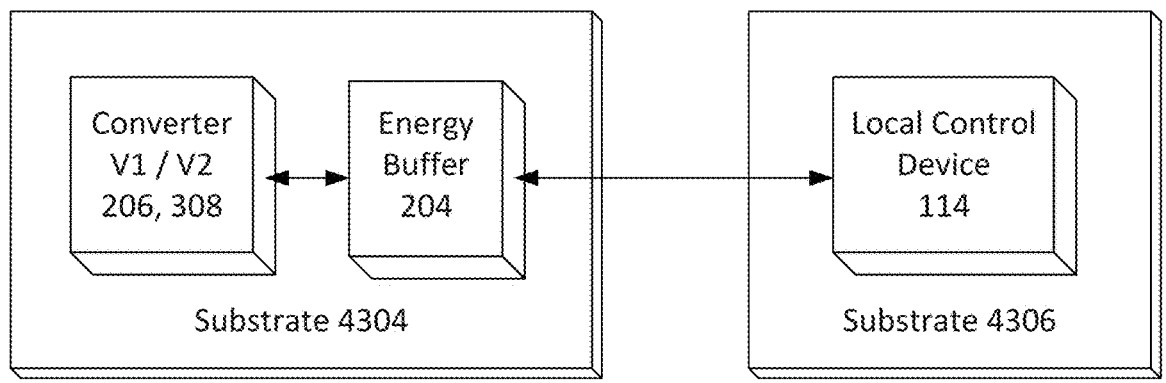

FIG. 43B is a schematic view depicting an example embodiment where the converter V1 or V2 206, 308 and Energy Buffer 204 are each mounted or secured to a single common substrate 4304, which can be a single printed circuit board (PCB). These components can be electrically coupled with substrate 4304 and each other to permit the exchanging of signals or data therebetween. The LCD 114 is mounted or secured to a different substrate 4306, which can also be a single PCB. Other passive or active componentry can likewise be mounted or secured to substrates 4304 and 4306. Communication between the LCD and the components on substrate 4304 can occur over one or more buses, wires, or fiber optics.

In the embodiments described herein, intra-phase balancing can be achieved by the one or more intra-phase balancing controllers, and inter-phase balancing can be achieved by one or more inter-phase balancing controllers. These intra-phase balancing controllers and inter-phase balancing controllers can be implemented in hardware, software, or a combination thereof. These intra-phase balancing controllers and inter-phase balancing controllers can be implemented wholly by a device, such as the master control device. These intra-phase balancing controllers and inter-phase balancing controllers can be implemented in distributed fashion between multiple devices, such as the master control device and one or more local control devices.

In FIGS. 1-8F, 11, 13, 15-30, 32, and 1A-1C and 41-43B, various constituents of the figures (e.g., elements, components, devices, systems, and/or functional blocks) are depicted as being coupled with or connected to one or more other constituents (e.g., elements, components, devices, systems, and/or functional blocks). These constituents are often shown as being coupled or connected without the presence of an intervening entity, such as in a direct coupling or connection. Those of ordinary skill in the art will readily recognize, in light of the present description, that these couplings or connections can be direct (without one or more intervening components) or indirect (with one or more intervening components not shown). Thus, this paragraph serves as antecedent support for all couplings or connections being direct couplings connections or indirect couplings or connections.

A detailed discussion regarding systems (e.g., an ACi-battery pack), devices, and methods that may be used in conjunction with the systems, devices, and methods described herein is provided in International Publication No. WO2019/183553, filed Mar. 22, 2019, entitled Systems And Methods For Power Management And Control, which is incorporated by reference herein for all purposes as if set forth in full.

The embodiments described herein, when used as a battery pack, e.g., in the automotive industry, permit the elimination of the conventional Battery Management System as a sub-system accompanying each battery module. The functionality typically performed by the Battery Management System is subsumed or replaced by the different and in many ways greater functionality of the system embodiments described herein.

A person of ordinary skill in the art would understand that the a "module" as that term is used herein, refers to a device or a sub-system within system 100, and that system 100 does not have to be configured to permit each individual module to be physically removable and replaceable with respect to the other modules. For example, system 100 may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device is configured to generate multiple switching signals for the multiple switches.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the first energy source provides the operating power for the local control device.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device is configured to detect a fault in the converter-source module and generate a fault signal. In these embodiments, the fault signal is indicative of an actual fault or a potential fault. In many of these embodiments, the module-based energy system further includes a master control device communicatively coupled to the local control device, where the local control device is configured to output the fault signal to the master control device.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are implemented together on a single printed circuit board.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are housed within a common housing that does not house the first energy source.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, first energy source, energy buffer, and converter are housed within a common housing that does not house another converter-source module.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are housed within a common housing that does not house the first energy source.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module, and where the energy buffer and converter are implemented together on a single printed circuit board.

In many embodiments, a module-based energy system includes a converter-source module. In these embodiments, the converter-source module includes a first energy source including a fuel cell, an energy buffer coupled with the first energy source, and a converter coupled with the first energy source and the energy buffer, where the converter includes multiple switches configured to select an output voltage of the module.

In many embodiments, a module-based energy system includes a converter-source module. In these embodiments, the converter-source module includes a first energy source, an energy buffer coupled with the first energy source, and a converter coupled with the first energy source and the energy buffer, where the energy buffer includes a Z-source network including two inductors and two capacitors, or a quasi Z-source network including two inductors, two capacitors and a diode. In these embodiments, the converter-source module further includes a converter coupled with the first energy source and the energy buffer, where the converter includes multiple switches configured to select an output voltage of the module.

In many embodiments, a module-based energy system includes a converter-source module. In these embodiments, the converter-source module includes a first energy source, an energy buffer coupled with the first energy source, a second energy source, and a converter including a first input, a second input, and a third input, where the first and third inputs are coupled with the first energy source and the energy buffer, where the second and third inputs are coupled with the second energy source, where the converter further includes multiple switches configured to select an output voltage of the module, and where both the first and second energy sources each include a battery or both the first and second energy sources each do not include a battery.

In many of these embodiments, the first and second energy sources each include a capacitor or a fuel cell. In many of these embodiments, the converter includes a first switch, an inductor, and a second switch, where the first switch is coupled between the first input and a first node, the inductor is coupled between the second input and the first node, and the second switch is coupled between the third input and the first node. In many of these embodiments, the multiple switches include a third switch, a fourth switch, a fifth switch, and a sixth switch. In many of these embodiments, both the first and second energy sources each include a battery, where the second energy source further includes a first capacitor in parallel with the battery. In many of these embodiments, both the first and second energy sources each include a battery, where the second energy source further includes a first capacitor in parallel with the battery and a second capacitor in parallel with the battery.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the converter-source module further includes a first output port for connection to a primary load or another converter-source module and a second output port for connection to an auxiliary load.

In many of these embodiments, the auxiliary load is a first auxiliary load and the converter-source module includes a third output port for connection to a second auxiliary load. In many of these embodiments, the first output port is coupled with a primary load or another converter-source module, the second output port is coupled with the first auxiliary load, and the third output port is coupled with the second auxiliary load. In many of these embodiments, the converter includes a first input, a second input, and a third input, where the first and third inputs are coupled with the first energy source, the energy buffer, and the second output port, and where the second and third inputs are coupled with the third output port. In many of these embodiments, the converter includes a first switch, an inductor, and a second switch, where the first switch is coupled between the first input and a first node, the inductor is coupled between the second input and the second node, and the second switch is coupled between the third input and the first node. In many of these embodiments, the multiple switches include a third switch, a fourth switch, a fifth switch, and a sixth switch. In many of these embodiments, third switch, fourth switch, fifth switch, and sixth switch are coupled together as an H-bridge. In many of these embodiments, the first output port includes a first output and a second output, where the third switch is coupled between the first input and the first output, the fourth switch is coupled between the third input and the first output, the fifth switch is coupled between the first input and the second output, and the sixth switch is coupled between the third input and the second output.

In many of the aforementioned embodiments, the module-based energy system further includes multiple converter-source modules coupled with the converter-source module in an array.

In many of these embodiments, each of the converter-source modules in the multiple converter-source modules includes a first energy source, an energy buffer coupled with the first energy source, and a converter including multiple switches configured to select an output voltage of that converter-source module. In many of these embodiments, the multiple switches select between a first voltage with a positive polarity, a zero or reference voltage, and the first voltage with a negative polarity. In many of these embodiments, the first voltage is a direct current (DC) voltage. In many of these embodiments, the array is configured to output an alternating current (AC) signal.

In many of the aforementioned embodiments, the converter includes one or more sensors configured to output one or more sensed signals indicative of a temperature of the first energy source, a state of charge of the first energy source, a voltage of the first energy source, or a current.

In many of the aforementioned embodiments, the module-based energy system further includes a local control device communicatively coupled with the converter-source module.

In many of these embodiments, the module-based energy system further includes multiple converter-source modules and multiple local control devices, where each local control device in the multiple local control devices is dedicated for use with one converter-source module of the multiple converter-source modules. In many of these embodiments, the converter-source module is a first converter-source module, where the system includes a second converter-source module, and where the local control device controls both the first and second converter-source modules.

In many of the aforementioned embodiments, the local control device includes processing circuitry and a memory communicatively coupled with the processing circuitry, where the memory includes instructions executable by the processing circuitry.

In many of the aforementioned embodiments, the local control device is configured to generate switching signals for the converter using pulse width modulation.

In many of these embodiments, the local control device is configured to modulate or scale a received reference signal and use the modulated reference signal for generation of the switching signals. In many of these embodiments, the local control device is configured to use a received modulation index to modulate the received reference signal.

In many of the aforementioned embodiments, the local control device is configured to receive one or more signals indicative of one or more of the following operating characteristics of the converter-source module or a component thereof: temperature, state of charge, capacity, state of health, voltage, or current.

In many of these embodiments, the local control device is configured to communicate, to a master control device, information indicative of one or more of the following operating characteristics of the converter-source module or a component thereof: temperature, state of charge, capacity, state of health, voltage, or current.

In many of the aforementioned embodiments, the local control device is powered only by the first energy source.

In many of the aforementioned embodiments, the local control device is powered by an energy source other than the first energy source.

In many of the aforementioned embodiments, the converter-source module includes a second energy source, where the local control device is configured to cause the converter-source module to actively filter a second order harmonic in an output current from the first energy source with current from the second energy source.

In many of these embodiments, the first energy source includes a battery and the second energy source includes a capacitor. In many of these embodiments, the capacitor of the second energy source is an ultra-capacitor or super-capacitor.

In many of the aforementioned embodiments, the converter-source module includes a second energy source, where the local control device is configured to control the converter to manage power transfer: from the first energy source to a cumulative load of converter-source modules, from the second energy source to the cumulative load of converter-source modules, and between the first energy source and second energy source.

In many of these embodiments, power transfer between the first energy source and second energy source includes power transfer from the first energy source to the second energy source and power transfer from the second energy source to the first energy source. In many of these embodiments, the local control device is configured to control the converter to manage power transfer based, at least in part, on a power consumption of a first auxiliary load and a power consumption of a second auxiliary load. In many of these embodiments, the local control device includes a processor and memory, where the memory includes instructions that, when executed by the processing circuitry, cause the processing circuitry to manage power transfer: from the first energy source to a cumulative load of converter-source modules, from the second energy source to the cumulative load of converter-source modules, and between the first energy source and second energy source. In many of these embodiments, the local control device is configured to manage power transfer by generation of switching signals for the converter.

In many of the aforementioned embodiments, the module-based energy system further includes a master control device configured to manage one or more operating parameters of the converter-source module relative to one or more operating parameters of other converter-source modules within the system.

In many of the aforementioned embodiments, the module-based energy system further includes a master control device communicatively coupled with the local control device.

In many of these embodiments, the master control device is communicatively coupled with the local control device over a serial data cable. In many of these embodiments, the master control device includes processing circuitry and a memory communicatively coupled with the processing circuitry, where the memory includes instructions executable by the processing circuitry. In many of these embodiments, the module-based energy system further includes multiple local control devices coupled with multiple converter-source modules, where the master control device is communicatively coupled with each of the local control devices of the multiple local control devices. In many of these embodiments, the master control device is configured to read data indicative of one or more operating characteristics of the multiple converter-source modules, and to determine a contribution for at least one converter-source module of the multiple converter-source modules. In many of these embodiments, the master control device is configured to determine a contribution for each of the multiple converter-source modules. In many of these embodiments, the master control device is configured to output a modulation or scaling index for each of the multiple converter-source modules, where the modulation or scaling index is indicative of power flow contribution. In many of these embodiments, the master control device is configured to output a reference signal to each of the local control devices, where each of the local control devices is configured to modulate or scale the reference signal with a received modulation or scaling index, and generate switching signals based on the modulated or scaled reference signal.

In many of the aforementioned embodiments, the module-based energy system is configured for operation in a mobile entity.

In many of these embodiments, the mobile entity is one of: a car, a bus, a truck, a motorcycle, a scooter, an industrial vehicle, a mining vehicle, a flying vehicle, a maritime vessel, a locomotive, a train or rail-based vehicle, or a military vehicle.

In many of the aforementioned embodiments, the module-based energy system is configured for operation as a stationary energy system.

In many of these embodiments, the stationary energy system is one of: a residential storage system, an industrial storage system, a commercial storage system, a data center storage system, a grid, a micro-grid, or a charging station.

In many of the aforementioned embodiments, the module-based energy system is configured as a battery pack for an electric vehicle.

In many embodiments, a module-based energy system includes multiple converter-source modules, each including a first energy source, an energy buffer, and a converter electrically coupled together, where the multiple converter-source modules are electrically coupled together in an array. In these embodiments, the module-based energy system further includes control circuitry communicatively coupled with the multiple converter-source modules, where the control circuitry is configured to monitor at least one operating characteristic of each of the multiple converter-source modules and, based on the monitored at least one operating characteristic, independently control each converter-source module within the multiple converter-source modules for performance optimization of the array.

In many of these embodiments, the at least one operating characteristic is selected from: state of charge, temperature, state of health, capacity, fault presence, voltage, or current. In many of these embodiments temperature is at least one of: a temperature of the first energy source or a component thereof, a temperature of the energy buffer or a component thereof, a temperature of the converter or a component thereof. In many of these embodiments, capacity is at least one of: capacity of the first energy source or capacity of one or more components of the first energy source. In many of these embodiments, fault presence is at least one of: an indication of the presence of a measured fault, an indication of the presence of a potential fault; an indication of the presence of an alarm condition, or an indication of the presence of a warning condition. In many of these embodiments, voltage is at least one of: a voltage of the first energy source or a component thereof, a voltage of the energy buffer or a component thereof, a voltage of the converter or a component thereof. In many of these embodiments, current is at least once of: a current of the first energy source or a component thereof, a current of the energy buffer or a component thereof, a current of the converter or a component thereof. In many of these embodiments, each converter-source module includes at least one sensor to sense the at least one operating characteristic. In many of these embodiments, the control circuitry is configured to monitor all of the following operating characteristics: state of charge, temperature, state of health, capacity, fault presence, voltage, and current. In many of these embodiments, the control circuitry is configured to independently control discharging or charging of each converter-source module by generation of multiple switching signals and output of the multiple switching signals to the converter of each converter-source module. In many of these embodiments, the control circuitry is configured to generate the multiple switching signals with pulse width modulation or hysteresis.

In many of these embodiments, at least one converter-source module of the multiple converter-source modules is a converter-source module as described in many of the aforementioned embodiments.

In many of these embodiments, every converter-source module of the multiple converter-source modules is a converter-source module as described in many of the aforementioned embodiments.

In many of these embodiments, the control circuitry is configured to independently control discharging or charging of each converter-source module within the multiple converter-source modules for performance optimization of the array. In many of these embodiments, the control circuitry is configured to independently control discharging or charging of each converter-source module based on a power requirement of a load coupled with the array. In many of these embodiments, the load is a motor, a commercial structure, a residential structure, an industrial structure, or an energy grid. In many of these embodiments, the control circuitry includes multiple local control devices and a master control device communicatively coupled with the multiple local control devices.

In many embodiments, a module-based energy system includes an array of N converter-source modules, where N is 2 or greater, where each of the N converter-source modules is connected in series, where each of the N converter-source modules is configured according to any of the aforementioned embodiments, and where the array includes a first output terminal of a first converter-source module and a second output terminal of an Nth converter-source module.

In many of these embodiments, the module-based energy system further includes multiple local control devices, each communicatively coupled with one or more of the N converter-source modules. In many of these embodiments, the module-based energy system further includes a master controller communicatively coupled with the multiple local control devices. In many of these embodiments, the module-based energy system further includes a load connected between the first and second output terminals. In many of these systems, the load is one of a DC load or a single-phase AC load.

In many embodiments, a module-based energy system includes M arrays of converter-source modules, where M is 2 or greater, where each of the M arrays includes N converter-source modules, where N is 2 or greater, where each of the N converter-source modules is connected in series in each of the M arrays, where each of the N converter-source modules is configured according to any of aforementioned embodiments, where each of the M arrays includes an individual output terminal of a first converter-source module, and where an Nth converter-source module of each of the M arrays is connected to a common output terminal.

In many of these embodiments, the module-based energy system further includes multiple local control devices, each communicatively coupled with one or more of the N converter-source modules of each of the M arrays. In many of these embodiments, the module-based energy system further includes a master controller communicatively coupled with the multiple local control devices. In many of these embodiments, the M arrays includes first and second arrays. In many of these embodiments, the module-based energy system further includes a load connected between the individual output terminals of the first and second arrays. In many of these embodiments, the common output terminal is coupled to a neutral of the load. In many of these embodiments, the module-based energy system further includes a load connected between the common output terminal and a joint coupling of the individual output terminals of the first and second arrays. In many of these embodiments, the load is one of a DC load or a single-phase AC load. In many of these embodiments, the M arrays includes first, second and third arrays. In many of these embodiments, the module-based energy system further includes a three-phase load connected between the individual output terminals of the first, second and third arrays. In many of these embodiments, the common output terminal is coupled to a neutral of the load. In many of these embodiments, the module-based energy system further includes a DC or single phase AC load connected between the common output terminal and a joint coupling of the individual output terminals of the first, second and third arrays.

In many embodiments, a module-based energy system includes first and second arrays of converter-source modules, where the first array includes N converter-source modules and the second array includes N–1 converter-source modules, where N is 2 or greater, where each of the N converter-source modules is connected in series in the first array and each of the N–1 converter-source modules is connected in series in the second array, where each of the N converter-source modules and N–1 converter-source modules includes an energy source, an energy buffer and a converter, where each of the first and second arrays includes an individual output terminal of a first converter-source module, and where an Nth converter-source module of each of the first array and an N–1th converter-source module of the second array are connected to a common output terminal.

In many of these embodiments, the module-based energy system further includes multiple local control devices, each communicatively coupled with one or more of the N converter-source modules and N–1 converter-source modules. In many of these embodiments, the module-based energy system further includes a master controller communicatively coupled with the multiple local control devices. In many of these embodiments, the module-based energy system further includes a load connected between the individual output terminals of the first and second arrays. In many of these embodiments, the common output terminal is coupled to a neutral of the load. In many of these embodiments, the module-based energy system further includes a load connected between the common output terminal and a joint coupling of the individual output terminals of the first and second arrays. In many of these embodiments, the load is one of a DC load or a single-phase AC load. In many of these embodiments, the load is one of a DC load or a single-phase AC load.

In many embodiments, a module-based energy system includes first, second and third arrays of converter-source modules, where each of the first, second and third arrays includes N+M converter-source modules, where N is 2 or greater and M is 2 or greater, where each of the N+M converter-source modules includes an energy source, an energy buffer and a converter, where each of the N+M converter-source modules includes first and second ports, where each of the first, second and third arrays includes an individual output terminal coupled to a first port of a first converter-source module, where the first converter-source module through an Nth converter-source module of each of the first, second and third arrays are connected in series, where the Nth converter-source module through an N+Mth converter-source module of each of the first, second and third arrays are connected in series, where the second port of the N+Mth converter-source module of the first array is connected to the first port of the Nth converter-source module of the second array, where the second port of the N+Mth converter-source module of the second array is connected to the first port of the Nth converter-source module of the third array, and where the second port of the N+Mth converter-source module of the third array is connected to the first port of the Nth converter-source module of the first array.

In many of these embodiments, the series connection of the first converter-source module through an Nth converter-source module of each of the first, second and third arrays includes the first port of a second converter-source module through an Nth converter-source module of each of the first, second and third arrays being connected to the second port of a preceding converter-source module in a series of converter-source modules including the first converter-source module through an N−1th converter-source module. In many of these embodiments, the series connection of the Nth converter-source module through an N+Mth converter-source module of each of the first, second and third arrays includes the first port of an Nth+1 converter-source module through the N+Mth converter-source module of each of the first, second and third arrays being connected to the second port of a preceding converter-source module in a series of converter-source modules including the Nth converter-source module through an N+(M−1)th converter-source module. In many of these embodiments, the module-based energy system further includes multiple local control devices, each communicatively coupled with one or more of the N+M converter-source modules. In many of these embodiments, the module-based energy system further includes a master controller communicatively coupled with the multiple local control devices. In many of these embodiments, the module-based energy system further includes a load connected between the individual output terminals of the first, second and third arrays. In many of these embodiments, the load is one of a DC or single-phase AC load, or three-phase AC loads.

In many embodiments, a module-based energy system includes first, second and third arrays of converter-source modules, where each of the first and third arrays includes N+1 converter-source modules and the second array includes N converter-source modules, where N is 2 or greater, where each of a first converter-source module through an Nth converter-source module includes an energy source, an energy buffer and a converter, where an N+1th converter-source module of each of the first and third arrays includes an energy source, an energy buffer, a converter and is configured for connection to one or more auxiliary loads, where each of the first converter-source module through the Nth converter-source module includes first and second ports, where the N+1th converter-source module of each of the first and third arrays includes first, second, third and fourth ports, where first, second and third output terminals, respectively, are coupled to the first port of the first converter-source module of the first, second and third arrays, respectively, where the first converter-source module through the Nth converter-source module of each of the first, second and third arrays are connected in series, where the second port of Nth converter-source module of each of the first and third arrays, respectively, are connected to the first port of N+1th converter-source module of each of the first and third arrays, respectively, where the second port of the N+1th converter-source module of the first array is connected to the second port of the Nth converter-source module of the second array, where the second port of the N+1th converter-source module of the third array is connected to a fourth output terminal, and where the third and fourth ports, respectively, of the N+1th converter-source module of the first array are connected to the third and fourth ports, respectively, of the N+1th converter-source module of the third array.

In many of these embodiments, the second port of a second converter-source module of the third array is connected to the first port of the first converter-source module of the first array. In many of these embodiments, the N+1th converter-source module of each of the first and third arrays further include fifth and sixth ports, and where the one or more auxiliary loads of the N+1th converter-source module of the first and third arrays include a first auxiliary load connected to the fifth and sixth ports of the N+1th converter-source module of each of the first and third arrays and a second auxiliary load connected to the third and fourth ports of the N+1th converter-source module of each of the first and third arrays. In many of these embodiments, the module-based energy system further includes multiple local control devices, each communicatively coupled with one or more of the N+1 converter-source modules of the first and third arrays and the N converter-source modules of the second array. In many of these embodiments, the module-based energy system further includes a master controller communicatively coupled with the multiple local control devices. In many of these embodiments, the module-based energy system further includes multiple local control devices, each communicatively coupled with one or more of the N+1 converter-source modules of the first and third and the N converter-source modules of the second array. In many of these embodiments, the module-based energy system further includes a master controller communicatively coupled with the multiple local control devices. In many of these embodiments, the module-based energy system further includes a load connected between the first, second and third output terminals of the first, second and third arrays. In many of these embodiments, the load is one of a DC or single-phase AC load, or three-phase AC loads. In many of these embodiments, the module-based energy system further includes a load connected between the first, second and third output terminals of the first, second and third arrays. In many of these embodiments, the module-based energy system further includes a load connected between the first, second and third output terminals of the first, second and third arrays. In many of these embodiments, the load is one of a DC or single-phase AC load, or three-phase AC loads.

In many embodiments, a module-based energy system includes first, second, third, fourth, fifth and sixth arrays of converter-source modules, where each of the first, third and fifth arrays includes N+1 converter-source modules and each of the second, fourth and sixth arrays includes N converter-source modules, where N is 2 or greater, where each of the N converter-source modules and N+1 converter-source modules includes an energy source, an energy buffer and a converter, where each of the first converter-source module through the Nth converter-source module includes first and second ports, where the N+1th converter-source module of each of the first, third and fifth arrays include first, second, third, fourth, fifth and sixth ports, and where a first auxiliary load is connected to the fifth and sixth ports of the N+1th converter-source module of each of the first, third and fifth arrays and a second auxiliary load connected to the third and fourth ports of the N+1th converter-source module of each of the first, third and fifth arrays, where first, second, third, fourth, fifth and sixth output terminals, respectively, are coupled to the first port of the first converter-source module of the first, second, third, fourth, fifth and sixth arrays, respectively, where the first converter-source module through the Nth converter-source module of each of the first, second, third, fourth, fifth and sixth arrays are connected in series, where the second port of Nth converter-source module of each of the first, third and fifth arrays, respectively, are connected to the first port of N+1th converter-source module of each of the first, third and fifth arrays, respectively, where the second port of the N+1th converter-source module of the first array is connected to the second port of the Nth converter-source module of the second array, where the second port of the N+1th converter-source module of the third array is connected to the second port of the Nth converter-source module of the fourth array, and where the second port of the N+1th converter-source module of the fifth array is connected to the second port of the Nth converter-source module of the sixth array.

In many of these embodiments, the module-based energy system further includes multiple local control devices, each communicatively coupled with one or more of the N+1 converter-source modules of the first, third and fifth arrays and one or more of the N converter-source modules of the second, fourth and sixth arrays. In many of these embodiments, the module-based energy system further includes a master controller communicatively coupled with the multiple local control devices. In many of these embodiments, the energy system further includes a load connected between the first, second, third, fourth, fifth and sixth output terminals of the first, second, third, fourth, fifth and sixth arrays. In many of these embodiments, the load is a six-phase AC load.

In many embodiments, a module-based energy system includes K one-dimensional arrays of interconnected converter-source modules, where K is 3 or greater and is an odd integer, each of the first and Kth arrays and every odd integer array there between includes N+M+1 converter-source modules and each of every even integer array between a second array and an K−1th array includes N+M converter-source modules, and where N and M are 2 or greater, where each of a first converter-source module through an N+Mth converter-source module includes an energy source, an energy buffer and a converter, where an N+M+1th converter-source module of each of the first, Kth and other odd integer arrays includes an energy source, an energy buffer, a converter and is configured for connection to one or more auxiliary loads, where each of the first converter-source module through the N+Mth converter-source module of each of the K arrays includes first and second ports, where the N+M+1th converter-source module of each of the first, Kth and other odd integer arrays includes first, second, third and fourth ports, where K individual output terminals are coupled to the first port of the first converter-source module of each of the K arrays, respectively, where the first converter-source module through the N+Mth converter-source module of each of the K arrays are connected in series, where the second port of N+Mth converter-source module of each of the first, Kth and other odd integer arrays, respectively, are connected to the first port of N+M+1th converter-source module of each of the first, Kth and other odd integer arrays, respectively, where the second port of the N+Mth converter-source module of the second, K−1th and other even integer arrays there between is connected to the second port of the N+M+1th converter-source module of a preceding array of the K arrays, where the second port of the N+M+1th converter-source module of the Kth array is connected to a K+1th output terminal, and where the third and fourth ports, respectively, of the N+M+1th converter-source module of the first, Mth and other odd integer arrays are connected to one another.

In many of these embodiments, the second port of a Nth converter-source module of the Kth array is connected to the first port of the first converter-source module of the first array. In many of these embodiments, the first port of the first converter-source module in the second through Kth array is connected to the second port of the Nth converter-source module of the preceding array. In many of these embodiments, the module-based energy system further includes multiple local control devices, each communicatively coupled with one or more of the N+M+1 converter-source modules of the first, Kth and other odd integer arrays and each of the N+M converter-source modules of the second, M−1th and other even integer arrays. In many of these embodiments, the module-based energy system further includes a master controller communicatively with the multiple local control devices. In many of these embodiments, the module-based energy system further includes a multi-phase load connected between the first through Kth output terminals of the K arrays. In many of these embodiments, the module-based energy system further includes a multi-phase load connected between the first through Kth output terminals of the K arrays. In many of these embodiments, the module-based energy system further includes a load connected between the first, second and third output terminals of the M arrays. In many of these embodiments, the module-based energy system further includes a load connected between the first, second and third output terminals of the M arrays. In many of these embodiments, the load is one of a DC or single-phase AC load, or three-phase AC loads.

In many embodiments, a module-based energy system includes first, second, third, fourth, fifth and sixth arrays of N converter-source modules, where N is 2 or greater, where each of the N converter-source modules includes an energy source, an energy buffer and a converter, and first and second ports, where first, second, third, fourth, fifth and sixth output terminals, respectively, are coupled to the first port of the first converter-source module of the first, second, third, fourth, fifth and sixth arrays, respectively, where a first three-phase AC load is connected between the first, second and third output terminals of the first, second and third arrays, where a second three-phase AC load is connected between the fourth, fifth and sixth output terminals of the fourth, fifth and sixth arrays, where the N converter-source modules of each of the first, second, third, fourth, fifth and sixth arrays are connected in series, where the second port of the Nth converter-source module of the first array is connected to the second port of the Nth converter-source module of the fourth array, where the second port of the Nth converter-source module of the second array is connected to the second port of the Nth converter-source module of the fifth array, where the second port of the Nth converter-source module of the third array is connected to the second port of the Nth converter-source module of the sixth array, where the Nth converter-source module of each of the first, second and third arrays further includes third, fourth, fifth and sixth ports, and where a first auxiliary load is connected to the fifth and sixth ports of the Nth converter-source module of each of the first, second and third arrays and a second auxiliary load connected to the third and fourth ports of the Nth converter-source module of each of the first, third and third arrays.

In many of these embodiments, the module-based energy system further includes multiple local control devices, each communicatively coupled with one or more of the N converter-source modules of the first, second, third, fourth, fifth and sixth arrays. In many of these embodiments, the module-based energy system further includes a master controller communicatively coupled with the multiple local control devices.

In many embodiments, a module-based energy system includes first, second, third and fifth arrays of N converter-source modules and fourth and sixth arrays of N+1 converter-source modules, where N is 2 or greater, where each of the N converter-source modules and N+1 converter-source modules includes an energy source, an energy buffer and a converter, and first and second ports, where first, second, third, fourth, fifth and sixth output terminals, respectively, are coupled to the first port of the first converter-source module of the first, second, third, fourth, fifth and sixth arrays, respectively, where a six-phase AC load is connected between the first, second, third, fourth, fifth and sixth output terminals of the first, second, third, fourth, fifth and sixth arrays, where the N converter-source modules of each of the first, second, third and fifth arrays and the N+1 converter-source modules of each of the fourth and sixth arrays are connected in series, where the second port of the N+1th converter-source module of the fourth array is connected to the second port of the Nth converter-source module of the fifth array, where the second port of the N+1th converter-source module of the sixth array is connected to a fourth output terminal, where the N+1th converter-source module of each of the fourth and sixth arrays further includes third, fourth, fifth and sixth ports, and where a first auxiliary load is connected to the fifth and sixth ports of the Nth converter-source module of each of the first, second and third arrays and a second auxiliary load connected to the third and fourth ports of the Nth converter-source module of each of the first, third and third arrays.

In many of these embodiments, the module-based energy system further includes multiple local control devices, each communicatively coupled with one or more of the N converter-source modules of the first, second and third arrays and N+1 converter-source modules of the fourth and sixth arrays. In many of these embodiments, the module-based energy system further includes a master controller communicatively coupled with the multiple local control devices.

In many embodiments, a module-based energy system includes first, second, third, fourth, fifth, sixth, seventh, eighth, ninth, tenth, eleventh and twelfth arrays of N converter-source modules, where N is 2 or greater, where each of the N converter-source modules includes an energy source, an energy buffer and a converter, and first and second ports, where first, second, third, fourth, fifth, sixth, seventh, eighth, ninth, tenth, eleventh and twelfth output terminals, respectively, are coupled to the first port of the first converter-source module of the first, second, third, fourth, fifth, sixth, seventh, eighth, ninth, tenth, eleventh and twelfth arrays, respectively, where a first six-phase AC load is connected between the first, second, third, seventh, eighth and ninth output terminals of the first, second, third, seventh, eighth and ninth arrays, where a second three-phase AC load is connected between the fourth, fifth, sixth, tenth, eleventh and twelfth output terminals of the fourth, fifth, sixth, tenth, eleventh and twelfth arrays, where the N converter-source modules of each of the first, second, third, fourth, fifth, sixth, seventh, eighth, ninth, tenth, eleventh and twelfth arrays are connected in series, where the second port of the Nth converter-source module of the first array is connected to the second port of the Nth converter-source module of the fourth array, where the second port of the Nth converter-source module of the second array is connected to the second port of the Nth converter-source module of the fifth array, where the second port of the Nth converter-source module of the third array is connected to the second port of the Nth converter-source module of the sixth array, where the Nth converter-source module of each of the first, second and third arrays further includes third, fourth, fifth and sixth ports, and where a first auxiliary load is connected to the fifth and sixth ports of the Nth converter-source module of each of the first, second and third arrays and a second auxiliary load connected to the third and fourth ports of the Nth converter-source module of each of the first, third and third arrays.

In many of these embodiments, the module-based energy system further includes multiple local control devices, each communicatively coupled with one or more of the N converter-source modules of the first, second, third, fourth, fifth, sixth, seventh, eighth, ninth, tenth, eleventh and twelfth arrays. In many of these embodiments, the module-based energy system further includes a master controller communicatively coupled with the multiple local control devices.

In many embodiments, a module-based energy system includes multiple interconnected converter-source modules and control circuitry, where the control circuitry is configured to adjust a contribution of one or more of the converter-source modules based on status information associated with one or more of the converter-source modules.

In many of these embodiments, the converter-source module includes a converter-source module according to many of the aforementioned embodiments.

In many of these embodiments, the converter-source module includes an energy source including at least one energy storage element, an energy buffer, and a converter. In many of these embodiments, the status information includes one or more of state of charge, state of health, temperature, capacity, current, or voltage of the converter-source module or a component thereof. In many of these embodiments, the master control device is configured to balance state of charge (SOC) of the multiple interconnected converter-source modules. In many of these embodiments, the control circuitry includes processing circuitry and at least one memory having instructions stored thereon that, when executed by the processing circuitry, cause the processing circuitry to cause adjustment of the contribution of one or more converter-source modules based on status information associated with one or more of the converter-source modules. In many of these embodiments, the processing circuitry and at least one memory are components of a master control device, a local control device, or distributed between a master control device and one or more local control devices.

In many of these embodiments, the control circuitry is configured to cause the contribution of a first converter-source module to be lowered with respect to one or more other converter-source modules based on status information of the first converter-source module and the one or more other converter-source modules. In many of these embodiments, the status information of the first converter-source module indicates at least one of the following as compared to status information of the one or more other converter-source modules: a relatively lower state of charge, a relatively lower state of health, a relatively lower capacity, a relatively lower voltage, a relatively lower current, a relatively higher temperature, or a fault.

In many of these embodiments, the control circuitry is configured to cause the contribution of a first converter-source module to be raised with respect to one or more other converter-source modules based on status information of the first converter-source module and the one or more other converter-source modules. In many of these embodiments, the status information of the first converter-source module indicates at least one of the following as compared to status information of the one or more other converter-source modules: a relatively higher state of charge, a relatively higher state of health, a relatively higher capacity, a relatively higher voltage, a relatively higher current, a relatively lower temperature, or absence of a fault.

In many of these embodiments, the contribution is an output power over time of the first converter-source module. In many of these embodiments, the control circuitry includes a master control device and multiple local control devices. In many of these embodiments, the master control device is configured to generate a multiple modulation indexes for the multiple converter-source modules, with one modulation index independently generated for each converter-source module of the multiple converter-source modules.

In many of these embodiments, the master control device includes an intra-phase balancing controller. In many of these embodiments, the intra-phase balancing controller is configured to generate a modulation index for each converter-source module. In many of these embodiments, a modulation index for a converter-source module is determined based on one or more of a peak voltage Vpk of a reference voltage Vr of the module-based energy system, state of charge of the converter-source module, temperature of the converter-source module, capacity of the converter-source module, current of the converter-source module, or voltage of the converter-source module. In many of these embodiments, the master control device further includes a peak detector for detecting a peak voltage Vpk of a reference voltage Vr of the module-based energy system. In many of these embodiments, the master control device is configured to generate a normalized reference waveform Vrn from a reference voltage Vr. In many of these embodiments, the master control device is configured to generate the normalized reference waveform Vrn from the reference voltage Vr by division of the reference voltage Vr by its peak voltage Vpk. In many of these embodiments, the master control device is configured to output a normalized reference waveform Vrn to each of the multiple local control devices. In many of these embodiments, each local control device of the multiple local control devices is configured to modulate the received normalized reference waveform Vrn by the received modulation index. In many of these embodiments, each local control device of the multiple local control devices is configured to generate switching signals for a converter-source module based on the modulated reference waveform. In many of these embodiments, each local control device of the multiple local control devices is configured to generate switching signals for a converter-source module based on a pulse width modulation technique implemented with the modulated reference waveform.

In many of these embodiments, the multiple modulation indexes is generated to ensure a sum of generated voltages from the multiple converter-source modules does not exceed a peak voltage Vpk. In many of these embodiments, the multiple modulation indexes Mi are generated to cause states of charge (SOC) of energy sources of the multiple converter-source modules to converge towards a balanced condition. In many of these embodiments, the multiple modulation indexes Mi are generated to cause states of health (SOH) of the multiple converter-source modules to converge towards a balanced condition. In many of these embodiments, the multiple modulation indexes Mi are generated to cause capacities of the multiple converter-source modules to converge towards a balanced condition. In many of these embodiments, the multiple modulation indexes Mi are generated to cause voltages of the multiple converter-source modules to converge towards a balanced condition. In many of these embodiments, the multiple modulation indexes Mi are generated to cause currents of the multiple converter-source modules to converge towards a balanced condition. In many of these embodiments, the multiple modulation indexes Mi are generated to cause temperatures of the multiple converter-source modules to converge towards a balanced condition. In many of these embodiments, the multiple modulation indexes Mi are generated to reduce the contribution of one or more converter-source modules having a fault condition as compared to one or more other converter source modules not having a fault condition.

In many of these embodiments, the control circuitry includes one or both of an inter-phase balancing controller or an intra-phase balancing controller. In many of these embodiments, the multiple converter-source modules is arranged in a multi-dimensional array. In many of these embodiments, the intra-phase balancing controller is configured to adjust a contribution of the multiple converter-source modules within a one-dimensional array of the multi-dimensional array. In many of these embodiments, the inter-phase balancing controller is configured to control one or more of neutral point shifting or contribution of converter-source modules that are common to each phase.

In many of the aforementioned embodiments, the module-based energy system is one of single phase or multi-phase. In many of these embodiments, the module-based energy system is a multi-phase module-based energy system outputting signals in three-phases, four-phases, five-phases, or six-phases.

In many of the aforementioned embodiments, the multiple converter-source modules are arranged in a multi-dimensional array.

In many of the aforementioned embodiments, the multiple converter-source modules are arranged in accordance with any of many of the aforementioned embodiments.

In many of the aforementioned embodiments, the module-based energy system is configured for operation in an electric or hybrid mobile vehicle. In many of these embodiments, the electric or hybrid mobile vehicle is one of: a car, a bus, a truck, a motorcycle, a scooter, an industrial vehicle, a mining vehicle, a flying vehicle, a maritime vessel, a locomotive or rail-based vehicle, or a military vehicle.

In many of the aforementioned embodiments, the module-based energy system is configured for operation as a stationary energy system. In many of these embodiments, the stationary energy system is one of: a residential system, an industrial system, a commercial system, a data center storage system, a grid, a micro-grid, or a charging station.

In many of the aforementioned embodiments, the module-based energy system is configured as a battery pack for an electric vehicle.

In many embodiments, a module-based energy system includes multiple interconnected converter-source modules and control circuitry, where the control circuitry is configured to adjust power supply to one or more of the converter-source modules based on status information associated with one or more of the converter-source modules. In many of these embodiments, each converter-source module includes a converter-source module according to many of the aforementioned embodiments.

In many of these embodiments, each converter-source module includes an energy source including at least one energy storage element, an energy buffer, and a converter. In many of these embodiments, the control circuitry is configured to independently determine the amount of charge each converter-source module with the system receives from a power supply external to the system. In many of these embodiments, the control circuitry is configured to independently determine the amount of charge each converter-source module with the system receives from a power supply external to the system based on status information associated with one or more of the converter-source modules or components thereof, where the status information includes one or more of: state of charge (SOC), state of health (SOH), capacity, temperature, voltage, current, presence of a fault, or absence of a fault. In many of these embodiments, the multiple converter-source modules are arranged in a multi-dimensional array. In many of these embodiments, the multiple converter-source modules is arranged in accordance with many of the aforementioned embodiments.

In many embodiments, a converter-source module includes an energy source including at least one energy storage element, an energy buffer, and a converter including multiple, the converter configured to generate an output voltage based on a combination of the multiple switches.

In many of these embodiments, an output of the energy source is couplable to an input terminal of the energy buffer. In many of these embodiments, an output of the energy buffer is couplable to an input terminal of the converter. In many of these embodiments, the energy storage element is one of an ultra-capacitor, a battery including at least one cell or multiple battery cells connected in series and/or in parallel, or a fuel-cell. In many of these embodiments, the energy buffer includes one or more of: electrolytic capacitors, film capacitors, a Z-source network including two inductors and two capacitors, or a Quasi Z-source network including two inductors, two capacitors and a diode. In many of these embodiments, each of the multiple switches includes at least one of a semiconductor MOSFET or a semiconductor IGBT. In many of these embodiments, the converter is configured to generate three different voltage outputs by different combinations of the multiple switches. In many of these embodiments, the energy source is configured to output a direct current voltage VDC, and the three different voltage outputs are +VDC, 0, and −VDC. In many of these embodiments, the converter-source module is configured to receive switching signals for the multiple switches from a local control device.

In many embodiments, an energy system includes at least two converter-source modules according to many of the aforementioned embodiments.

In many of these embodiments, the at least two converter-source modules are interconnected in one of a one-dimensional array or a multi-dimensional array. In many of these embodiments, a least two one-dimensional arrays are connected together at different rows and columns directly or via additional converter-source modules. In many of these embodiments, the energy system includes at least two local control devices, one local control device for each converter-source module. In many of these embodiments, each local control device manages energy from the energy source, protects the energy buffer, and controls the converter.

In many embodiments, a module-based energy system includes a local control device and a converter-source module interconnected to the local control device, where the converter-source module includes an energy source having a storage element, first and second outputs of the energy source being connected to first and second inputs of an energy buffer, first and second outputs of the energy buffer being connected to first and second inputs of a converter, the converter including at least four switches to generate three voltage levels including a first voltage level with a positive polarity, a zero or reference voltage level, and the first voltage level with a negative polarity, where the three voltage levels are generated by connection of the first voltage level between the first and second inputs of the converter to first and second outputs of the converter by different combinations of the at least four switches.

In many of these embodiments, the storage element includes one of an ultra-capacitor, a battery module including one or more interconnected battery cells, and a fuel-cell module. In many of these embodiments, the energy buffer includes one of an electrolytic and/or film capacitor, a Z-source network formed by two inductors and two electrolytic and/or film capacitors, and a Quasi Z-source network formed by two inductors, two electrolytic and/or film capacitors and a diode. In many of these embodiments, the switches are configured as semiconductor switches. In many of these embodiments, the energy source includes a primary energy source and a secondary energy source, where in the primary energy source includes a storage element including one of an ultra-capacitor, a battery module including one or more interconnected battery cells, and a fuel-cell module. In many of these embodiments, the first and second outputs of the primary energy source are coupled to first and second input terminals of an energy buffer, where the energy buffer includes one of an electrolytic and/or film capacitor, a Z-source network formed by two inductors and two electrolytic and/or film capacitors, and a Quasi Z-source network formed by two inductors, two electrolytic and/or film capacitors and a diode. In many of these embodiments, a second output of the energy buffer is connected to a second output of the secondary energy source, and where a first output of the secondary energy source is connected to the second input of the converter. In many of these embodiments, the secondary energy source includes a storage element including one of an electrolytic and/or film capacitor, an ultra-capacitor, a battery module including one or more interconnected battery cells, an electrolytic and/or film capacitor connected in parallel with an ultra-capacitor, an electrolytic and/or film capacitor connected in parallel with a battery module including one or more interconnected battery cells, an electrolytic and/or film capacitor connected in parallel with ultra-capacitor and battery module including one or more interconnected battery cells. In many of these embodiments, the converter includes six switches. In many of these embodiments, the converter-source module is configured to power first and second auxiliary loads.

In many of these embodiments, the system further includes a balancing controller. In many of these embodiments, the balancing controller is a single phase balancing controller. In many of these embodiments, the balancing controller includes a peak detector, a divider and an intraphase balancing controller. In many of these embodiments, the system further includes multiple converter-source modules, and the balancing controller is configured to balance state of charge and temperature among the multiple converter-source modules of the system. In many of these embodiments, the balancing controller is a three phase balancing controller. In many of these embodiments, the balancing controller includes an interphase balancing controller and a multiple intra-phase controllers. In many of these embodiments, the system further includes multiple converter-source modules, and the balancing controller is configured to balance state of charge and temperature among the multiple converter-source modules of the system.

In many embodiments, a module-based energy system is provided, including a converter-source module, including: a first energy source; and a converter coupled with the first energy source, wherein the converter includes multiple switches configured to select an output voltage of the module.

In many embodiments, a method of supplying an output power from a module-based energy system is provided, the method including: receiving, by control circuitry of the system, status information from at least one of multiple converter-source modules of the system, wherein each converter-source module includes an energy source and a converter and wherein each converter-source module is configured to contribute power to an output power of the system; and controlling, by the control circuitry, a power contribution of at least one converter-source module of the multiple converter-source modules based on the status information.

In these embodiments, the control circuitry can include a master control device and multiple local control devices. The master control device can receive the status information from at least one local control device, and the method can further include outputting a reference waveform and a modulation index from the master control device to the at least one local control device. The method can further include: modulating, by the local control device, the reference waveform with the modulation index; and generating multiple switching signals for a converter of a converter-source module associated with the local control device based, at least in part, on the modulated reference waveform. The switching signals can be generated with pulse width modulation.

In these embodiments, controlling, by the control circuitry, the power contribution of the at least one converter-source module can include: generating and outputting multiple switching signals from the control circuitry to the converter of the at least one converter-source module, wherein the method further includes switching, by the converter, an output voltage of the at least one converter-source module.

In these embodiments, controlling, by the control circuitry, the power contribution of the at least one converter-source module can include: reducing the power contribution of the at least one converter-source module or raising the power contribution of the at least one converter-source module. The power contribution can be reduced or raised as compared to a preceding power contribution of the at least one converter-source module or as compared to the power contribution of one or more other converter-source modules.

In these embodiments, the control circuitry can control the power contribution of every converter-source module of the multiple converter-source modules.

In these embodiments, the control circuitry can control the power contribution according to a pulse width modulation or hysteresis technique.

In these embodiments, the control circuitry can repeatedly receive status information for every converter-source module, wherein the status information is specific to each individual converter-source module. The control circuitry can control every converter-source module based on the status information, wherein the control occurs in real time.

In many embodiments, a method of charging a module-based energy system is provided that includes: receiving, by control circuitry of the system, status information from at least one of multiple converter-source modules of the system, wherein each converter-source module includes an energy source and a converter and wherein each converter-source module is configured to be charged by a power supply; and controlling, by the control circuitry, a power consumption of at least one converter-source module of the multiple converter-source modules based on the status information.

In these embodiments, controlling, by the control circuitry, the power consumption of the at least one converter-source module can include: generating and outputting multiple switching signals from the control circuitry to the converter of the at least one converter-source module, and wherein the method can further include switching, by the converter, multiple switches such that the power consumption of at least one converter-source module is reduced or raised, optionally wherein the power consumption is reduced or raised as compared to a preceding power consumption of the at least one converter-source module or as compared to the power consumption of one or more other converter-source modules.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. Processing circuitry can also interface with communication circuitry to perform the reverse functions necessary to receive a wireless transmission and convert it into digital data, voice, and/or video. RF communication circuitry can include a transmitter and a receiver (e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages.

Memory, storage, and/or computer readable media can be shared by one or more of the various functional units present, or can be distributed amongst two or more of them (e.g., as separate memories present within different chips). Memory can also be a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A modular battery pack system controllable to supply power to a three phase motor of an electric vehicle (EV), the modular battery pack system comprising:
    a first interconnection module comprising a first port, a second port, a first battery, and first switch circuitry;
    a second interconnection module comprising a third port, a second battery, and second switch circuitry, wherein the first and second batteries are electrically coupled in parallel; and
    three converter module arrays, each array comprising at least three arrayed converter modules electrically coupled together to output an AC voltage signal comprising a superposition of output voltages from each of the at least three arrayed converter modules, wherein each of the three arrays is configured to output an AC voltage waveform having a different phase angle for the three phase motor, and wherein each of the arrayed converter modules comprises an energy source and is controllable to selectively output a positive DC output voltage, zero output voltage, or negative DC output voltage from the energy source; and
    wherein the first port is electrically coupled with a first array of the three converter module arrays, the second port is electrically coupled to a second array of the three converter module arrays, the third port is electrically coupled with a third array of the three converter module arrays, and the first switch circuitry is controllable to selectively couple the first array or the second array to the first battery.

2. The system of claim 1, further comprising control circuitry communicatively coupled with the at least three arrayed converter modules of each array and with the first and second interconnection modules.

3. The system of claim 2, wherein the control circuitry is configured to control, for each array, the at least three arrayed converter modules to balance intraphase state of charge.

4. The system of claim 3, wherein the control circuitry is configured to control the first interconnection module to balance interphase state of charge between the first and second array.

5. The system of claim 4, wherein the control circuitry is configured to control the first switch circuitry to exchange energy between the first array and the second array.

6. The system of claim 1, further comprising:
a plurality of local control devices configured to output switch signals to each of the at least three arrayed converter modules of each array and the first and second interconnection modules; and
a master control device communicatively coupled with the plurality of local control devices.

7. The system of claim 6, wherein the master control device is configured to output information to the plurality of local control devices, wherein the information comprises normalized voltage reference waveforms and modulation indexes, and wherein the plurality of local control devices are configured to generate pulse width modulated switch signals with the information received from the master control device.

8. The system of claim 6, wherein the plurality of local control devices are configured to output state of charge information, about the at least three arrayed converter modules of each array and the first and second interconnection modules, to the master control device.

9. The system of claim 1, wherein a positive terminal of the first battery is electrically coupled with a first node and a negative terminal of the first battery is electrically coupled with a second node, and the first switch circuitry is configured to selectively couple the first port to either the first or second node, and configured to selectively couple the second port to either the first or second node.

10. The system of claim 1, wherein the first switch circuitry is electrically coupled between the first and second batteries and the first and second ports, and the second switch circuitry is electrically coupled between the first and second batteries and the third port.

11. The system of claim 1, wherein the first array has a first end and a second end opposite the first end, wherein the first end has a first end terminal that outputs the AC voltage signal of the first array to the three phase motor, and the second end has a second end terminal electrically coupled to the first interconnection module.

12. The system of claim 11, wherein the second array has a first end and a second end opposite the first end, wherein the first end has a first end terminal that outputs the AC voltage signal of the second array to the three phase motor, and the second end has a second end terminal electrically coupled to the first interconnection module, and
wherein the third array has a first end and a second end opposite the first end, wherein the first end has a first end terminal that outputs the AC voltage signal of the third array to the three phase motor, and the second end has a second end terminal electrically coupled to the second interconnection module.

13. The system of claim 1, further comprising control circuitry configured to control the first and second interconnection modules to balance interphase state of charge between the first array, the second array, and the third array.

14. The system of claim 1, further comprising control circuitry configured to control the first and second interconnection modules to exchange energy between the first array, the second array, and the third array.

15. A method of supplying power from a modular battery pack system of an electric vehicle (EV), the method comprising:
controlling a first, second, and a third converter module array to output three phase voltage signals to a three phase motor of the EV, wherein each array comprises at least three arrayed converter modules electrically coupled together to output an AC voltage signal comprising a superposition of output voltages from each of the at least three arrayed converter modules, wherein each of the arrayed converter modules comprises an energy source and is controllable to selectively output a positive DC output voltage, zero output voltage, or negative DC output voltage from the energy source, and wherein the first array and second array are electrically coupled to a first interconnection module comprising a first battery, and the third array is electrically coupled to a second interconnection module comprising a second battery, wherein the second interconnection module is coupled to the first interconnection module such that the first battery and second battery are in parallel;
controlling the first interconnection module to selectively couple the first array or the second array to the first and second batteries; and
controlling the second interconnection module to selectively couple the third array to the first and second batteries.

16. The method of claim 15, wherein controlling the first interconnection module comprises:
controlling first switch circuitry of the first interconnection module to selectively couple the first array or the second array to the first battery.

17. The method of claim 15, wherein controlling the first interconnection module comprises:
controlling the first interconnection module to balance interphase state of charge between the first array and the second array.

18. The method of claim 17, wherein controlling the first interconnection module to balance interphase state of charge between the first array and the second array comprises:
controlling first switch circuitry of the first interconnection module with a pulse width modulated switch signal to selectively couple the first array or the second array to the first battery.

19. The method of claim 15, wherein controlling the first interconnection module comprises:
controlling the first interconnection module to exchange energy between the first array and the second array.

20. The method of claim 15, wherein controlling the first, the second, and the third converter module arrays to output three phase voltage signals comprises:
controlling, for each array, the at least three arrayed converter modules to balance intraphase state of charge.

21. The method of claim 15, wherein controlling the first, the second, and the third converter module arrays to output three phase voltage signals comprises:
outputting information from a master control device to a plurality of local control devices, wherein the information comprises normalized voltage reference waveforms and modulation indexes;
generating, by the plurality of local control devices, pulse width modulated switch signals with the information received from the master control device; and
switching switch circuitry of each arrayed converter module of the first, second, and third arrays to selectively output the positive DC output voltage, zero output voltage, or negative DC output voltage.

22. The method of claim 21, further comprising determining the modulation indexes based at least on state of charge information about the at least three arrayed converter modules of the first, second, and third arrays.

23. The method of claim 15, wherein controlling the first interconnection module comprises controlling first switch circuitry of the first interconnection module that is electrically coupled between the first and second batteries and the first and second ports, and wherein controlling the second interconnection module comprises controlling second switch circuitry of the second interconnection module that is electrically coupled between the first and second batteries and the third port.

24. The method of claim 15, wherein the first array has a first end with a first end terminal that outputs the AC voltage signal of the first array to the three phase motor, and a second end, opposite the first end, with a second end terminal that is connected to the first interconnection module.

25. The method of claim 24, wherein the second array has a first end with a first end terminal that outputs the AC voltage signal of the second array to the three phase motor, and a second end, opposite the first end, with a second end terminal that is connected to the first interconnection module, and wherein the third array has a first end with a first end terminal that outputs the AC voltage signal of the third array to the three phase motor, and a second end, opposite the first end, with a second end terminal that is connected to the second interconnection module.

26. The method of claim 15, wherein the first and second interconnection modules are controlled to balance interphase state of charge between the first array, the second array, and the third array.

27. The method of claim 15, wherein the first and second interconnection modules are controlled to exchange energy between the first array, the second array, and the third array.

* * * * *